(12) United States Patent  (10) Patent No.: US 8,098,293 B2
Nakanishi et al.  (45) Date of Patent: Jan. 17, 2012

(54) IMAGE EXTRACTION DEVICE, IMAGE EXTRACTION METHOD, IMAGE PROCESSING DEVICE, IMAGE PROCESSING METHOD, AND IMAGING DEVICE

(75) Inventors: Toshiaki Nakanishi, Chiba (JP); Michitada Ueda, Kanagawa (JP); Hiroaki Takano, Kanagawa (JP)

(73) Assignee: Sony Corporation, Tokyo (JP)

( * ) Notice: Subject to any disclaimer, the term of this patent is extended or adjusted under 35 U.S.C. 154(b) by 930 days.

(21) Appl. No.: 10/493,938

(22) PCT Filed: Aug. 28, 2003

(86) PCT No.: PCT/JP03/10986
§ 371 (c)(1),
(2), (4) Date: Jul. 23, 2004

(87) PCT Pub. No.: WO2004/036900
PCT Pub. Date: Apr. 29, 2004

(65) Prior Publication Data
US 2005/0013599 A1   Jan. 20, 2005

(30) Foreign Application Priority Data

Aug. 30, 2002 (JP) ................................. 2002-255864
Aug. 30, 2002 (JP) ................................. 2002-255865

(51) Int. Cl.
*H04N 5/228* (2006.01)
*G03B 15/00* (2006.01)
*G03B 15/02* (2006.01)
*G06K 9/20* (2006.01)
*G06K 9/34* (2006.01)

(52) U.S. Cl. ............. 348/222.1; 396/2; 396/4; 382/282; 382/164

(58) Field of Classification Search .................. 396/2, 4; 382/282, 164
See application file for complete search history.

(56) References Cited

U.S. PATENT DOCUMENTS 2,541,016 A * 2/1951 Allen ................................ 396/2
3,631,781 A * 1/1972 Kennington et al. ............. 396/2
3,693,522 A * 9/1972 Chiesa ............................... 396/2
(Continued)

FOREIGN PATENT DOCUMENTS

EP   1 206 118   5/2002
(Continued)

*Primary Examiner* — David Ometz
*Assistant Examiner* — Quang Le
(74) *Attorney, Agent, or Firm* — Robert J. Depke; Rockey, Depke & Lyons, LLC

(57) ABSTRACT

An image extracting apparatus is provided which can automatically finish a captured image of a person to provide an easy-to-view picture. It includes an image input unit supplied with a captured color image of the person to output it as digital data, a flesh-color region extraction unit supplied with the digital image data to detect a flesh-color region in the image, an object-image detection unit to detect an object image from the detected flesh-color region, and a trimming unit to trim the detected object image. On the assumption that a region extending from the top end of a certificate picture to the head top of a person is an overhead region A, a region extending from the head top to the jaw is a face region B and a region extending from the jaw to the bottom end of the certificate picture is a chest region C, the trimming unit trims the image so that the dimensional ratio between these regions A, B and C is 1:0.4 to 0.8:0.1 to 0.26.

14 Claims, 32 Drawing Sheets

U.S. PATENT DOCUMENTS

| | | | |
|---|---|---|---|
| 3,820,133 A * | 6/1974 | Adorney et al. | 396/1 |
| 4,804,983 A * | 2/1989 | Thayer, Jr. | 396/2 |
| 4,959,670 A * | 9/1990 | Thayer, Jr. | 396/2 |
| 5,016,035 A * | 5/1991 | Myles, Jr. | 396/2 |
| 5,159,367 A * | 10/1992 | Fusi | 396/5 |
| 5,262,815 A * | 11/1993 | Aumiller | 396/2 |
| 5,446,515 A * | 8/1995 | Wolfe et al. | 396/2 |
| 5,500,700 A * | 3/1996 | Massarsky | 396/2 |
| 5,740,479 A * | 4/1998 | Soma et al. | 396/176 |
| 5,748,776 A * | 5/1998 | Yoshida | 382/195 |
| 5,784,651 A * | 7/1998 | Mauchan | 396/2 |
| 6,049,674 A * | 4/2000 | Yamamoto et al. | 396/2 |
| 6,437,856 B1 * | 8/2002 | Jacques | 356/39 |
| 6,483,993 B1 * | 11/2002 | Misumi et al. | 396/78 |
| 6,523,034 B1 * | 2/2003 | Hoyt et al. | 707/10 |
| 6,788,411 B1 * | 9/2004 | Lebens | 356/394 |
| 6,907,193 B2 * | 6/2005 | Kollias et al. | 396/4 |
| 6,928,238 B2 * | 8/2005 | Nakanishi et al. | 396/2 |
| 6,959,146 B2 * | 10/2005 | Nakanishi et al. | 396/2 |
| 6,963,693 B2 * | 11/2005 | Nakanishi et al. | 396/2 |
| 6,968,126 B2 * | 11/2005 | Nakanishi et al. | 396/2 |
| 6,975,360 B2 * | 12/2005 | Slatter | 348/370 |
| 7,167,643 B2 * | 1/2007 | Nakanishi et al. | 396/2 |
| 2001/0014182 A1 | 8/2001 | Funayama et al. | |
| 2002/0070945 A1 | 6/2002 | Kage | |
| 2002/0076100 A1 * | 6/2002 | Luo | 382/164 |
| 2002/0085771 A1 * | 7/2002 | Sakuramoto | 382/282 |
| 2006/0133654 A1 * | 6/2006 | Nakanishi et al. | 382/118 |

FOREIGN PATENT DOCUMENTS

| | | |
|---|---|---|
| JP | 05-268513 | 10/1993 |
| JP | 08-125909 | 5/1996 |
| JP | 09-230489 | 9/1997 |
| JP | 2000-137788 | 5/2000 |
| JP | 2000-270198 | 9/2000 |
| JP | 2000-270199 | 9/2000 |
| JP | 2002-051315 | 2/2002 |
| JP | 2002-163653 | 6/2002 |
| JP | 2002-175538 | 6/2002 |
| JP | 2002-368978 | 12/2002 |

* cited by examiner

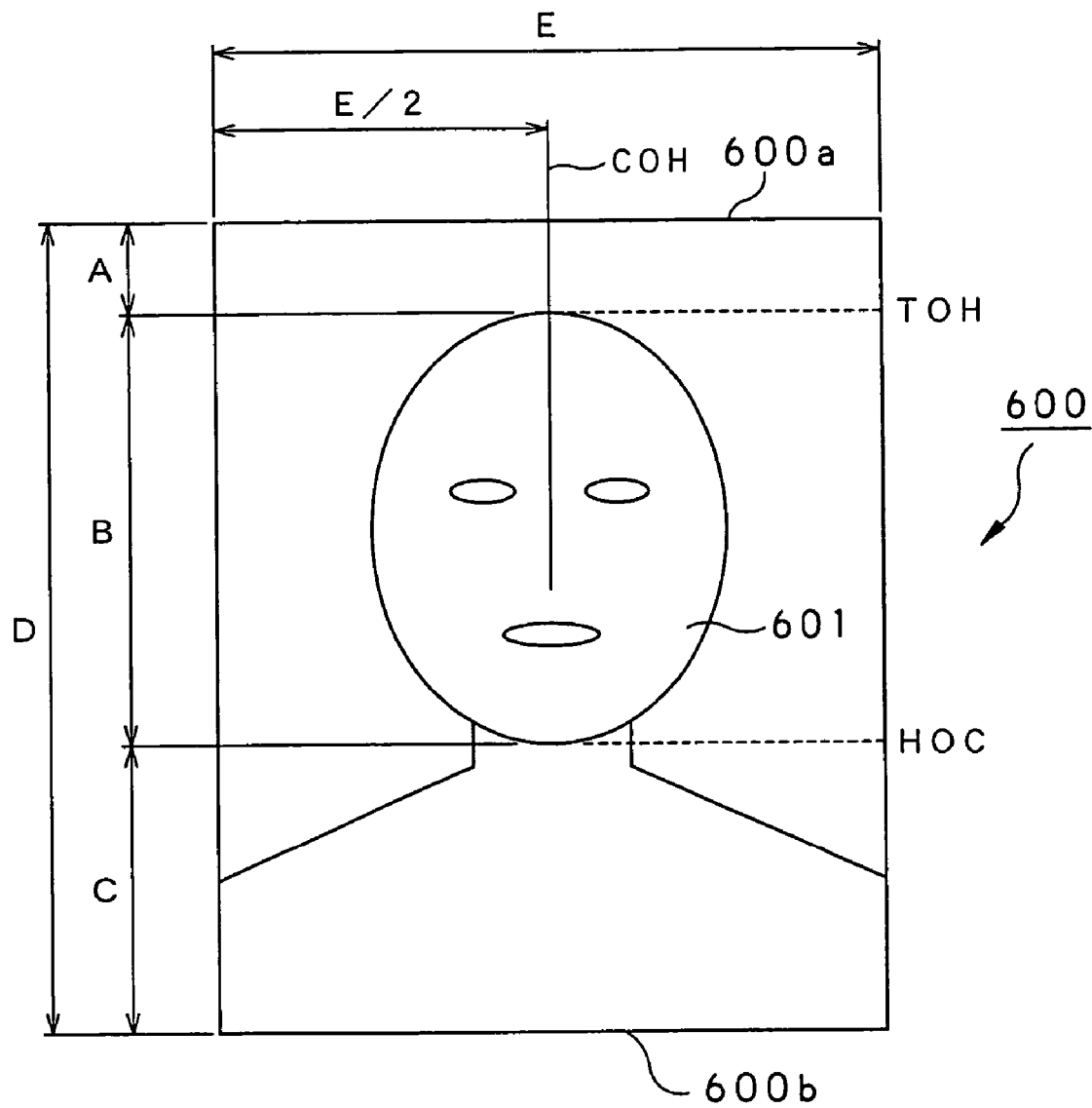
F I G. 2

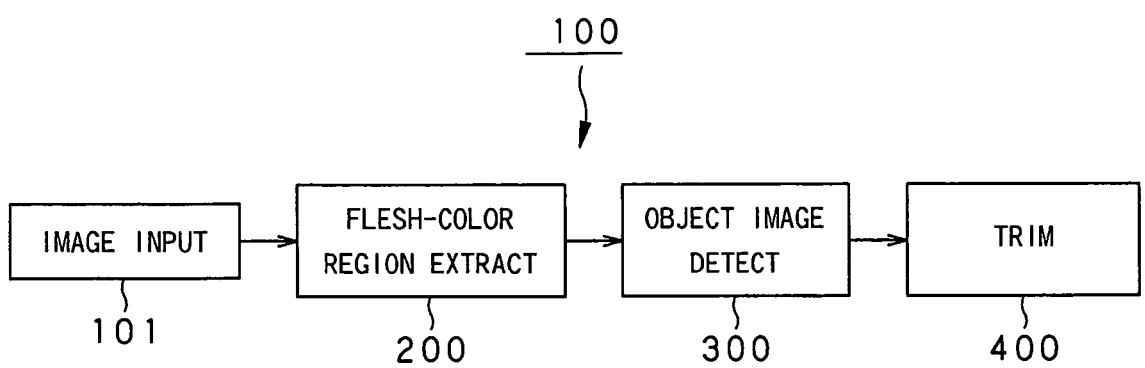
F I G. 10

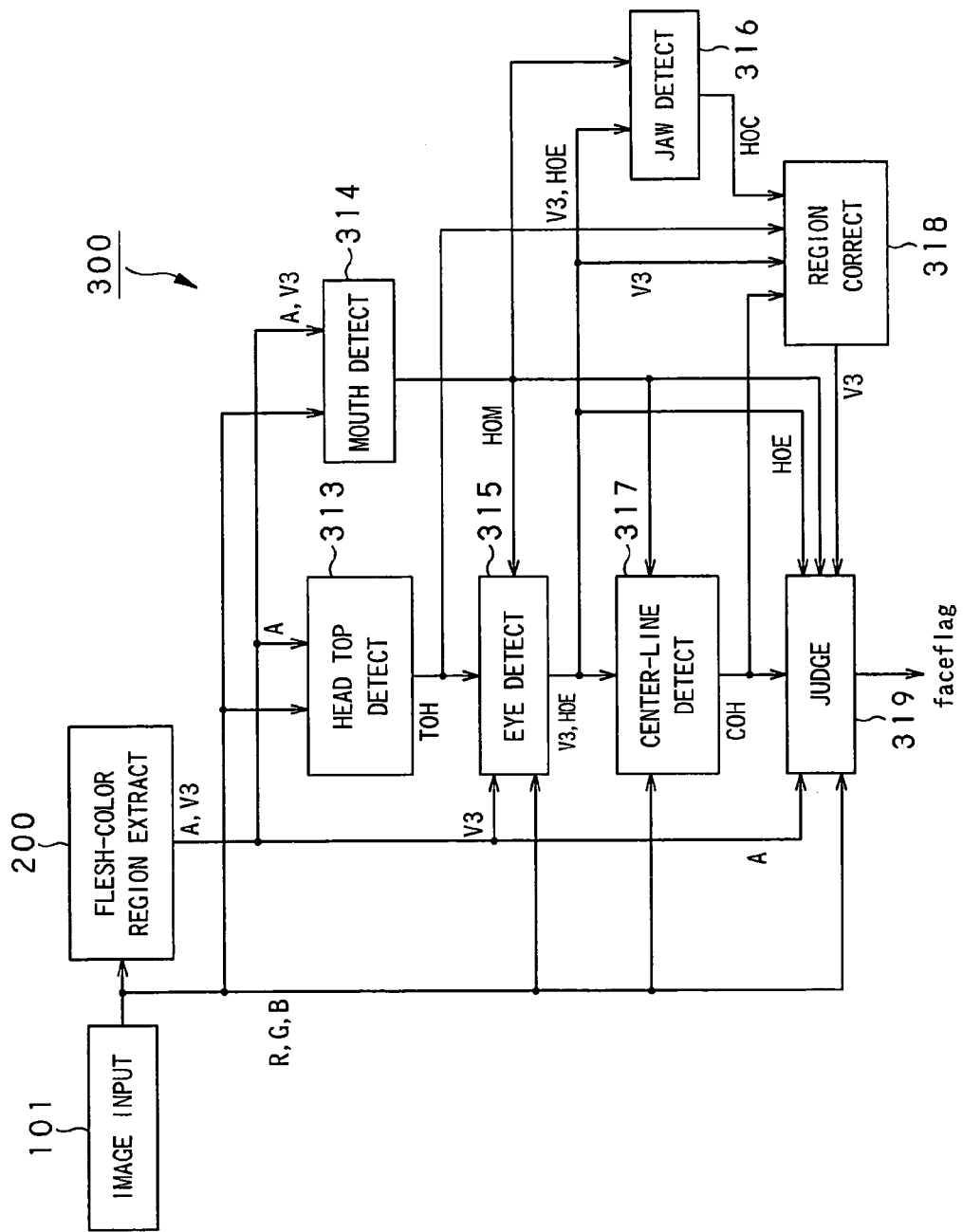
F I G. 12

REGION MAP R

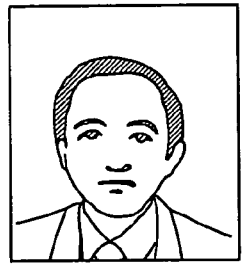
TOO LARGE OVERHEAD REGION
(RATIO WITH FACE
REGION:0.42)
F I G. 24A
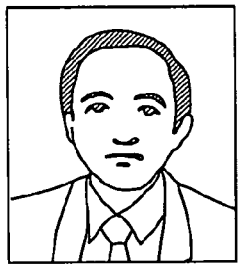
WELL-BALANCED
(RATIO WITH FACE
REGION:0.15)
F I G. 24B
TOO SMALL OVERHEAD REGION
(RATIO WITH FACE
REGION:0.04)
F I G. 24C
FACE REGION, TOO SMALL
F I G. 25A
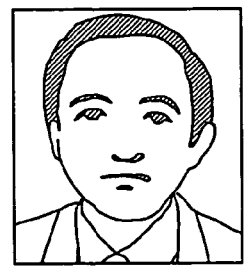
FACE REGION, TOO LARGE
F I G. 25B

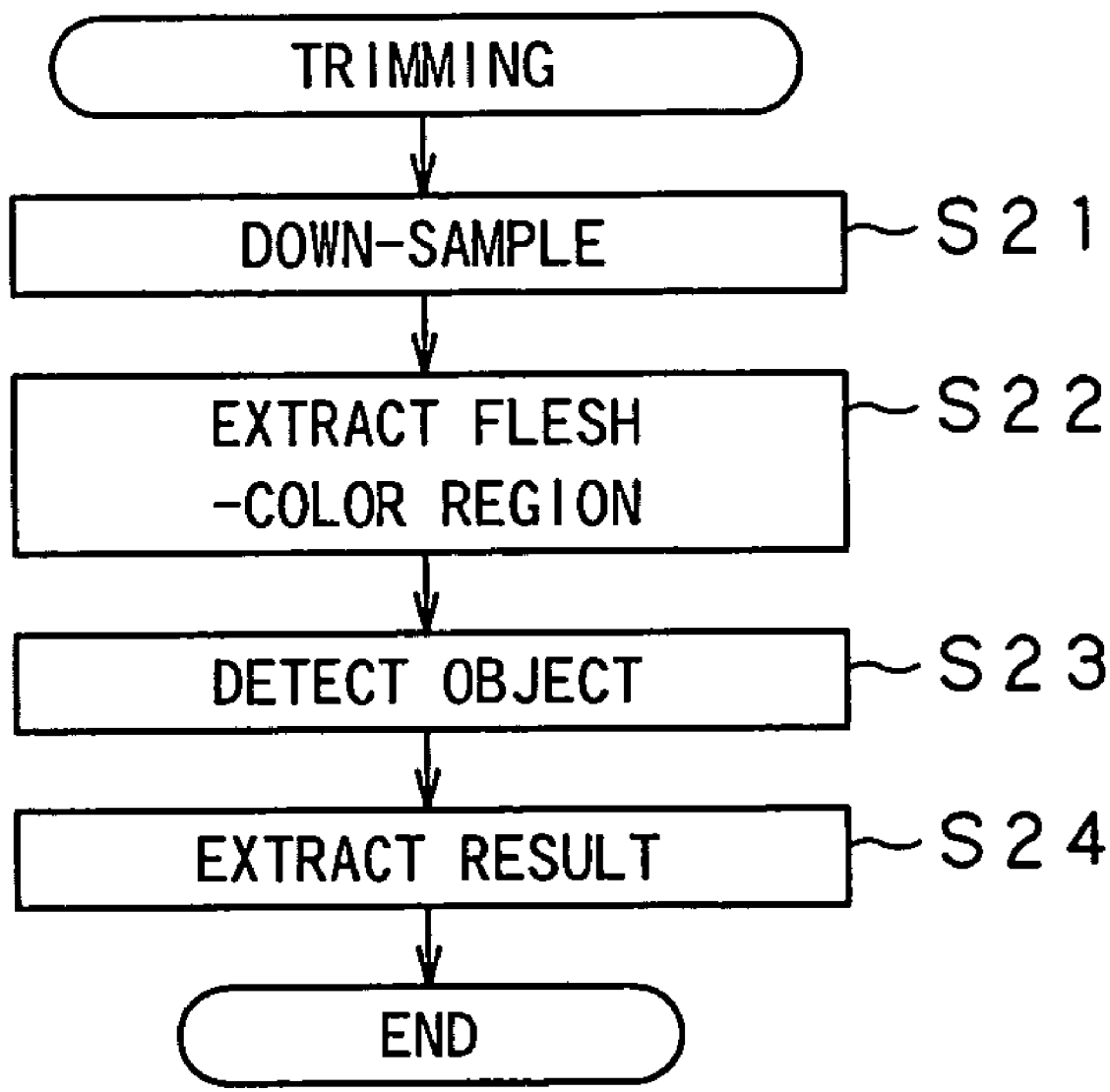
F I G. 27

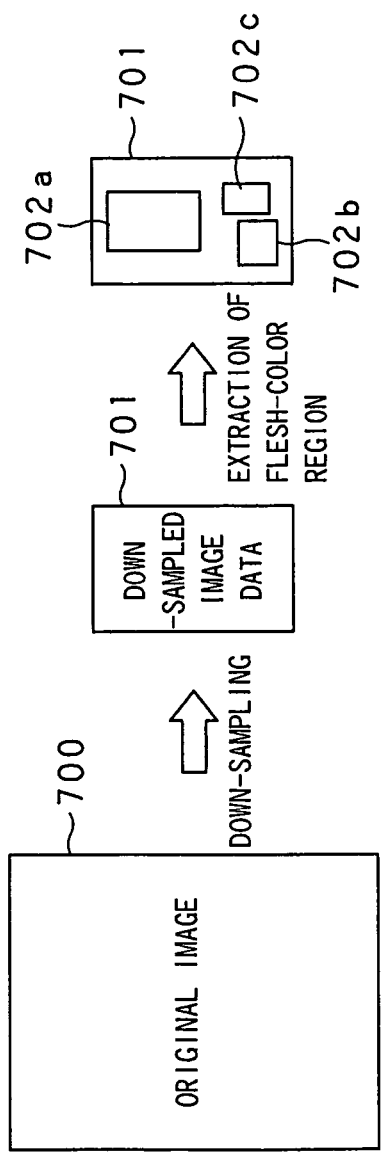
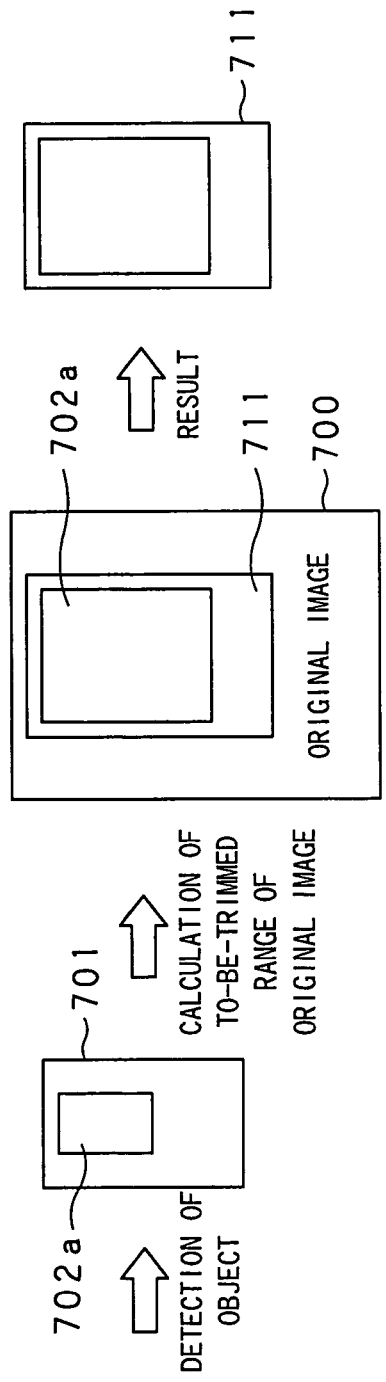
FIG. 28A  FIG. 28B  FIG. 28C
FIG. 28D  FIG. 28E  FIG. 28F

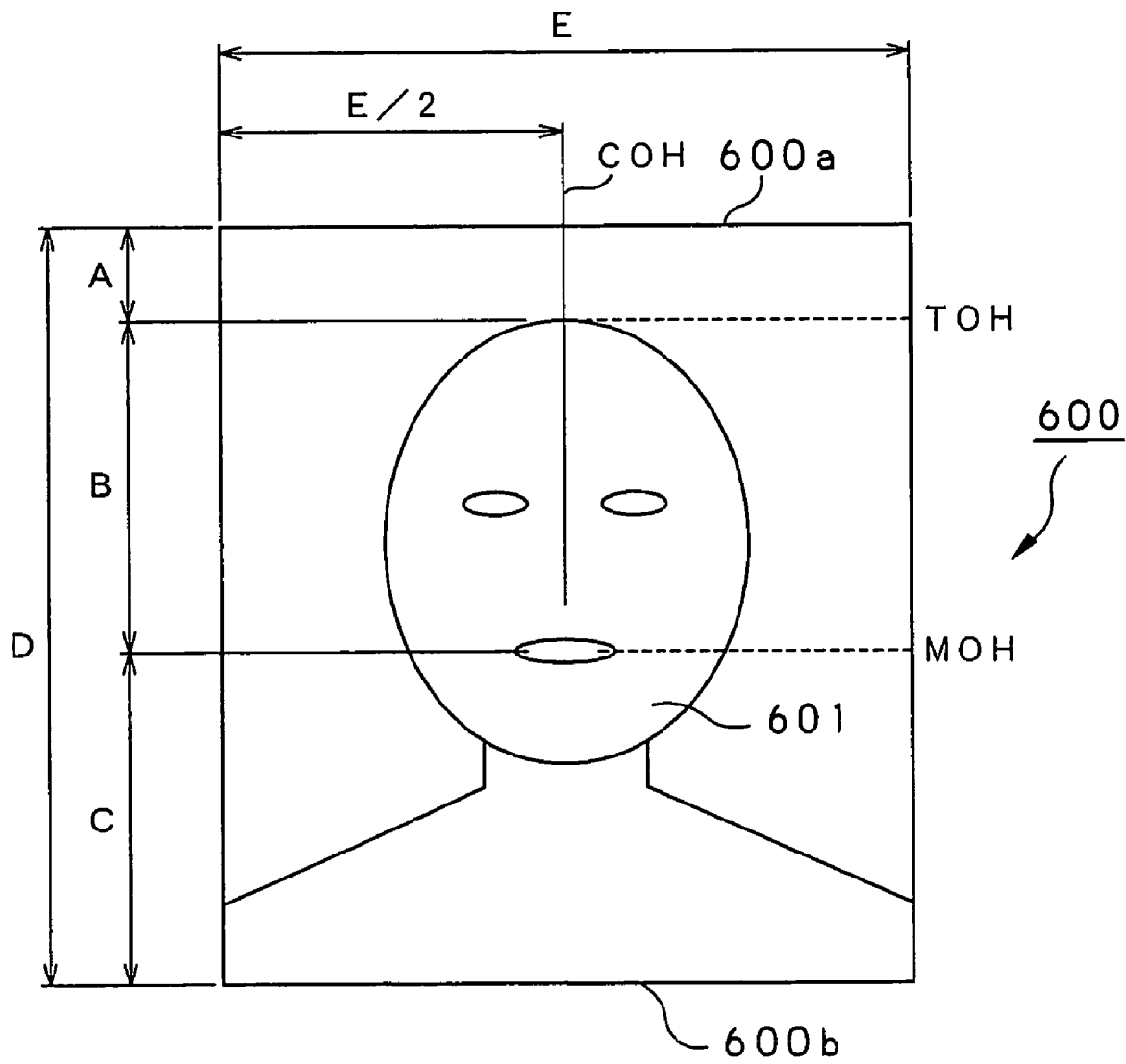
F I G. 30

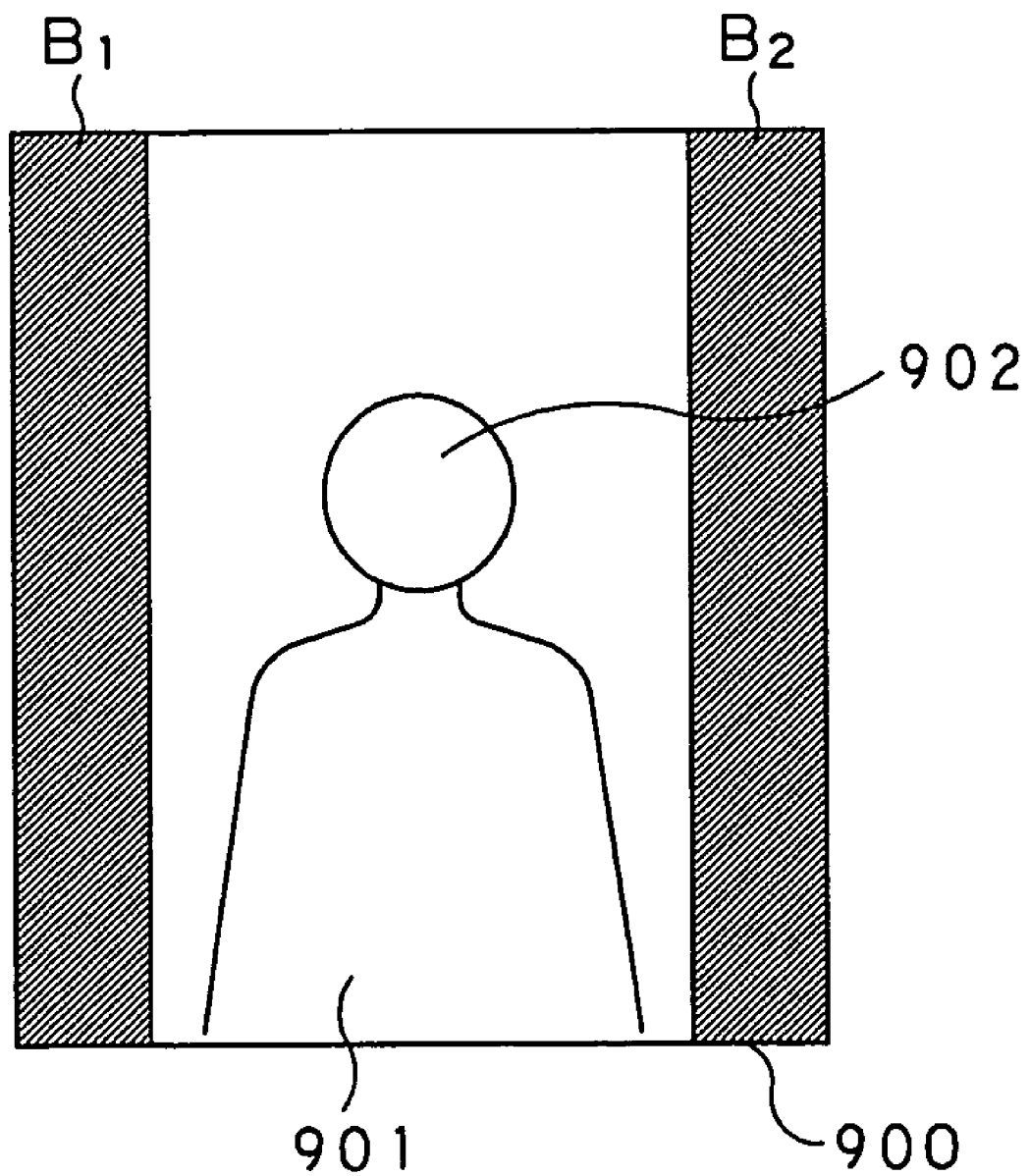
F I G. 37

IMAGE EXTRACTION DEVICE, IMAGE EXTRACTION METHOD, IMAGE PROCESSING DEVICE, IMAGE PROCESSING METHOD, AND IMAGING DEVICE

TECHNICAL FIELD

The present invention relates to an image extracting apparatus and method, image processing apparatus and method, and a photographic apparatus, in which an image trimming is done.

This application claims the priority of the Japanese Patent Applications No. 2002-255864 and No. 2002-255865 filed on Aug. 30, 2002, the entirety of which is incorporated by reference herein.

BACKGROUND ART

There are available various booth-type photographic apparatuses or photo booths for taking a certificate or identification picture. One typical example of them is configured as shown in FIG. 1. As shown, the photo booth, generally indicated with a reference 800 in FIG. 1, includes a generally rectangular housing 801 having a photo studio 802 defined therein. The housing 801 has provided therein a camera unit 803 that captures an image of a person (will also be referred to as "user" hereunder wherever appropriate) as an object inside the photo studio 802, and a printer 804 that prints an image captured by the camera unit 803. The housing 801 has an entrance 805 through which a user enters the photo studio 802. The entrance 805 is provided with a light-proof curtain 806. The photo studio 802 has provided therein a stool 807 on which the user as an object sits for photography. Further, the photo booth 800 includes an illumination unit 809 as well as a coin slot, safe, etc. (not shown).

When the user as an object enters the photo studio 802 through the entrance 805 and sits on the stool 807, the above photo booth 800 gets ready for taking a picture of him or her. The camera unit 803 in the photo booth 800 takes a picture of the user as an object sitting on the stool 807 with a flare of flashlight, and outputs image data thus acquired as a visible image from the printer 804.

In this conventional photo booth 800, a front mirror (at the camera unit 803) has provided thereon a marking (not shown) to which the user as an object should fit the top of head (will be referred to as "head top" hereunder) to bring the head to a predetermined position. The user should manually turn the stool 807 to adjust the height of the latter until the head top comes to the marking.

Also, in simple photo booths often found at street corners or in sales situations, the user has to bring the head to a predetermined position in relation to a camera by adjusting the angular position of the camera or otherwise positioning the camera. Such manual positioning of the user's head cannot assure any stable vertical position of the face in a resultant picture in many cases. Generally, if the overhead region between the picture top end and the head top of the imaged object is large, the picture will provide an impression of no emphasis given to the face of the imaged object and thus object's face will have less appeal. On the contrary, the overhead region, if small, will provide an impression that the imaged user is confined in a narrow place, and the object's face will have less appeal in this case as well.

In the case of ordinary pictures other than the certificate or identification pictures, there is found a tendency that an object is positioned in the center of a picture. Thus, the overhead region of the picture is apt to be larger in area than necessary. Positioning the object's head in the center of a commemorative picture or a portrait will result in a larger overhead region, which will lessen the appeal of the face image. Further, such positioning made in taking a landscape picture will lead to the sky occupying a large portion of the picture, which will spoil the appearance of any user as an object in the picture.

DISCLOSURE OF THE INVENTION

Accordingly, the present invention has an object to overcome the above-mentioned drawbacks of the related art by providing a novel and improved image extracting apparatus and method, image processing apparatus and method, and photographic apparatus, which will be illustrated and described below.

The present invention has another object to provide an image extracting apparatus and method, image processing apparatus and method, and a photographic apparatus, capable of automatically finishing a captured image data into an easier-to-view picture through trimming of the input image data.

The above object can be attained by providing an image extracting apparatus including, according to the present invention, a face-region extracting means for extracting a face region from an image of a user; and a trimming means for trimming the user's image to remove a range of trimming determined based on the face region extracted by the face-region extracting means.

Also the above object can be attained by providing an image extracting method including, according to the present invention, the steps of extracting a face region from an image of a user; and trimming the user's image to remove a range of trimming determined based on the face region extracted by the face-region extracting means.

Also the above object can be attained by providing a photographic apparatus including, according to the present invention, a photographic means for taking a picture of a user; and an image extracting means including a face-region extracting means for extracting the user's face region from the picture; and a trimming means for trimming the picture to remove a range of trimming determined based on the face region extracted by the face-region extracting means so that the extracted face region is positioned in place in contact paper.

Also the above object can be attained by providing an image processing apparatus including, according to the present invention, a face-region extracting means for extracting a face region from an image of a user; and a trimming means for trimming the user's image to remove a range of trimming determined based on the face region extracted by the face-region extracting means.

Also the above object can be attained by providing an image processing method including, according to the present invention, the steps of extracting a face region from an image of a user; and trimming the user's image to remove a range of trimming determined based on the face region extracted by the face-region extracting means.

Also the above object can be attained by providing a photographic apparatus including, according to the present invention, a photographic means for taking a picture of a user; a face-region extracting means for extracting the user's face region from the picture; and a trimming means for trimming the picture to remove a range of trimming determined based on the face region extracted by the face-region extracting means.

With the above image extracting apparatus and method, image processing apparatus and method and the photographic apparatus according to the present invention, the user can take an easy-to-view picture of himself or herself, in which his face is automatically sized and positioned appropriately, without having to change the position of a camera and adjust the height of a chair.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 2 schematically illustrates positioning of a person's head in a certificate picture.

FIG. 10 is a block circuit diagram of an image extracting apparatus according to the present invention.

FIG. 12 is a circuit block diagram of a face-region extraction unit included in the image extracting apparatus in FIG. 10.

FIGS. 24A to 24C schematically illustrate certificate pictures each having the ratio of the overhead and chest regions A and C with the face region B changed, in which FIG. 24B shows a certificate picture provided according to the embodiment of the present invention and FIGS. 24A and 24C show examples 1 and 2 of certificate picture compared with the certificate picture provided according to that embodiment.

FIGS. 25A and 25B schematically illustrate examples of certificate pictures having small and large images of the face region B, respectively.

FIG. 27 shows a flow of operations made in extracting an image according to the present invention.

FIGS. 28A to 28F schematically illustrate steps of extracting an image according to the present invention.

FIG. 30 shows a person's image positioned in a certificate picture.

FIG. 37 explains an effective region of image data in a picture.

BEST MODE FOR CARRYING OUT THE INVENTION

Figure 1:
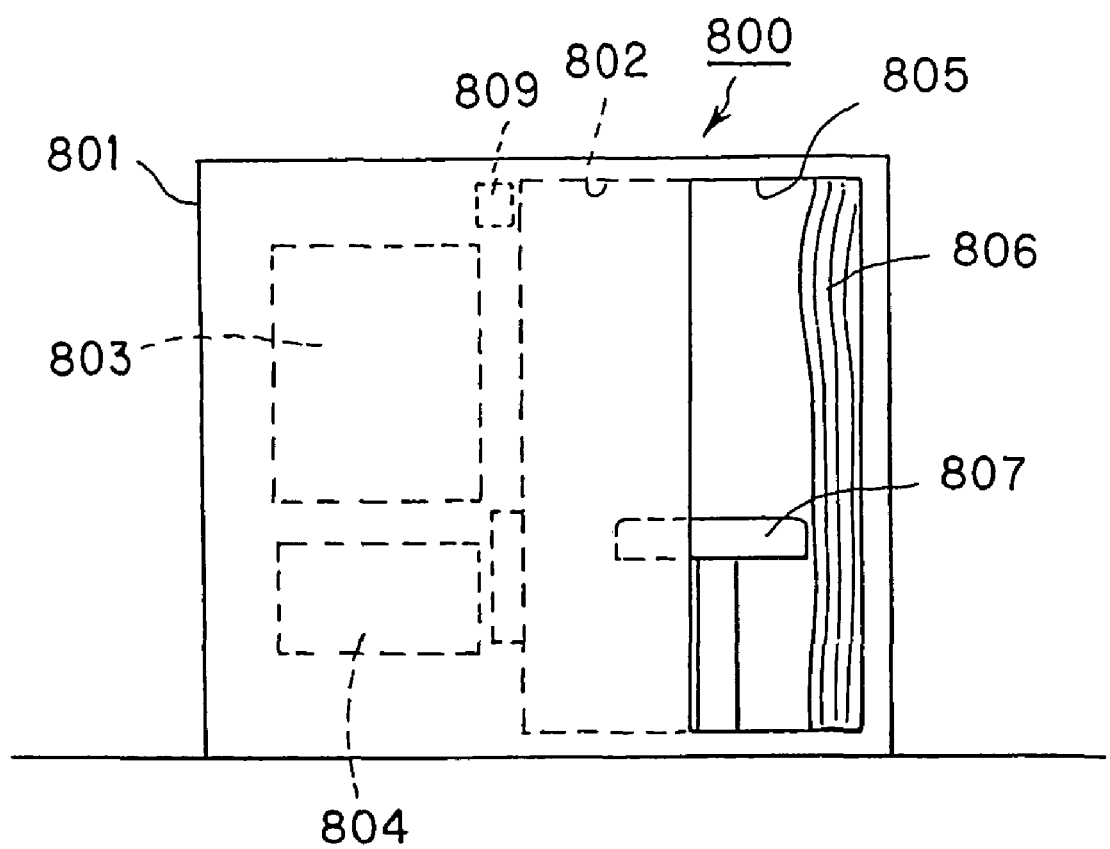
FIG. 1 is a side elevation of the conventional photo booth.

The present invention will be described in detail below concerning the embodiment thereof with reference to the accompanying drawings. The embodiment is an image extracting apparatus that automatically detects the face of a person in a face region in a portrait of the person and trims the picture. According to the present invention, the image extracting apparatus automatically makes a well-balanced positioning of the person's image by defining a ratio among face, chest and overhead regions of a picture, that is, automatically finishes the portrait as an easier-to-view picture.

FIG. 2 schematically illustrates positioning of a person's face in a certificate picture. The certificate picture is generally indicated with a reference 600. Of the certificate picture 600 as shown in FIG. 2, a vertical dimension A from the top end 600a to the head top TOH of a person's image 601 indicates the dimension of an overhead region. A vertical dimension B from the head top TOH of the person's image 601 to the jaw HOC indicates the dimension of a face region. Also, a dimension C from the jaw HOC of the person's image 601 to the bottom end 600b of the certificate picture 600 indicates the dimension of a chest region. A dimension D (=A+B+C) indicates the vertical dimension of an area of contact paper on which the certificate picture 600 is printed (which will be referred to as "effective area" hereunder). Also, a dimension E indicates the horizontal dimension of the effective area. It should be noted here that the effective area (D×E) indicates a region except for a blank on the contact paper where no certificate picture is printed, The image extracting apparatus according to the present invention trims the picture so that the ratio among the dimensions of the face, chest and overhead regions B, C and A, respectively, is 1:0.4 to 0.8:0.1 to 0.2 in case the object's face region is dimensioned as specified herein, namely, it takes the dimension of the face region B as a reference on the contact paper.

Note here that the image extracting apparatus according to the present invention is used to detect a face region of a picture through image processing and automatically trim the picture in a photo booth for a certificate picture or the like. Here, a photo booth using the image extracting apparatus according to the present invention will first be described.

Figure 3:
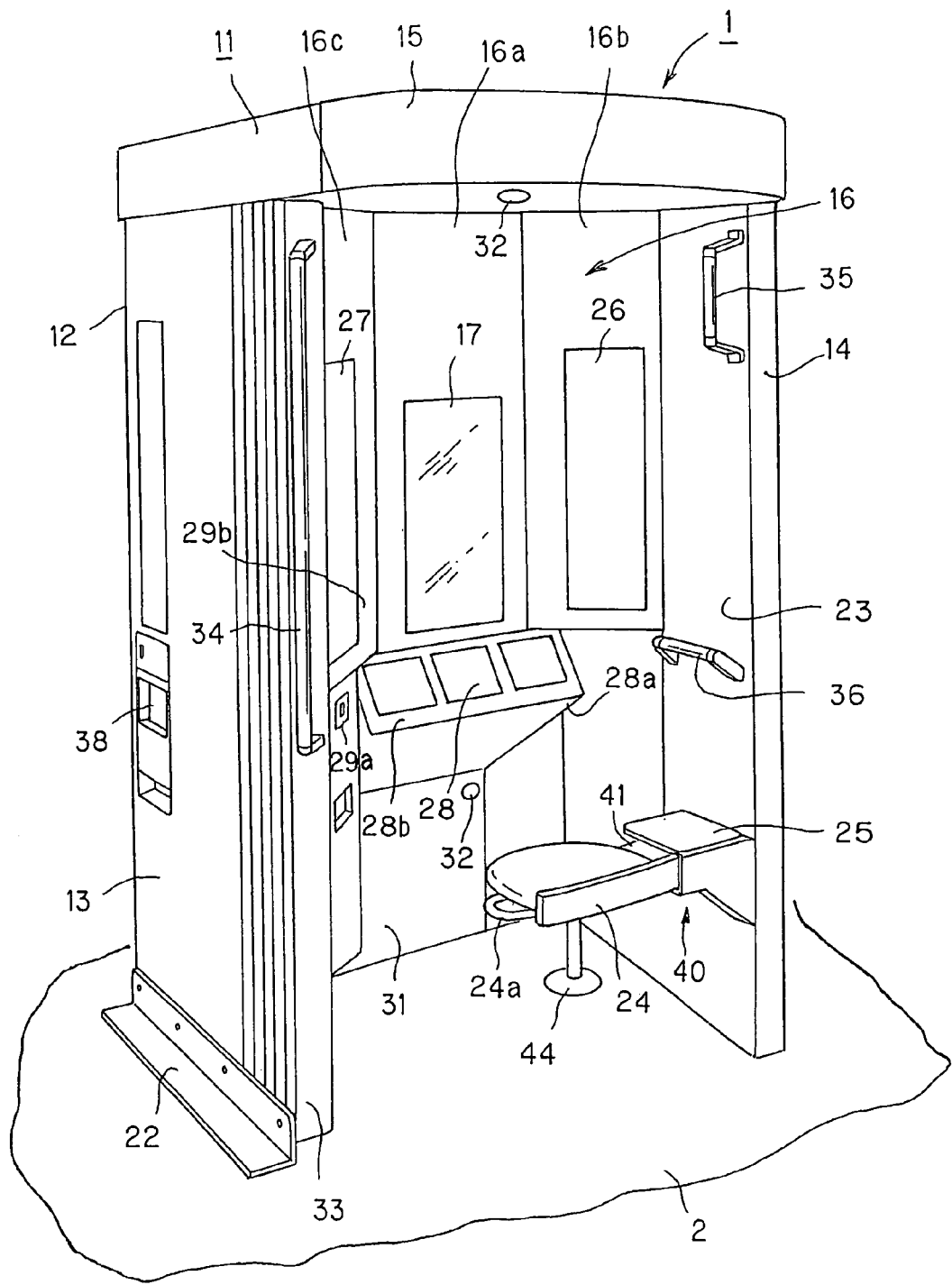
FIG. 3 is a perspective view, from the front, of a photo booth according to the present invention.
Figure 4:
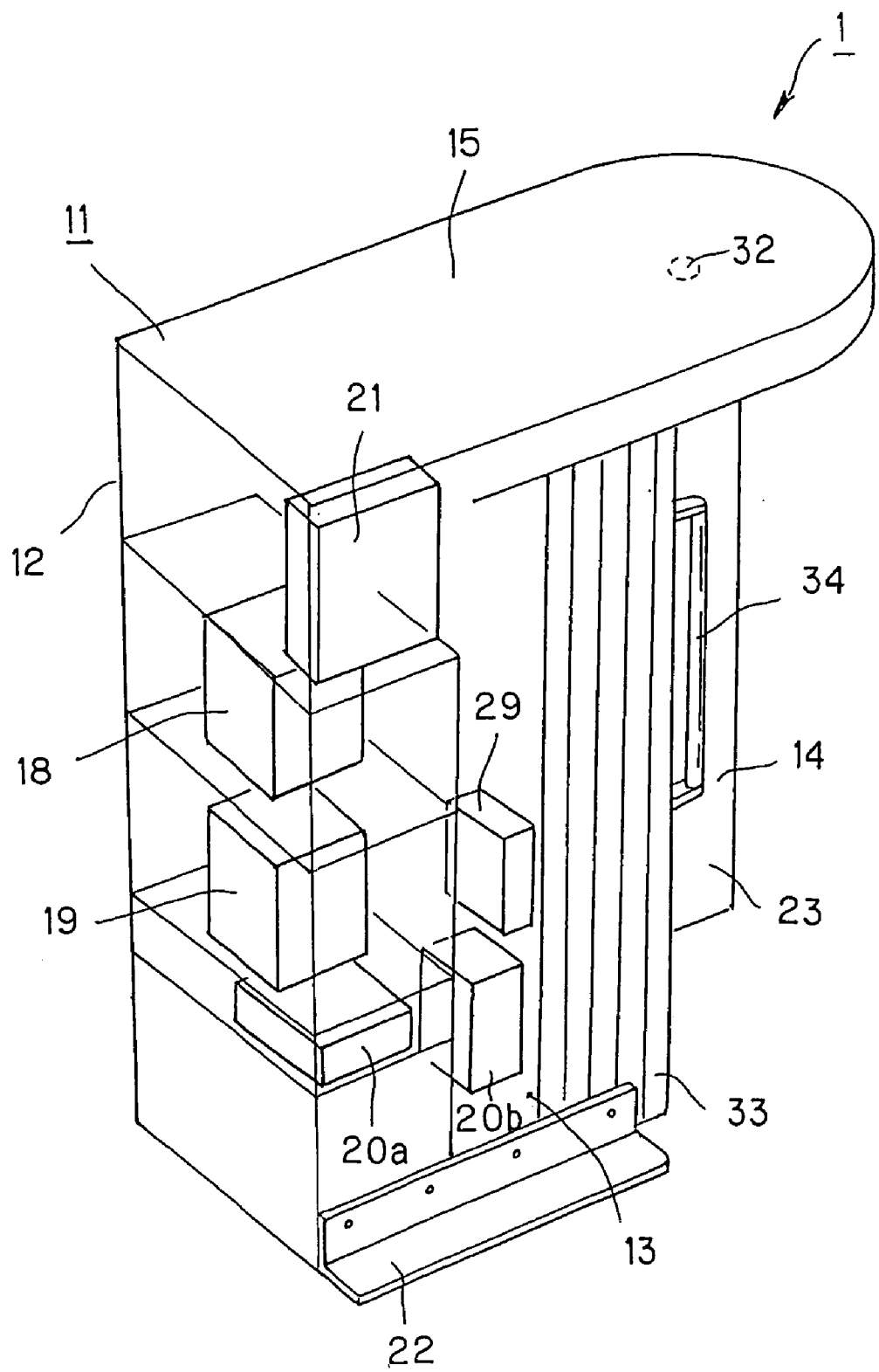
FIG. 4 is also a perspective view, from the back, of the photo booth in FIG. 3.
Figure 5:
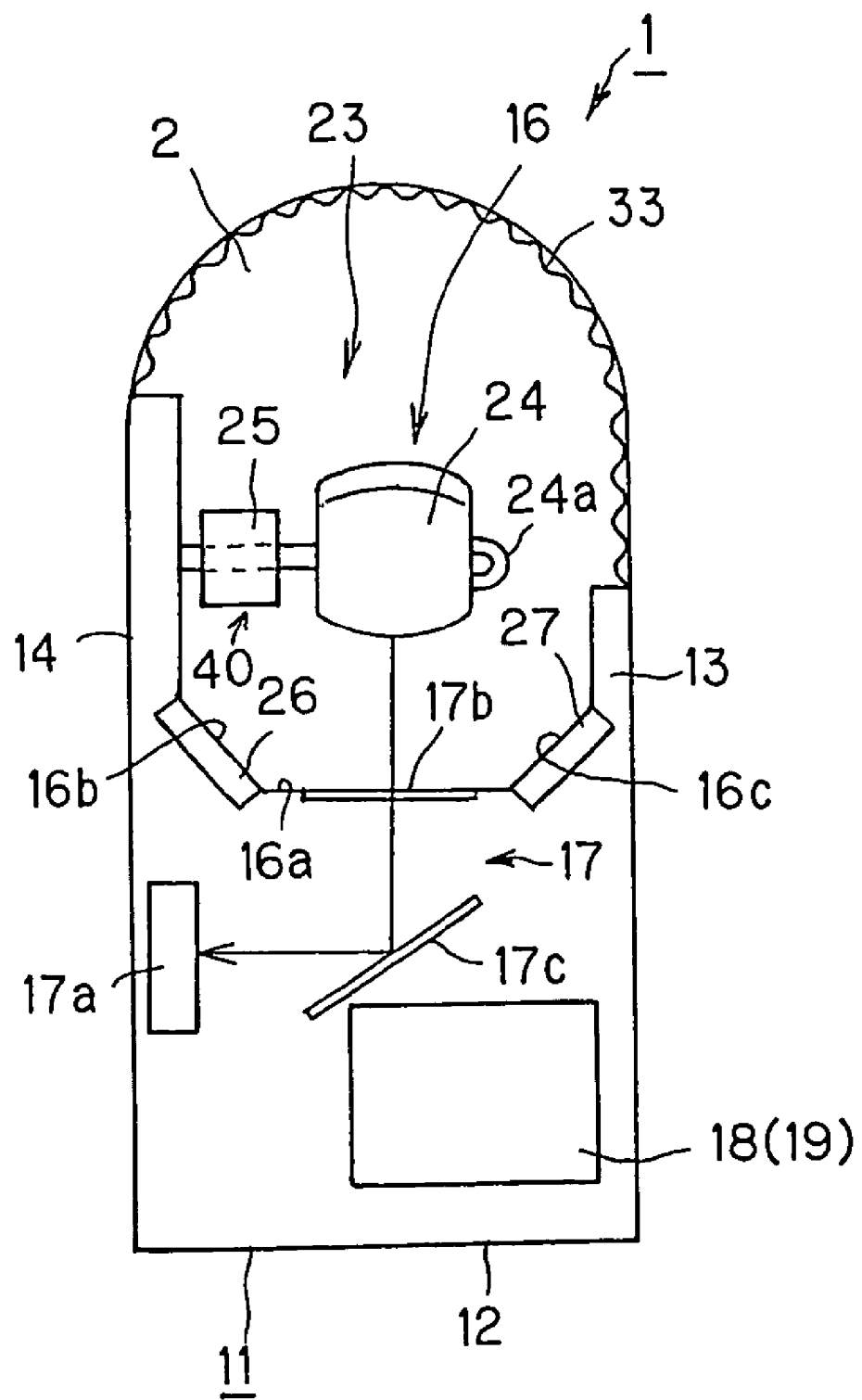
FIG. 5 is a plan view of the photo booth in FIG. 3, showing the interior of the latter.

The photographic apparatus according to the present invention is a photo booth shown in FIGS. 3 to 5. The photo booth is installed in a hospital or the like for use to taking facial portraits of patients. As shown, the photo booth, generally indicated with a reference 1, includes a housing 11 as a body of the photo booth 1. The housing 11 includes a rear panel 12, a pair of side panels 13 and 14 provided across the rear panel 12 oppositely to each other, and a top panel 15 provided at the tops of the side panels 13 and 14 to close, as a ceiling, the upper opening defines by the rear side 12 and side panels 13 and 14. The rear panel 12, side panels 13 and 14 and top panel 15 define together an enclose space that is a photo room or studio 16.

A person as an object having entered the photo studio 16 will first face the rear panel 12. There are provided on the inner side of the rear panel 12 a camera unit 17 to take a picture of the object, printers 18 and 19 to print a picture taken by the camera unit 17, a main circuit board 21 incorporating various electrical circuits including a image processing circuit to effect image processing such as conversion of image signals supplied from the camera unit 17 from analog to digital, a control circuit to control the system operation, etc. The camera unit 17 includes an image input block 17a including an imaging device such as CCD (charge-coupled device), CMOS (complementary metal-oxide semiconductor device) or the like, a half mirror 17b provided on the surface of the photo studio 16, opposite to a person as an object, and a reflecting plate 17c to reflect light having passed pass by the half mirror 17b. When an object is imaged, the half mirror 17b reflects light from the object in a predetermined amount, to thereby permitting the object person to view his or her face, while allowing the remainder of the light to pass by in order to permit the image input block 17a to capture an image of the object. The light having passed by the half mirror 17b is reflected by the reflecting plate 17c toward the image input block 17a which will capture an image of the object with the use of the incident light. Output signals from the image input block 17a are supplied to the image processing circuit in the main circuit board 21 where they will be converted from analog to digital, and the digital data is supplied to the printer 18 or 19.

The first printer 18 is a main printer that is normally used, while the second printer 19 is an auxiliary printer that is to be used when the first printer 18 has gone down. The digitized image data is supplied to the first or second printer 18 or 19 which will print the data on contact paper. In addition, a power switch 20a, safety 20b, etc. are provided on the rear panel 12 included in the housing 11.

The pair of side panels 13 and 14 is installed integrally to the rear panel 12, and disposed across the rear panel 12 generally in parallel to each other. The rear panel 12 and pair of side panels 13 and 14 are formed from a material having a relatively large specific gravity, such as steel panel, to make the lower portion of the housing 11 heavier. Thus, the housing 11 can be installed stably on a surface of installation 2. Of the pair of side panels, one (13) is formed narrower than the other side panel 14. The housing 11 is installed with the wider side panel 14 placed along a wall. The narrower side panel 13 has fixed thereto an overturn-preventive member 22 used to fix the housing 11 to the installation surface 2. The overturn-preventive member 22 is fixed, by screwing or otherwise, to the installation surface 2 to secure the side panel 13 to the installation surface 2. Even if the housing 11 is pressed from the side of the side panel 13, the overturn-preventive member 22 prevents the housing 11 from being turned over. Since the other side panel 14 is formed wider than the other side panel 13, it can support the housing 11 satisfactorily even if a force is applied to the latter from the side of the side panel 13.

The top panel 15 installed on the pair of side panels 13 and 14 forms the ceiling of the photo studio 16. The top panel 15 is formed to have a length nearly equal to, equal to, or somewhat larger than, the width of the wider side panel 14. The top panel 15 is formed from a resin material such as polypropylene. That is, the top panel 15 is formed from a material smaller in specific gravity than the material of the side panels 13 and 14. Since the side panels 13 and 14 are formed from a material having a relatively large specific gravity while the top panel 15 is formed from a material having a relatively small specific gravity, which results in a heavier lower portion of the housing 11. This assures a stable installation of the housing 11 to the installation surface 2.

The photo studio 16 is defined by the pair of side panels 13 and 14 and top panel 15, formed integrally with the rear panel 12 as above, and has an entrance 23 defined by the front ends of the side panels 13 and 14. A person going to use the photo studio 16 can enter the photo studio 16 from an area extending from the front of the housing 11 to the front end of the side panel 13. Since the housing 11 includes no floor panel, the installation surface 2 is the floor surface of the photo studio 16. Namely, there is no step at the entrance 23 of the photo studio 16 and thus a patient in a wheelchair or the like can enter the photo studio 16 without having to get off the wheelchair.

The photo studio 16 will be described in detail below. In the photo studio 16, there is provided a chair 24 pivoted to the wider side panel 14 as shown in FIG. 3. The chair 24 is to be used by a person going to use the photo studio 16. In case a patient in a wheelchair is going into the photo studio 16 through the entrance 23 while keeping himself or herself sitting on the wheelchair, the chair 24 will be an interference to him or her. On this account, the chair 24 is designed so that it can be pivoted toward the front end of the side panel 14. Namely, the chair 24 can be put aside to an parking position outside the photo studio 16. With the chair 24 being placed in the parking position outside the photo studio 16, the patient in the wheelchair can smoothly enter the photo studio 16. The chair 24 has a seat nearly as high as that of the wheelchair. The camera unit 17 is fixed for the purpose of simplifying its mechanism, and it cannot be changed in position. The photo studio 16 will be used by persons including those in wheelchairs and those not in wheelchairs, and there will be a difference in height of the face between the latter and former users. Since the seat of the chair 24 is set nearly as high as that of the wheelchair, the face of the user in the wheelchair will be at a height almost the same as that of the face of the user not in any wheelchair. Thus, the camera unit 17, fixed at a height, can positively cover the face of the user of the photo studio 16. An addition, there is provided adjacent to the chair 24 a small table 25 on which the user may place his or her belongings such as a bag.

The photo studio 16 has a first wall 16*a* formed perpendicular to the optical axis of the image input block 17*a* included in the camera unit 17. In the photo studio 16, the user sitting on the chair 24 or in a wheelchair will first be opposite to this first wall 16*a*. In a position on the first wall 16*a*, opposite to the face of the user, there is provided a generally rectangular half mirror 17*b* included in the camera unit 17. The half mirror 17*b* is so disposed that a person sitting on the chair 24 or patient in a wheelchair can take a picture of himself or herself while watching his face on the half mirror 17*b*.

Horizontally adjacent to the first wall 16*a* on which the half mirror 17*b* is provided, there are provided second and third walls 16*b* and 16*c* each forming an angle with the first wall 16*a* and opposite to each other. As shown, an illumination unit 26 is provided on the second wall 16*b*, and another illumination unit 27 in pair with the illumination unit 26 is provided on the third wall 16*c*. The illumination units 26 and 27 are used to illuminate the user as an object. Each of the illumination units 26 and 27 has flash lamps provided therein. When taking a picture of the object, the flash lamps are turned on for a flash photography. Conventional illumination units are disposed to project light to an object from the upper front of the latter. However, the illumination units 26 and 27 are disposed to project light to an object obliquely from the right front and left front of the latter. Thus, it is possible to prevent any difference in illumination from taking place between the forehead and jaw of the object's face, namely, between the upper and lower portions of the face, and hence make any wrinkles on the face unnoticeable through prevention of the wrinkles from causing any shadows.

Figure 6:
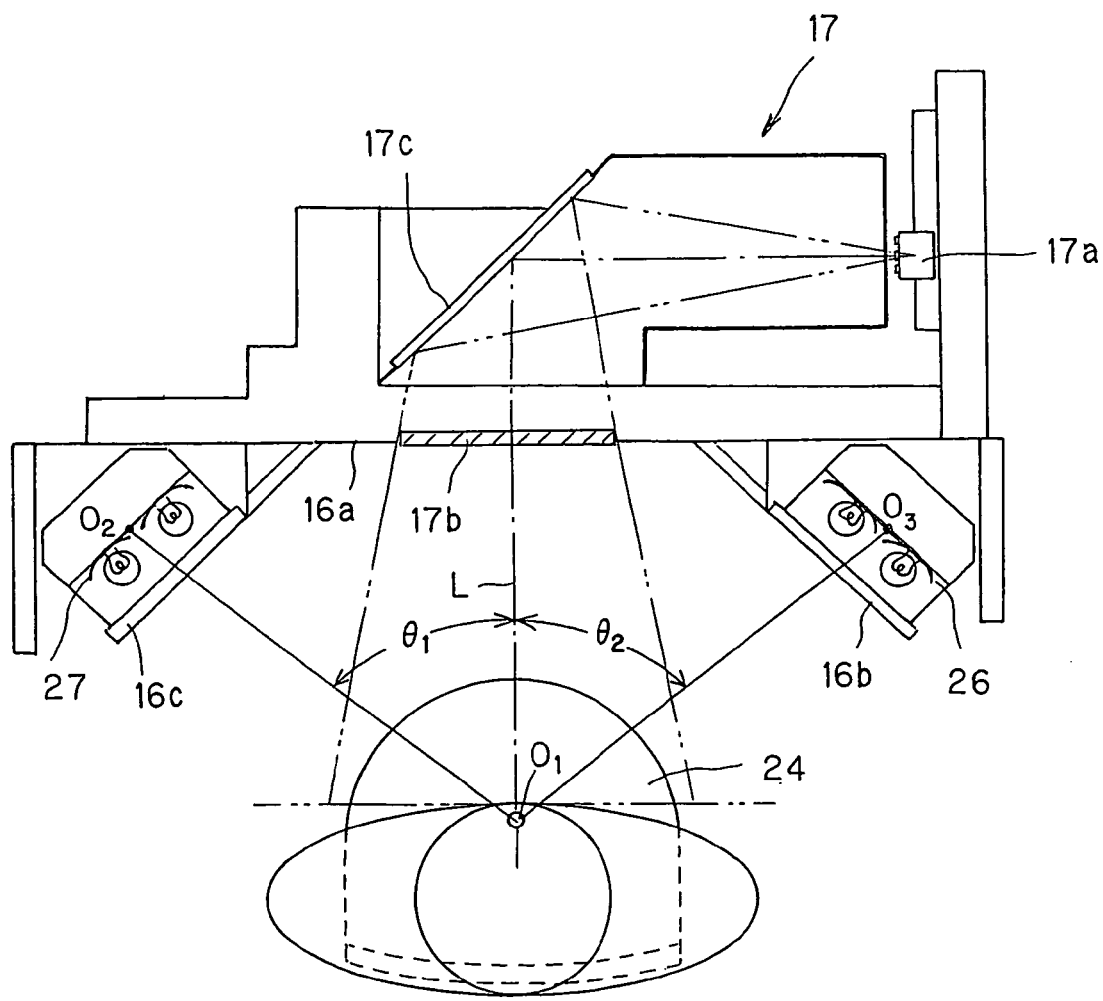
FIG. 6 is a plan view of the photo booth in FIG. 3, a pair of illumination units provided inside the latter.

The illumination unit 26 on the second wall 16*b* and illumination unit 27 on the third wall 16*c* are disposed so that a line connecting the optical axis L of the image input block 17*a* and center $O_1$ of the chair 24 forms an angle $\theta_1$ with a line connecting the center $O_1$ of the chair 24 and center $O_2$ of the illumination unit 26 while forming an angle $\theta_2$ with a line connecting the center $O_1$ of the chair 24 and center $O_3$ of the illumination unit 27, as shown in FIG. 6. The angles $\theta_1$ and $\theta_2$ are set to such a magnitude that when the flash lamps are turned on at the time of a photography, the light from the lamps will not yield any excessive shadow on the object's face, will not be reflected at a pair of spectacles, if any, put on the object's face and will not easily cause a background shadow. The angles $\theta_1$ and $\theta_2$ should be 30 to 70 deg. and more preferably be 50 deg.

Generally, a facial portrait, having a difference in illumination between the right and left halves thereof, will appear definite. On this account, one of the illumination units 26 and 27 should illuminate the object with more light than the other. For example, the ratio of illumination between the illumination units 26 and 27 should be 1:1.5 to 1:3, or more preferably be 1:2. It should be noted that either of the illumination units, 26 or 27, may provide more light. Thus, the shadow in the picture will be smooth and also an object image in the picture will not appear flat but have more depth. It should be noted that the photo booth 1 employs a CCD as the image input block 17*a* of the camera unit 17. The CCD is narrower in latitude than a camera using a silver film (silver-film camera). On this account, the ratio in illumination between the illumination units 26 and 27 is set smaller than in the silver-film camera.

Further, the photo studio 16 has provided therein, in addition to the illumination units 26 and 27, a third illumination unit 28 to illuminate the object from below. The illumination unit 28 is provided on an upper surface 28*b* of a block 28*a* projected inwardly of the photo studio 16 and below the half mirror 17*b* on the first wall 16*a*, and thus it projects light obliquely upward.

Also, in addition to the illumination units 26, 27 and the like, a fare box 29 as a control unit is provided on the side panel 13 in a position obliquely opposite to a user as an object sitting on the chair 24 in the photo studio 16 as shown in FIGS. 3 to 5. The fare box 29 includes a coin slot 29*a* through which a coin is to be dropped into the fare box 29, and a bill slot 29*b* through which a bill is to be put into the fare box 29. The coin and bill slots 29*a* and 29*b* are located each at a height where the user sitting on the chair 24 can easily put a coin (bill) into the slot. Since the seat of the chair 24 is set as high as the seat of the wheelchair, a person in a wheelchair can also easily put a coin (bill) into the fare box 29. It should be noted that in this embodiment, only the fare box 29 is provided as a control unit but there may additionally be provided an exposure button to start a photography, preview check button to check an captured image before it is printed at the printer 18 or 19, and the like. In this case, these additional buttons are provided on the side panel 13 oppositely to the object.

Under the projecting block 28*a*, there is provided a positioning recession 31 intended for positioning the object for photography. The positioning recession 31 is located at a height where the user sitting on the chair 24 or in a wheelchair can place the knees in the recession 31. When taking a picture, the user sitting on the chair 24 or in a wheelchair entering the photo studio 16 from the entrance 23, can easily position himself or herself for a photography by placing the knees into the positioning recession 31. That is, by placing the knees into the positioning recession 31, the user will position himself or herself to face the front of the half mirror 17*b*.

Further, the photo studio 16 has provided therein an object detector 32 that detects whether a user as an object has entered the photo studio 16. The object detector 32 is provided on the lower side of the top panel 15 and above the chair 24 to detect an object in place for photography. When having detected an object, the object detector 32 provides a signal of the detection to the control circuit in the main circuit board 21 which will switch the mode of operation from standby to photography.

The object detector 32 may be provided inside the aforementioned positioning recession 31. The object detector 32 provided on the lower side of the top panel 15 will catch a person as an object standing inside the photo studio 16 but not actually in place for photography, for example. However, the object detector 32 provided in the positioning recession 31 can positively detect an object in exposure position because it cannot detect any person as an object not having the knees placed in the recession 31.

Figure 7:
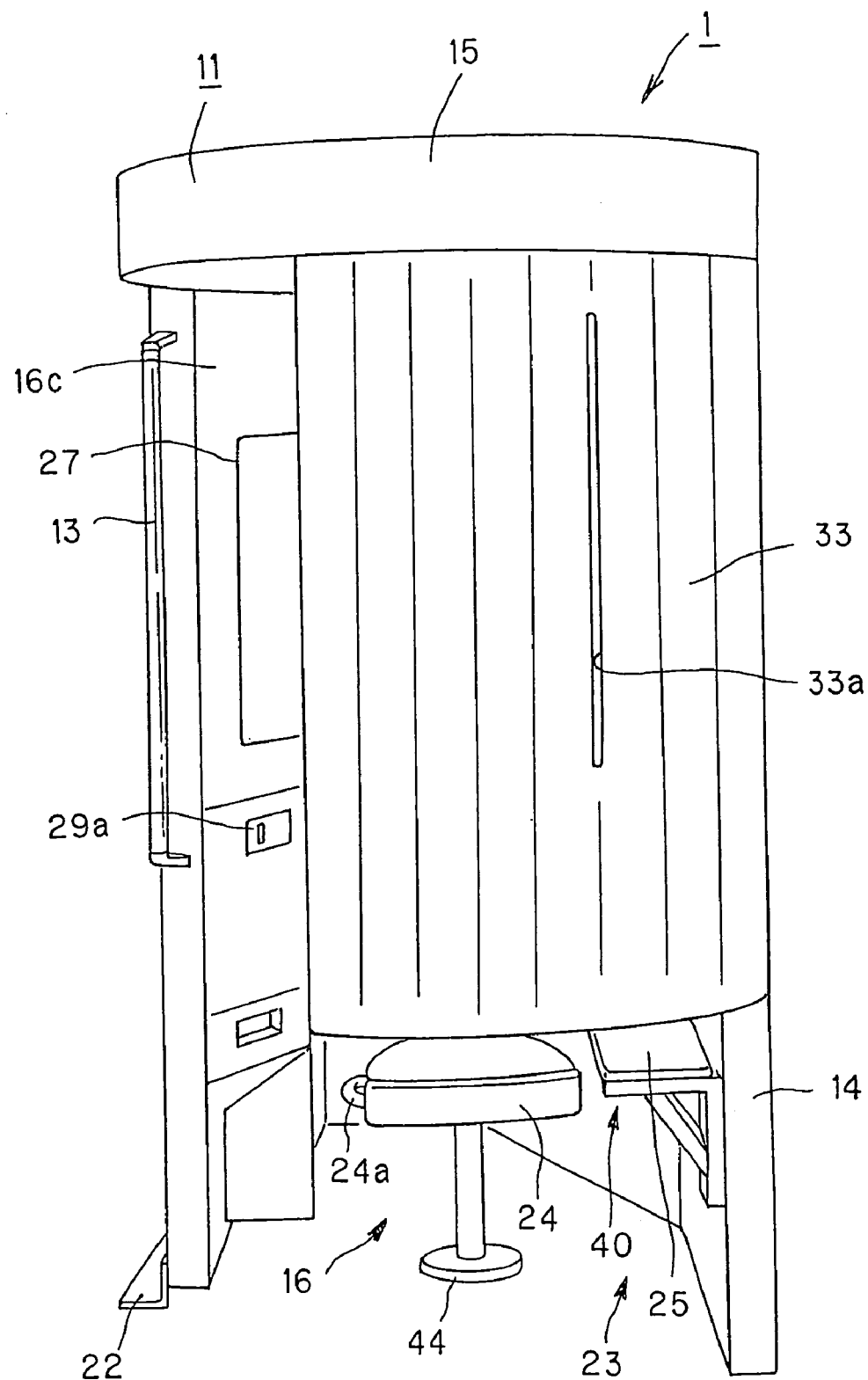
FIG. 7 is a front view, from the front, of the photo studio in FIG. 3, showing the latter closed by a curtain.

At a portion of the top panel 15 at the entrance 23, there are provided a curtain rail, hooks or the like (not shown). A shade curtain 33 is provided to depend from the curtain rail or hooks, and permits to close and open the entrance 23. The curtain 33 is a light-proof one to intercept external light to the photo studio 16 at the time of photography. The curtain 33 can easily be moved to one side of the entrance 23 as shown in FIGS. 3 and 7 to allow a person to enter or go out of the photo studio 16. In case the curtain 33 is provided to depend from hooks, a slit 33*a* is formed in the curtain 33 to permit curtain parts thus resulted to easily be moved to both entrance-side ends of the side panels 13 and 14, thereby permitting an easier entrance into the photo studio 16. The area of the curtain 33, forming the inner wall of the photo studio 16 at the back of an object existing inside the photo studio 16, will also form a background of a picture of the object. On this account, the slit 33a is formed in other than the area of the curtain 33 that will be the background of the picture.

Note that the light-proof member may be formed from a plate or the like in place of the above-mentioned curtain 33.

As shown in FIG. 3, a first handrail 34 is provided vertically on the generally central area of the end face of the narrower side panel 13 forming the entrance 23. The first handrail 34 will help a physically handicapped person such as a crutched patient or a patient in a wheelchair, for example, to easily enter the photo studio 16 from the entrance 23. Also, a second handrail 35 is provided vertically at an upper portion of the wider side panel 14 forming the entrance 23 along the entrance-side end of the latter. This second handrail 35 will help a crutched patient, for example, to easily enter the photo studio 16 from the entrance 23. Further, a third handrail 36 is provided horizontally on the side panel 14 near the entrance-side end of the latter at a height nearly equal to that of the fare box 29 that is also the controller. The third handrail 36 will held a person sitting on the chair 24 or in a wheelchair, for example, to reposition himself or herself easily for photography.

Note that on the outer surface of the narrower side panel 13, there is provided a photo outlet 38 to which a photo printed by the printer 18 or 19 is delivered.

Figure 8:
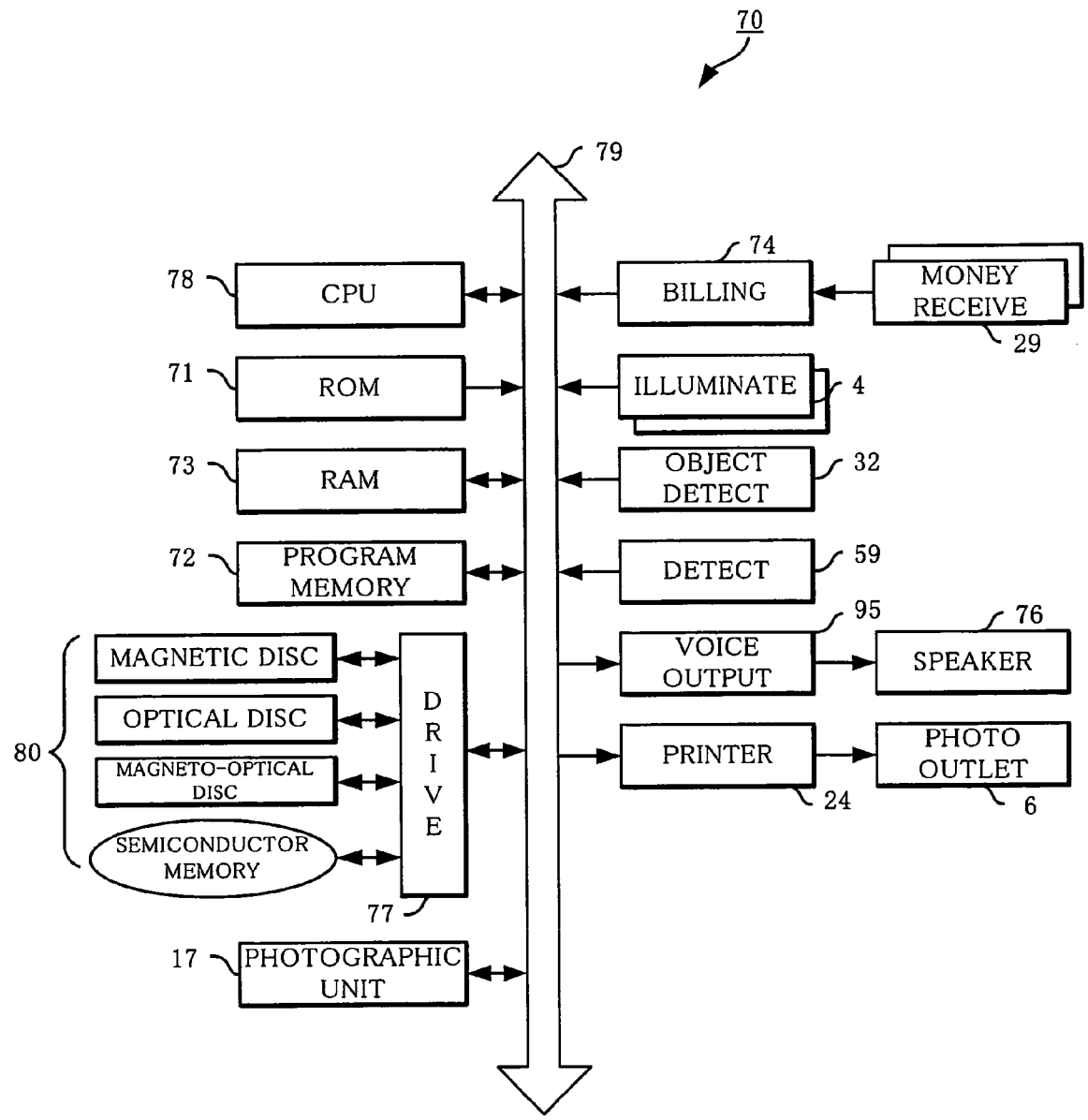
FIG. 8 is a block circuit diagram of a control circuit included the photo booth in FIG. 3.

Next, the control circuit incorporated in the main circuit board 21 built in the rear panel 12 will be described with reference to FIG. 8. As shown, the control circuit, generally indicated with a reference 70, includes a ROM (read-only memory) 71 having stored therein a program necessary for the operation of the apparatus, a program storage unit 72 formed from a hard disk or the like and having stored therein an application program necessary for the apparatus operation, a program for an image extraction that will be described in detail later and similar programs, a RAM (random-access memory) 73 to which any of the programs stored in the ROM 71 and program storage unit 72 is loaded, a billing unit 74 that judges the amount of money put in the fare box 29 and makes a corresponding accounting, an voice output unit 75 that provides a voice or sound output, a speaker 76 that provides audio data as an audible sound, a drive 77 in which an external storage unit is loaded, and a CPU (central processing unit) 78 to provides a system control. These components are connected to each other via a bus 79. Also, the bus 79 has connected thereto the image input block 17a included in the camera unit 17, illumination units 26, 27 and 28, object detector 32 that detects when a person as an object has entered the photo studio 16, a detector 59 to detect when the chair 24 is in the parking position outside the photo studio 16, etc.

Figure 9:
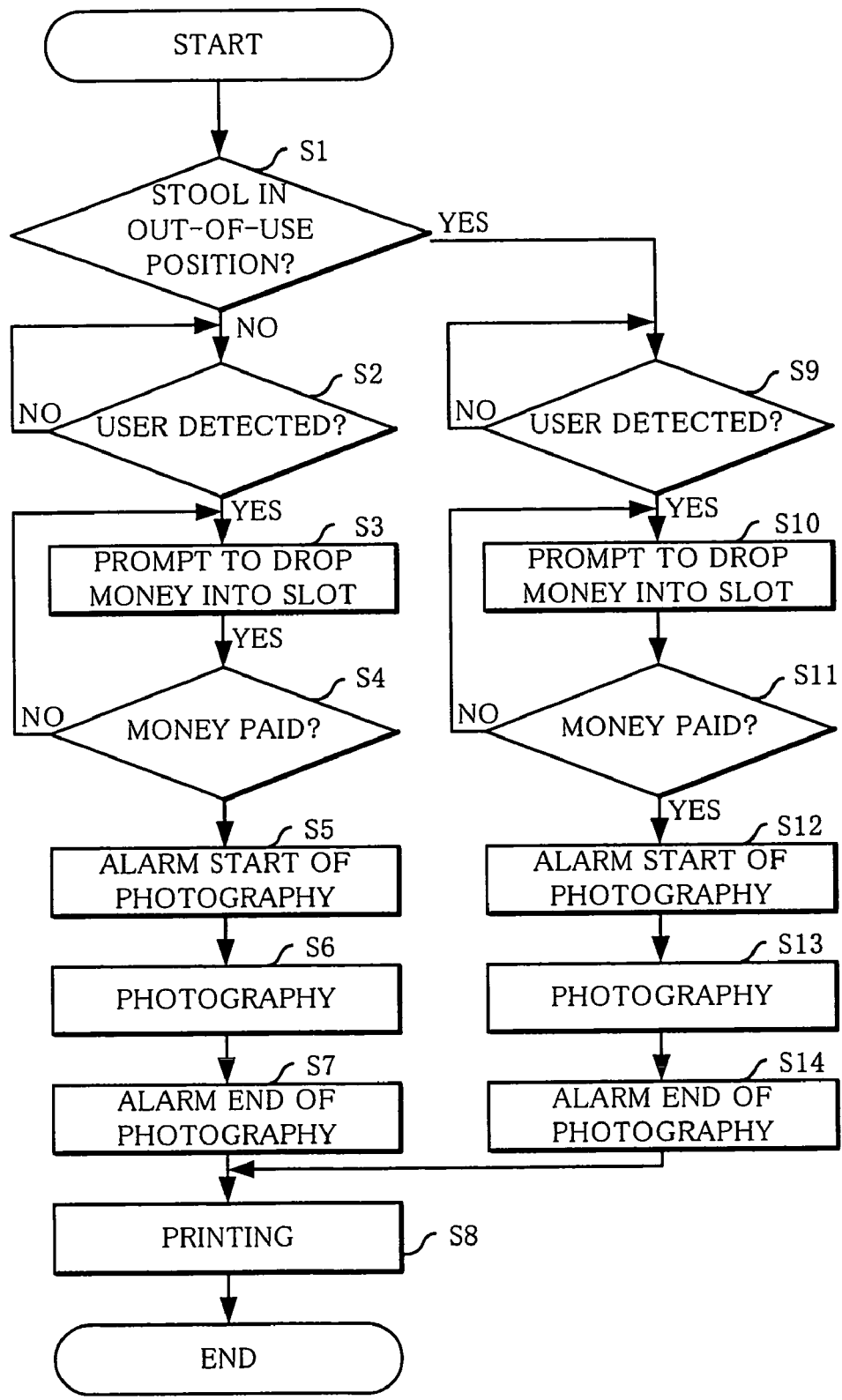
FIG. 9 shows a flow of operations made in the control circuit.

The photo booth 1 configured as above operates as will be described below with reference to FIG. 9. In step S1, the CPU 78 judges whether the chair 24 is in the parking position outside the photo studio 16, that is, whether the chair 24 is generally parallel to the side panel 14, and a wheelchair can easily enter the photo studio 16. When the CPU 78 determines that the chair 24 is not in the parking position, that is, it stays inside the photo studio 16, it goes to step S2 where it will select a normal mode of operation in which a person as an object sitting on the chair 24 is photographed. On the contrary, when the CPU 78 determines that the chair 24 is in the parking position, it goes to step S9 where it will select a mode of operation in which a person as an object in a wheelchair is photographed (this mode of operation will be referred to as "wheelchair-dedicated mode of operation" hereunder for the convenience of explanation wherever appropriate). The wheelchair-dedicated mode of operation is set to be performed for a longer time than the normal mode of operation because a person in a wheelchair normally needs a longer time for positioning himself or herself for photography than a person not in any wheelchair.

In the normal mode of operation, the CPU 78 judges in step S2 whether the user, namely, a person as an object, is already in place for photography, More particularly, the object detector 32 formed from an infrared sensor or the like detects whether an object person in a wheelchair is in place for photography, namely, whether he or she sitting on the chair 24 has the knees placed in the positioning recession 31. When the CPU 78 detects that the object detector 32 has detected an object person in a wheelchair is in place for photography, it goes to step S3. On the contrary, if the CPU 78 does not detect so, it will repeat step S2.

In step S3, the CPU 78 controls the voice output unit 75 to give the object person a prompt to put the fare money into the fare box 29. That is, the voice output unit 75 will provide a message like "Put fare into fare box, please" by audible sound from the speaker 76.

Then, the object person will put a specified fare money into the fare box 29. At this time, the object person can easily put the fare money into the fare box 29 while sitting on the chair 24 or in a wheelchair because the fare box 29 is installed in a position within a range of easy access thereto. Also, since the fare box 29 is provided on the narrow side panel 13, an attendant of the person in a wheelchair can also easily get access to the fare box 29 from the entrance 23 and thus easily put the fare money into the fare box 29.

In step S4, the CPU 78 judges whether the fare money has been put into the fare box 29. More particularly, the billing unit 74 determines the amount of money put into the fare box 29. If the amount of money is smaller than the specified fare, the billing unit 74 will request the object person for putting an additional money into the fare box 29. On the other hand, if the amount of money put into the fare box 29 is excessive, the billing unit 74 will pay back a due change. Then, the billing unit 74 will inform the CPU 78 that the billing is complete, whereby the CPU 78 will judge whether the billing is over. If the CPU 78 determines that no billing is complete, it will go back to step S3 where it will control the voice output unit 75 to repeat the prompt to put a due fare money into the fare box 29.

In step S5, the CPU 78 will control the voice output unit 75 to announce the start of photography. The voice output unit 75 will provide an announcement like "Photography will start soon" by audible sound from the speaker 76.

In a predetermined time, the CPU 78 will make photography of the object person in step S6. The image input block 17a driven by the CPU 78 will convert incident light into an electrical signal and output the signal. At this time, the illumination units 26, 27 and 28 emit light from their lamps. The illumination units 26 and 27 are disposed to project light to the object person obliquely from the right front and left front of the latter, so that when whereby a picture of the object person is taken, any difference in illumination can be prevented from taking place between the forehead and jaw of the person's face, namely, between the upper and lower portions of the face, and that any wrinkles on the face can be made unnoticeable through prevention of the wrinkles from causing any shadows. Also, since the illumination units 26 and 27 are arranged so that one of them illuminates the object with more light than the other, the shadow in the picture will be smooth and also a resultant image of the object in the picture will have more depth.

In step S7, the CPU 78 controls the voice output unit 75 to announce that the photography is complete. The voice output unit 75 will provide an announcement like "Photography is over" by audio sound from the speaker 76.

In step S8, the CPU 78 supplies output data from the image input block 17a to the first or second printer 18 or 19 which will print an image on contact paper on the basis of the input data. Then, the first or second printer 18 or 19 will deliver an image-printed contact paper to the photo outlet 38.

Note that when the CPU 78 as determined in step S1 that the chair 24 is in the parking position, it selects the wheelchair-dedicated mode of operation and go through steps S9 to S14. Since these steps S9 to S14 are generally identical to steps S2 to S6, they will not be described herein. However, it is should be noted that step S13 will take a longer time from the announcement of photography start in step S12 until the actual start of photography than in step S6 because the object person in a wheelchair will take a longer time for positioning himself or herself for photography than a person not in any wheelchair.

Also, when it is determined in step S1 that the chair 24 is not in the parking position but used in place, namely, that the chair 24 is set in place for photography inside the photo studio 16, a linkage (not shown) connecting a chair fixing member 41 and chair support member 44 to each other is generally perpendicular to the installation surface 2 and is supporting the chair 24. In such a case, when the chair 24 should be put aside for a patient in a wheelchair to enter the photo studio 16, the patient is to hold a handgrip 24a and pivot the chair 24. When the chair 24 is pivoted to the side panel 14, the chair support member 44 secured via a pivot (not shown) to the chair fixing member 41 to be rotatable is pivoted. When the chair 24 is further pivoted to a position where it is generally parallel to the side panel 14, it will be retained by a retention mechanism (not shown) that retains the chair 24 in a parking zone defined at the front end of the side panel 14. Thus, the chair 24 is held in the parking zone generally parallel to the side panel 14.

The chair retention mechanism includes a retention member fixed to a support piece provided integrally on the side panel 14 and that is supported at the middle thereof pivotably on the support piece via a pivot. The retention member has provided at one end thereof an engagement projection that is engaged on the chair 24 and at the other end a pressing piece that presses the aforementioned detector 59 (shown in FIG. 7) that detects when the chair 24 is in the parking position. When the detector 59 is pressed by the pressing piece of the retention member, it will detect that the chair 24 is in the parking position.

The aforementioned drive 77 can have loaded therein a removable recording medium 80 such as a recordable or rewritable optical disk, magneto-optical disk, magnetic disk, IC card and the like loaded therein. The removable recording medium 80 stores image data on an object, picked up by the camera unit 17, for example. The image data stored in the removable recording medium 80 can be read by any other information processor and used as a facial portrait of a patient in an electronic medical chart or the like. The image data on a patient is thus distributed as a record in the removable recording medium 80 to the other information processor. Alternatively, the image data can be sent to the other information processor via a transmitter/receiver connected to a network such as LAN (local area network) or the like. Also, the drive 77 may have loaded therein the removable recording medium 80 such as a ROM type optical disk to install, to the program storage unit 72, an application program necessary to operate the photo booth 1 according to the present invention. Of course, such an application program may be downloaded via the transmitter/receiver for installation to the program storage unit 72 or the like.

In the photo booth 1 configured as above according to the present invention, since the floor of the photo studio 16 is the surface of installation 2, no step will interfere with any patient sitting on a wheelchair or the like and who is going to take a picture of himself or herself in the photo studio 16, and thus the patient can smoothly enter the photo studio 16 while keeping himself or herself sitting on the wheelchair. The photo booth 1 is to be installed in a hospital or the like, and hence it will be used by not only the normal but also a patient in a wheelchair and crutched patient. Such a wheelchair going to enter the photo studio 16 from the entrance 23 will possibly collide with the side panel 13, for example. In the photo booth 1 according to the present invention, however, since the other side panel 14 is formed wider than the side panel 13, the side panel 13 is fixed to the installation surface 2 with the overturn-preventive member 22 and the top panel 15 is formed from a material smaller in specific gravity than the side panels 13 and 14 so that the housing 11 has the center of gravity at a lower portion thereof, the photo booth 1 can positively be prevented from being displaced or turned over even when the user or wheelchair going to enter the photo studio 16 collides with the housing 11. Further, the first to third handrails 34 to 36 provided as above will effectively help the user to easily enter the photo studio 16 and position himself or herself for photography in the photo studio 16.

In the photo booth 1, the chair 24 can be pivoted to the parking position from inside the photo studio 16. Therefore, a patient in a wheelchair can put aside the chair 24 to the parking position and enter the photo studio 16 without having to get off the wheelchair or while keeping himself or herself sitting in the wheelchair. When placed in the photo studio 16, the chair 24 is securely supported on the chair support member 44 and so a patient or the like as an object can stably seat himself or herself on the chair 24. Also, the handgrip 24a is provided at the side of the chair 24, opposite to the narrow side panel 13, and thus it is located at the entrance 23. Thus, the patient in a wheelchair or an attendant of this patient can easily hold the handgrip 24a and pivot the chair 24 to the parking position. Further, the fare box 29 is located on the side panel 13, namely, near the entrance 23. Thus, the attendant of a patient in a wheelchair can easily get access to the fare box 29 from the entrance 23 to put the fare money into the latter.

Also, in the photo booth 1, the illumination units 26 and 27 are disposed to project light to the object person obliquely from the right front and left front of the latter so that when a picture of an object person is taken, any difference in illumination can be prevented from taking place between the forehead and jaw of the person's face, namely, between the upper and lower portions of the face, and that any wrinkles on the face can be prevented from causing shadows. Also, since the illumination units 26 and 27 are arranged so that one of them illuminates the object with more light than the other, the shadow in the picture will be smooth and also a resultant image of the object in the picture will have more depth.

Moreover, by pivoting the chair 24 to a position where it is generally parallel to the side panel 14 and outside the photo studio 16, the photo booth 1 is set to the "wheelchair-dedicated mode of operation" and the time from the audible alarming of the start of photography until the exposure can be increased correspondingly, and thus, a person in a wheelchair may slowly position himself or herself for photography. Generally, such a user will take a longer time in positioning himself or herself for photography than a user not in any wheelchair.

Next, there will be illustrated and described the image extracting apparatus included in the aforementioned photographic apparatus or photo booth.

The image extracting apparatus according to the present invention is to extract a face region of a person in an input image according to a program stored in the aforementioned program storage unit 72 in the control circuit 70 and trim the face region. FIG. 10 is a block circuit diagram of the image extracting apparatus according to the present invention.

As shown in FIG. 10, the image extracting apparatus, generally indicated with a reference 100, includes an image input unit 101 which is supplied with a color image of a person or user from the aforementioned camera unit 17 and outputs it as digital data, a flesh-color region extraction unit 200 which is supplied with the digital image data from the image input unit 101 and detects a flesh-color region from the image data, an object-image detection unit 300 that detects an object image in the detected flesh-color region, and a trimming unit 400 that trims the detected object image. The flesh-color region extraction unit 200 and object-image detection unit 300 form together a face-region extracting means that extracts a face region of a person from an input image.

Figure 11:
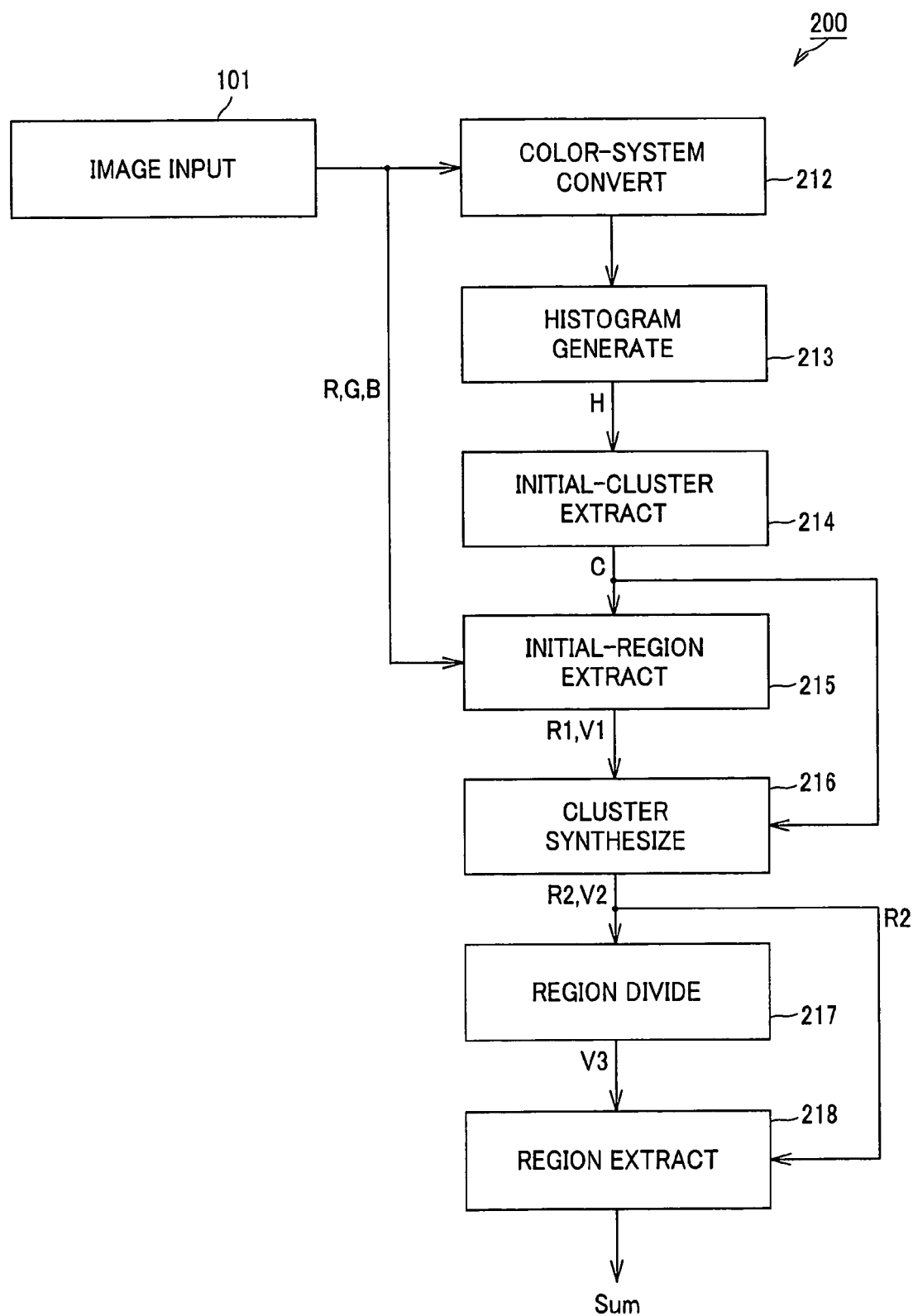
FIG. 11 is a block circuit diagram of a flesh-color region extraction unit included in the image extracting apparatus according to the present invention.

As shown in FIG. 11, the flesh-color region extraction unit 200 includes a color-system conversion unit 212 that converts each pixel value of a color image supplied from the image input unit 101 into a coordinate value in a color space, a histogram generation unit 213 that generates a histogram representing a frequency of appearance of the coordinate value in the color space, an initial-cluster extraction unit 214 that extracts each maximum point of the frequency of appearance and pixels existent near the maximum point in the histogram as an initial cluster, an initial region extraction unit 215 that extracts a closed region including the initial cluster extracted by the initial-cluster extraction unit 214 from the initial cluster and color image supplied from the image input unit 101, a cluster synthesis unit 216 that synthesizes, as one cluster, a plurality of extracted initial clusters, if any, included in the initial region, a region dividing unit 217 that divides the initial region into a plurality of sub regions correspondingly to a distribution of the pixels in the initial region, and a region extraction unit 218 that extracts a region including pixels belonging to a cluster corresponding to a flesh color of the human being. The flesh-color region extraction unit 200 supplies a floor-flesh region thus extracted to the object-image detection unit 300.

As shown in FIG. 12, the object-image detection unit 300 includes a head-top detector 313 which is supplied with a color image and flesh-color region from the image input unit 101 and flesh-color region extraction unit 200, respectively, and detects the head top of the person's image, a mouth extraction unit 314 which is supplied with the flesh-color region and color image and detects the mouth of the person's image, a eye detector 315 which is supplied with the color image, flesh-color region and head-top and mouth data and detects the eyes of the person's image, a jaw detector 316 which is supplied with the eye and mouth data and calculates the eye position from the eye and mouth data, a center-line detector 317 which is supplied with the color image and mouth and eye data and detects the center line of the person's face, a region correction unit 318 which is supplied with the head top, eye, jaw and face center line data and corrects the face region, and a judgement unit 319 which is supplied with the color image, flesh-color region, eye and mouth, and the corrected data from the region correction unit 318 and judges whether an extracted flesh-color region V is the person's face. The object image detection unit 300 supplies the flesh-color region judged to be the person's face to the trimming unit 400.

Note that in case the person's face image is judged in the flesh-color region extraction unit 200 or object-image detection unit 300 to have a plurality of regions, one of the regions may be selected. For example, assume here that there is a possibility that a picture includes a plurality of persons. In this case, if it is expectable on ground of an instruction given for the photography that a person's face, to be trimmed, in the input image is located nearest to the image center, a person whose center of the extracted face region is nearest to the image center can be selected for trimming. Also, in a case a picture was taken of a child in the bosom of his or her mother or father, the face region of the child can be considered to be in the lowest position of the extracted face region. In this case, one of the face regions, whose center is in the lowest position, can be selected for trimming.

The above method of selecting a to-be-trimmed region is preset with the used mode of operation taken in consideration. Alternatively, an interface (not shown) may be provided for the user to set such a method manually.

The trimming unit 400 is to trim a picture of a person as an object, supplied from the object-image detection unit 300, so that the face region of the image will fall within a range, specified herein, of the effective area of contact paper where the image is to be printed. The specified range has previously been illustrated and described with reference to FIG. 2. In the photo booth 1 configured as above, how a person's image is positioned on contact paper is important in automatically trimming of the image by detecting the face of the person through image processing. More specifically, on the assumption that an image portion extending from the top end of contact paper (effective area) to the person's head top is an overhead region, an image portion extending from the person's head top to the jaw is a face region and an image portion extending from the jaw to the bottom end of the contact paper (effective area) is a chest region, the image is trimmed according to the present invention so that the ratio among the overhead, face and chest regions is 1:0.4 to 0.8:0.1 to 0.26, to thereby provide an easier-to-view and well-balanced certificate picture.

Each blocks of the image extracting apparatus according to the present invention will be described in detail below:

(1) Flesh-Color Region Extraction Unit 200

The flesh-color region extraction unit 200 performs the processes: color-system conversion, histogram generation, initial-cluster extraction, initial-region extraction, cluster synthesis, and region division. First in the color-system conversion process, the color system of an input color image is converted into a coordinate value in a color space. Next in the histogram generation process, there is generated a histogram representing a frequency of appearance of the coordinate value in the color space. Then in the initial-cluster extraction process, the maximum point of the frequency of appearance and pixels near the maximum point in the histogram are extracted as an initial cluster to generate a cluster map C representing a distribution of such initial clusters. In the initial-region extraction process, a cluster number n is assigned to each initial cluster to identify the initial cluster. Next, each of the initial clusters in the cluster map C is converted to a coordinate value in the original color image to form a region map R. Each pixel in the region map R has assigned thereto a coordinate value and cluster number n. Then, there is extracted as an initial region a rectangular closed region in which the distribution density of the pixels belonging to the same initial cluster in the region map R, that is, the pixels having the same cluster number n, is higher than a predetermined threshold. Then in the cluster synthesis process, two arbitrary initial clusters are selected. In case the two initial clusters are near to each other in the cluster map C and belong to rectangular regions, respectively, near to each other in the region map R, they are combined together. Further in the region division process, the region map R is updated on the basis of the synthetic cluster as the combination of the two initial clusters, and the rectangular regions are also re-set on the basis of the updated region map. Next, the density distribution of pixels having the same cluster number n in the re-set rectangular regions is calculated, and the rectangular region is divided as necessary according to the density distribution. Finally, in the final region extraction process, there is set in the input color image a plurality of rectangular regions having the same color, and a rectangular region having a specific color, namely, the flesh color in the present invention, is extracted from the rectangular regions. Each of these processes will be described herebelow.

(1-1) Color-System Conversion Process

In this process, the image data supplied from the image input unit 101 is converted by the color-system conversion unit 212 into a color system suitable for extraction of a desired region. To minimize any over-detection, the image data should preferably be converted into a color system that defines a color space in which a color of a region to be extracted is distributed in a range as narrow as possible. The selection of this color system depends upon the property of the region to be extracted. As in the embodiment of the present invention, an r-g color system given by the following formula (1) is known as one example of the effective color systems for extraction of a face region of a picture of a person:

$$\begin{cases} r = \dfrac{R}{R+G+B} \\ g = \dfrac{G}{R+G+B} \end{cases} \quad (1)$$

where R, G and B indicate coordinate values of an RGB color system. Therefore, in case the image output from the image input unit 101 is presented in the RGB color system, the color-system conversion unit 212 calculates the above formula (1) for each pixel to provide a coordinate value (r, g). The image data whose color system has thus been converted is sent to the histogram generation unit 213.

Note that an example in which a region is extracted using the r-g color system will be described. Also, a value in a position (coordinate) (x, y) in an input color image will be given by {r(x, y), g(x, y)}.

(1-2) Histogram Generation Process

In the histogram generation process, the histogram generation unit 213 generates a two-dimensional histogram indicating the frequency of appearance, in a color space, of data {r(x, y), g(x, y)} having the color system thereof converted by the color-system conversion unit 12. The histogram is generated only about a color range in which the color of a region to be extracted is satisfactorily included. Such a color range can be given by the following formula (2) by determining upper and lower limits of each of values r and g, for example:

$$\begin{cases} r\min \le r \le r\max \\ g\min \le g \le g\max \end{cases} \quad (2)$$

wherein rmin and rmax indicate lower and upper limits, respectively, of the value r and gmin and gmax indicate lower and upper limits, respectively, of the value g, and int indicates a calculation to round down a part below decimal point.

In case data {r(x, y), g(x, y)} in a position (x, y) in an image meets the condition given by the formula (2), the values are quantized as given by the following (3) and converted into a coordinate value (ir, ig) in the histogram.

$$\begin{cases} ir = \text{int}\left(\dfrac{r - r\min}{rstep} + 0.5\right) \\ ig = \text{int}\left(\dfrac{g - g\min}{gstep} + 0.5\right) \end{cases} \quad (3)$$

where rstep and gstep indicate steps of quantizing the values r and g, respectively, and int indicates a calculation to round down a part below decimal point.

Next, there is generated a two-dimensional histogram H indicating the frequency of appearance of a coordinate value by incrementing, by the following formula (4), a histogram value corresponding to the calculated coordinate value:

$$H(ir(x,y), ig(x,y)) = H(ir(x,y), gi(x,y)) + 1 \quad (4)$$

Figure 13:
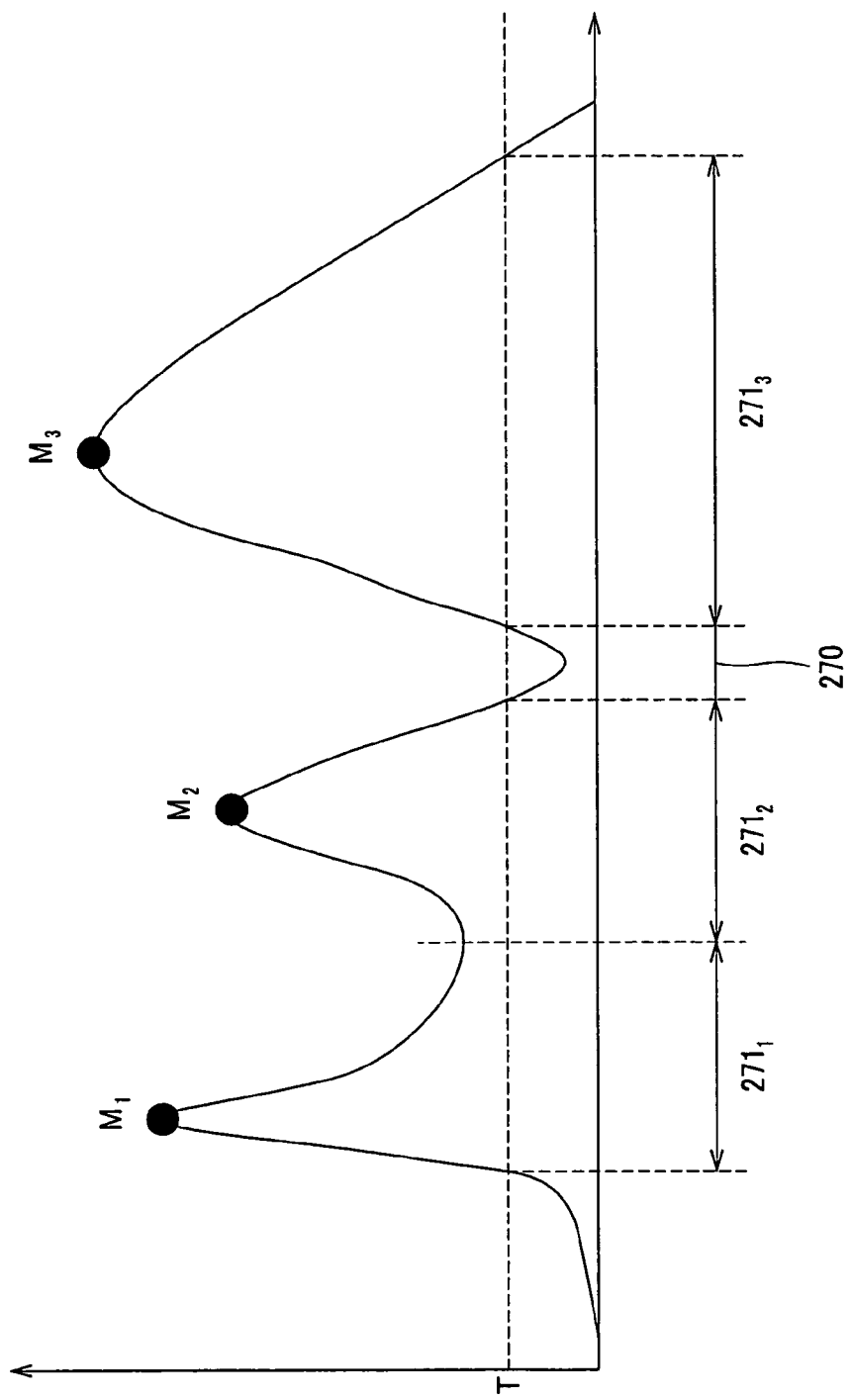
FIG. 13 graphically illustrates a relation between a histogram of a frequency of appearance and clusters, in which a coordinate is indicated along the horizontal axis and the frequency of appearance is indicated along the vertical axis.

FIG. 13 graphically illustrates a relation between a histogram and extracted clusters, in which a histogram that is actually a two-dimensional one is taken as a one-dimensions one for the convenience of the explanation. As shown in FIG. 13, the frequency of appearance has a plurality of maximum values different in magnitude correspondingly to the size of color regions such as flesh-color region, for example, in the color image.

The histogram H generated as above has a noise removed, for example, is smoothed as necessary by a lowpass filter to prevent any erroneous detection, and then sent to the initial-cluster extraction unit 214.

(1-3) Initial-Cluster Extraction Process

In this initial-cluster extraction process, the initial-cluster extraction unit 214 extracts, as an initial cluster, a color-coordinate aggregation in which color coordinate values are concentrically distributed from the two-dimensional histogram H indicating the frequency of appearance of each coordinate value, generated by the histogram generation unit 213. More specifically, the initial-cluster extraction unit 214 extracts, as one initial cluster, each maximum value of the frequency of appearance of the aforementioned r-g color-system coordinate value and a group of pixels existent near the maximum value. That is, each maximum value is regarded as an initial cluster having a single component, and the initial cluster is made to grow up starting at the maximum value by merging together coordinates adjacent to each other. The initial cluster is made to grow up by scanning each coordinate in a cluster map C having already been generated and detecting new coordinates to be merged together.

As shown in FIG. 13, groups of pixels of coordinates near maximum points $M_1$ to $M_3$ are merged together starting at the maximum points $M_1$ to $M_3$, and extracted as initial clusters $271_1$ to $271_3$. The maximum value of the frequency of appearance H (ir, ig) in the histogram shown in FIG. 13 is taken as a start point, and pixels including from those adjacent to the start point to those on a coordinate along which the frequency of appearance H has not yet reached a threshold T but it will reach the threshold T are sequentially merged together. At this time, the coordinates (ir, ig) include some not merged with any cluster and some whose frequency of appearance is larger than the threshold T and already merged with any initial cluster along any of adjacent coordinates (ir+dr, ig+dg). In case the frequency of appearance along the adjacent coordinates is larger than that of the coordinates in consideration, such adjacent coordinates are detected as ones to be merged with an initial cluster along the same coordinate as the adjacent ones already merged with the coordinate (ir, ig). Thus, by setting the threshold T for the frequency of appearance as above, it is possible to prevent extraction of pixels along a coordinate in a coordinate area whose frequency of appearance is small. More than one initial cluster are extracted according to a number of maximum points in the two-dimensional histogram H, but a unique number is assigned to each of the initial clusters for identification of the latter. The plurality of initial clusters thus extracted are represented as a multi-value image, as given by the following formula (5), in a cluster map C (ir, ig) that is a two-dimensional array:

$$C(ir, ig) = n \quad (5)$$

Figure 14:
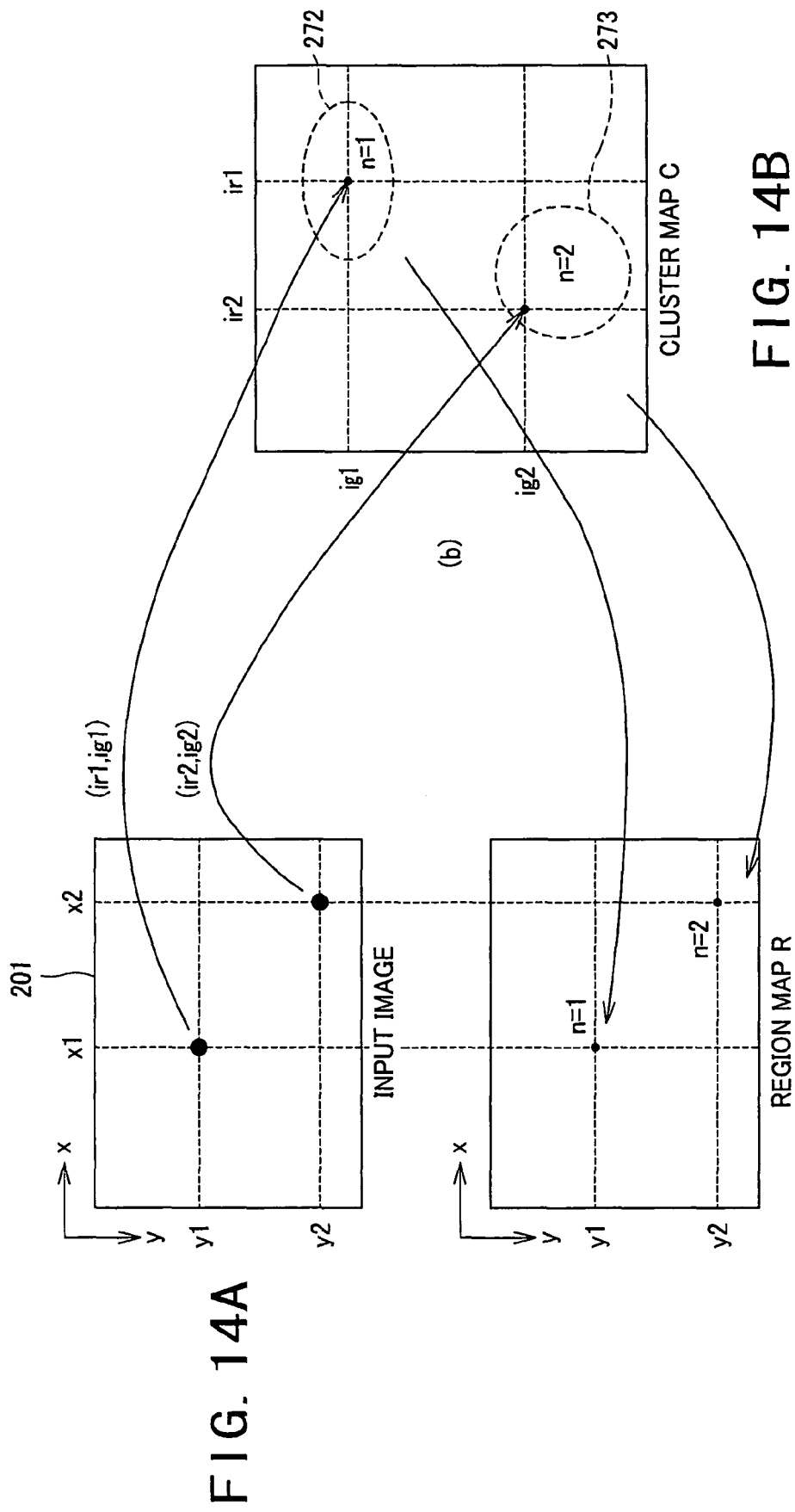
FIGS. 14A to 14C graphically illustrate an input image, cluster map C and region map R, respectively.

The above formula (5) indicates that a color coordinate (ir, ig) is included in an initial cluster n. FIGS. 14A and 14B graphically illustrate an input image and cluster map C, respectively. As shown in FIG. 14A, pixel values such as (x1, y1), (x2, y2), etc., for example, in an input color image 201 will be converted by the color-system conversion unit 212 into color coordinates (ir1, ig1), (ir2, ig2), etc., respectively, a two-dimensional histogram is generated from the frequencies of appearance of the color coordinates, and initial clusters extracted based on the two-dimensional histogram are represented as initial clusters 272 and 273 in the cluster map C that is a two-dimensional array and in which ir is plotted along the horizontal axis and ig is plotted along the vertical axis as shown in FIG. 14B. The extracted initial clusters are sent as a cluster map C shown in FIG. 14B to the initial-region extraction unit 215 and cluster synthesis unit 216.

(1-4) Initial-Region Extraction Process

The initial-region extraction unit 215 extracts, as an initial region, a rectangular region in which there ones, belonging to the same initial cluster, of pixels having colors included in the initial cluster 272, 273, etc., for example, having been extracted by the initial-cluster extraction unit 214 and shown in FIG. 14B are concentrated in the color image. FIG. 14C schematically shows the region map R. Pixels extracted from each initial cluster generated by grow-up in the initial-cluster extraction unit 214 are represented as a multi-value image having a cluster identification number n in the region map R (x, y) that is a two-dimensional array as in FIG. 14C. It should be noted here that pixels in positions (x1, y1) and (x2, y2) in the input color image shown in FIG. 14A are included in the initial clusters 272 and 273 shown in FIG. 14B. On the assumption that the cluster numbers n for the initial clusters 272 and 273 are 1 and 2, the coordinates (x1, y1) and (x2, y2) in the region map R will have the cluster numbers 1 and 2, respectively. That is, in case the color of a pixel in the position (x, y) in the image is included in the cluster No. n, it will be expressed as given by the following formula (6):

$$R(x, y) = n \quad (6)$$

Figure 15:
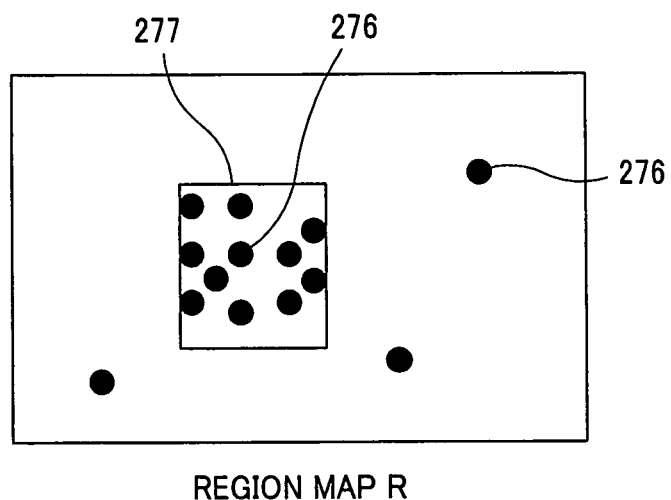
FIG. 15 shows a region map R generated in the flesh-color region extraction unit included in the image extracting apparatus according to the present invention.
Figure 16:
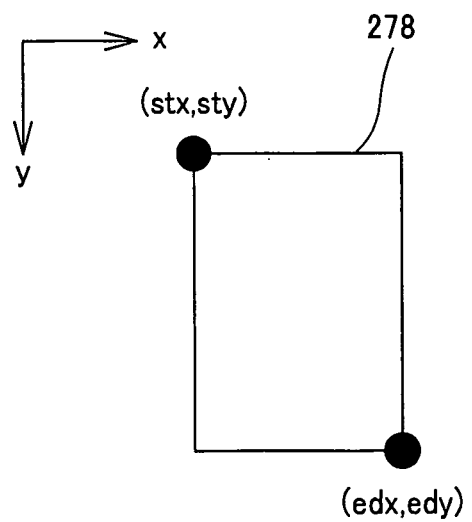
FIG. 16 shows a rectangular region extracted in the flesh-color region extraction unit.

Then, a rectangular region 277 enclosing a region where extracted pixels 276 are concentrated in the region map R shown in FIG. 15 is calculated. The rectangular region extracted correspondingly to the initial clusters is represented by coordinates (srx, sty) and (edx, edy) of two apexes opposite to each other in a diagonal as shown in FIG. 16, and stored in an apexes list V1 that is a one-dimensional array. That is, in case two apex coordinates of a rectangular region 277 extracted correspondingly to clusters n are (stx, sty) and (edx, edy), respectively, the coordinates will be stored in an apexes list V1(n) as given by the following formula (7):

$$\begin{cases} V(n) \cdot stx = stx \\ V(n) \cdot sty = sty \\ V(n) \cdot edx = edx \\ V(n) \cdot edy = edy \end{cases} \quad (7)$$

The pixels and rectangular region extracted correspondingly to the initial clusters are sent as a region map R and apexes list V1 to the cluster synthesis unit 216.

(1-5) Cluster Synthesis Process

In this cluster synthesis process, the cluster synthesis unit 216 combines together the plurality of initial clusters extracted as different ones, which however, have a color included in one region, on the basis of the cluster map C extracted by the initial-cluster extraction unit 214 and region map R extracted by the initial-region extraction unit 215 and the apexes list V1.

More particularly, when the cluster synthesis unit 216 is supplied with the cluster map C generated by the initial-cluster generation unit 214, it generates first a combination of two arbitrary initial clusters m and n. Then, it calculates a difference in color between the initial clusters m and n from the generated initial clusters m and n and cluster map C. Also, it calculates the overlapping degree of the initial clusters m and n from the initial clusters m and n, region map R generated by the initial-region extraction unit 215 and apexes list V1. Then, it judges, on the basis of the initial clusters m and n, region map R, apexes lists V1, color difference and overlapping degree, whether the initial clusters m and n are to overlap each other, and combines these clusters m and n when the latter overlap each other in the image.

The cluster synthesis unit 216 corrects the region map R and apexes list V1 correspondingly to the combination of the initial clusters, and sends them as region map R2 and apexes list V2 to the region dividing unit 217. It sends the region map R2 to the region extraction unit 218 as well.

(1-6) Region Dividing Process

In this process, the region dividing unit 217 divides the rectangular region defined by an apex coordinate V2(n) stored in an apexes list V2 correspondingly to the distribution of pixels extracted according to the same cluster, that is, the initial cluster or a synthetic cluster (will be referred to simply as "cluster" hereunder) as a combination of the initial clusters on the basis of the region map R2 corrected by the cluster synthesis unit 216 and the apexes list V2. That is, supplied with the new region map R2 from the cluster synthesis unit 216 and the apexes list V2(n), the region dividing unit 217 detects a main point of division that bisects the rectangular region defined by the apexes list V2(n) horizontally or vertically. In case the rectangular region is vertically bisected, the region map R2 and list of apexes of the two vertical rectangular-region divisions are used to horizontally subdivide each of the vertical rectangular-region divisions. In case the rectangular region is horizontally bisected, the region map R2 and list of apexes of the two horizontal rectangular-region divisions are used to vertically subdivide each of the horizontal rectangular-region divisions. Histograms HH and HV prepared by cumulatively plotting pixels horizontally and vertically according to the cluster n in the rectangular region defined on the basis of the apexes list V2, for example, are used to detect points that are minimum points of the histograms. When the minimum points are smaller than a preset threshold, the rectangular region is divided. Then, the region map R2 and list of apexes of the above rectangular-region divisions are used to correct the rectangular region.

Figure 17:
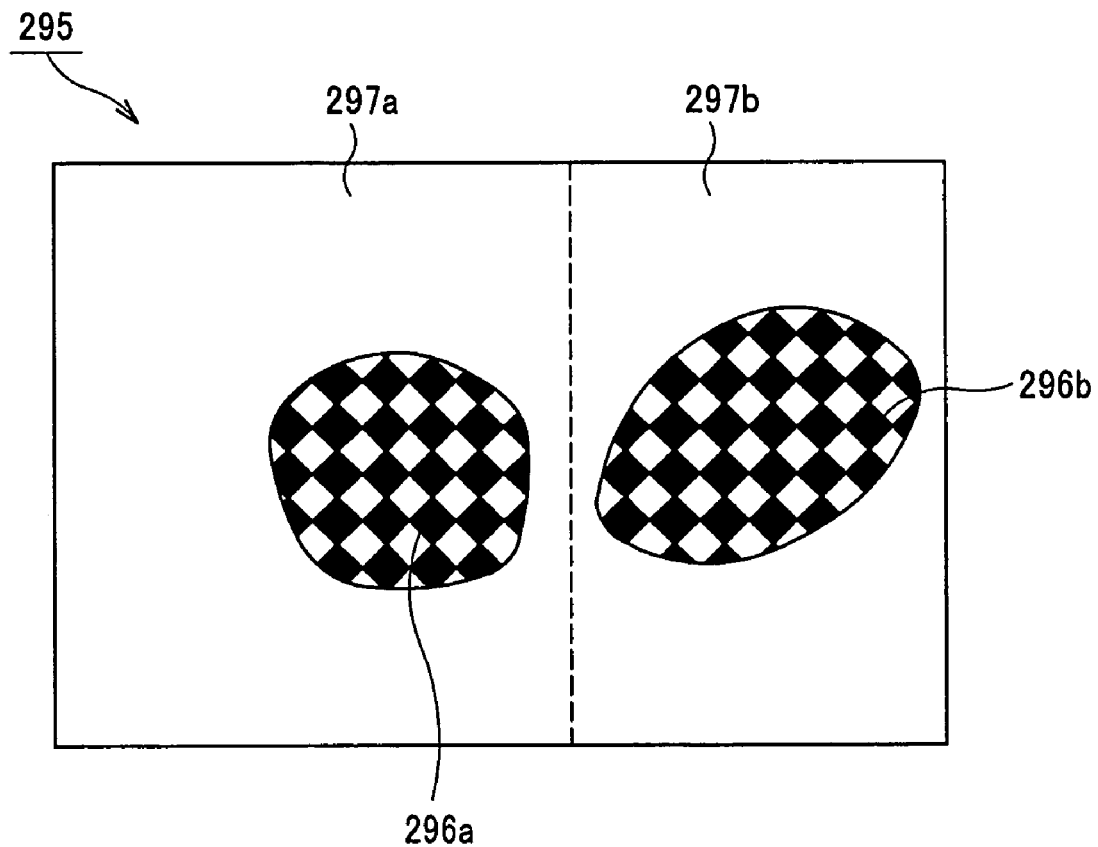
FIG. 17 shows a rectangular region divided in a region divider included in the flesh-color region extraction unit.

For example, in case pixels extracted according to the same cluster in the image form a plurality of blocks 296a and 296b in a rectangular region 295 extracted according to the cluster as shown in FIG. 17, the blocks 296a and 296b are regarded as different regions to divide the rectangular region 295. As a result, a plurality of pixel blocks such as the blocks 296a and 296b will correspond to the rectangular region 295 belonging to one initial cluster, and thus rectangular-region divisions 297a and 297b enclosing the pixel blocks 296a and 296b can be calculated.

As in the initial-region extraction unit 215, the rectangular-region divisions 297a and 297b are represented by two apex coordinates opposite to each other on one diagonal as shown in FIG. 16, and stored into a new apexes list V3(n, m). That is, in case an m-th rectangular region corresponding to the cluster n is represented by {(V3(n, m).stx, V3(n, m).sty), (V3(n, m).edx, V3(n, m).edy)}, these coordinates will be stored into the new apexes list V3(n, m) as given by the following formula (8). The new apexes list V3(n, m) is sent to the region extraction unit 218.

$$\begin{cases} V3(n, m) \cdot stx = stx \\ V3(n, m) \cdot sty = sty \\ V3(n, m) \cdot edx = edx \\ V3(n, m) \cdot edy = edy \end{cases} \quad (8)$$

(1-7) Region Extraction Process

In this process, the region extraction unit 218 extracts a pixel aggregation 5 nm meeting the condition as given by the following formula (9) on the basis of the region map R2 corrected in the cluster synthesis unit 216 and new apexes list V3 supplied from the region dividing unit 217:

$$Snm = \begin{cases} (x, y) \mid R2(x, y) = n, & V3(n, m), stx \le x \le V3(n, m) \cdot edx, \\ & V3(n, m) \cdot sty \le y \le V3(n, m) \cdot edy \end{cases} \quad (9)$$

Namely, even if the pixels has been extracted from the same cluster, the region dividing unit 217 will extract rectangular-region divisions such as 297a and 297b as shown in FIG. 17 for example regarding them as one aggregation in case the rectangular region has been divided by the region dividing unit 217. The plurality of regions thus extracted are sent to a judgment unit (not shown) where it is judged whether they are desired regions.

In the flesh-color region extraction unit 200, the cluster synthesis unit 216 can combine together a plurality of similar colors forming regions corresponding to one object and take the regions as one region, and the region dividing unit 217 can separate a plurality of objects having the same color. Also, a flesh-color region can be extracted extremely accurately by extracting clusters, combining them together and dividing an extracted region on the basis of the pixel density distribution.

(2) Object-Image Detection Unit 300

The object-image detection unit 300 assumes each flesh-color region extracted by the flesh-color region extraction unit 200 to be a face region, and detects, by a feature detector thereof, various features from the rectangular region defined by the apexes list V3(n) corresponding to the flesh-color region. The feature detector includes a head-top detection unit 313 to detect the position of the head top of a person, a mouth detection unit 314 to detect the position of the person's mouth on the basis of the intensity of red in the flesh-color region, an eye detection unit 315 to detect the eye by setting a searching range on the basis of the positions of the head top and mouth, a jaw detection unit 316 to calculate the position of the person's jaw on the basis of the positions of the eye and mouth, a center-line detection unit 317 to detect a center ling of the person's face on the basis of the intensity of red in the mouth region, and a region correction unit 318 to correct the apexes list V3(n) calculated by the flesh-color region extraction unit 200 on the basis of the positions of the head top, jaw and face center line. Each of these detection units will be described in detail herebelow.

(2-1) Head-Top Detection Unit 313

The head-top detection unit 313 detects the head top of a person having the flesh-color region as a face. For detection of the head top, the head-top detection unit 313 assumes that the background region except for a person is in one color, for example, and only the background region can exist above the person, namely, at the side where the vertical coordinate is small, and detects a position where the vertical coordinate is smallest among pixels having different colors from a background color. It should be noted that the vertical coordinate of the head-top position will be referred to as "head-top height" in the following description.

Figure 18:
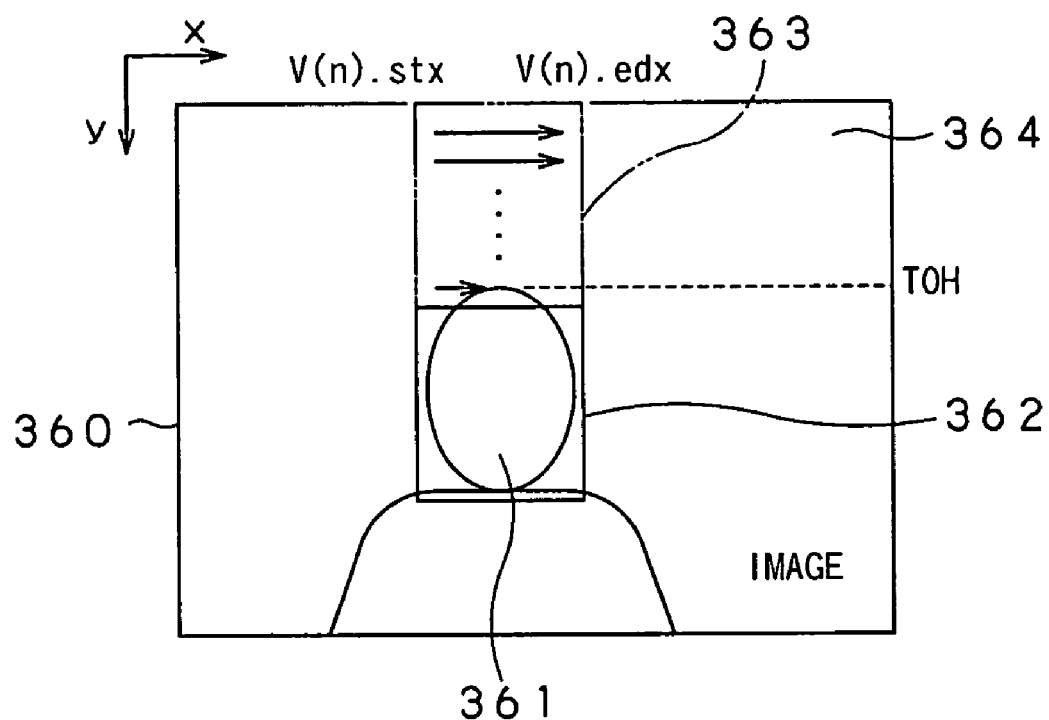
FIG. 18 shows a range of researching a color image for the user's top of head.

More specifically, the head-top detection unit 313 scans, from above in FIG. 18, a had-top searching range 363, in an input color image 360 supplied from the image input unit 101, that is an area above (as in FIG. 18) a rectangular region 362 corresponding to a flesh-color region 361 in consideration, namely, a region where the vertical coordinate is smaller than in the rectangular region 362, and which is set to have a range of V3(n).stx≦Horizontal coordinate (x-coordinate)≦V3(n).edx, and calculates a difference d between the value of each pixel and color of a background region 364 by the following formula (10):

$$d = \sqrt{(R(x,y)-Rbg)^2 + (G(x,y)-Gbg)^2 + (B(x,y)-Bbg)^2} \quad (10)$$

where R(x, y), G(x, y) and B(x, y) indicate R, G and B values of pixels in a coordinate (x, y) in the color image, and Rbg, Gbg and Bbg indicate R, G and B values of the background colors. The background color may be a mean value of pixels above a pixel currently in consideration, that is, a mean value of pixels in a region where the vertical coordinate (y-coordinate) is small, for example, a mean value of ten lines counted from a top end 360a of an image 360.

The color difference d given by the formula (10) is calculated, and when a pixel having a value larger than the predetermined threshold T appears, the vertical coordinate y is taken as a height TOH of the head top. The height TOH of the head top detected is sent to the eye detection unit 315 and region correction unit 318.

(2-2) Mount Detection Unit 314

Next, the mouth detection unit 314 detects the height of the mouth from each flesh-color region extracted by the flesh-color region detection unit 200. First, for each pixel (x, y) having not been extracted as a flesh-color region in a rectangular region defined by the apexes list V3(n), there is calculated a value rdsh(x, y) indicating the intensity of red using the following formula (11):

$$rdsh(x, y) = \begin{cases} \dfrac{R(x, y) \times B(x, y)}{G^2(x, y)} & \cdots G(x, y) \ge B(x, y) \\ \dfrac{R(x, y) \times G(x, y)}{B^2(x, y)} & \cdots G(x, y) < B(x, y) \end{cases} \quad (11)$$

Figure 19:
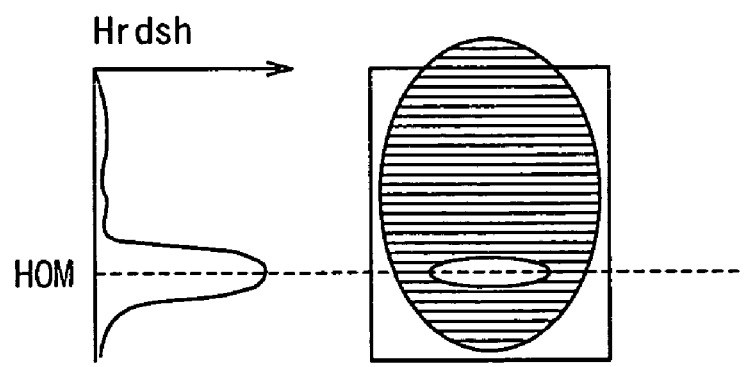
FIG. 19 shows a relation between a histogram Hrdsh generated from horizontally accumulated red intensities in of a rectangular region and the rectangular region.

The value rdsh(x, y) thus calculated is cumulated in the horizontal direction (x-axial direction) as shown in FIG. 19 to generate a histogram Hrdsh(y) as given by the following formula (12):

$$Hrsdh(y) = \sum_{\substack{V3(n).stx \leq x \leq V3(n).edx \\ V3(n).sty \leq y \leq V3(n).edy \\ R(x,y) \neq n}} rdsh(x, y) \quad (12)$$

where both $V3(n)$ and $R(x, y)$ are data sent from the flesh-color region detection unit 200, indicating the apex coordinate of a rectangular region and region map corresponding to the flesh-color region n.

Next, the histogram Hrdsh(y) is smoothed as necessary by a one-dimensional lowpass filter to remove noise or the like, and then the vertical coordinate y of the maximum value of the histogram Hrdsh(y) is detected as a mouth height HOM. The mouth height HOM thus detected is sent to the eye detection unit 315, jaw detection unit 316, center-line detection unit 317 and judgment unit 319.

(2-3) Eye Detection Unit 315

Then, the eye detection unit 315 detects the eye height in each flesh-color region extracted by the flesh-color region extraction unit 200. First, an eye searching range in the vertical direction (y-axial direction) is calculated using the following formula (13) from the head-top height TOH detected by the head-top detection unit 313 and mouth height HOM detected by the mouth detection unit 314:

$$\begin{cases} etop = (HOM - TOH) \times e1 + TOH \\ ebtm = (HOM - TOH) \times e2 + TOH \end{cases} \quad (13)$$

in which
e1<e2
0.0<e1,e2<1.0
where e1 and e2 are preset coefficients, etop and ebtm are upper and lower limits of the vertical coordinate in the eye searching range. Then, an intensity edge(x, y) of a horizontal edge is calculated for pixels located between the lower and upper limits of the vertical coordinate and existent in the rectangular range corresponding to the flesh-color region in consideration.

Figure 20:
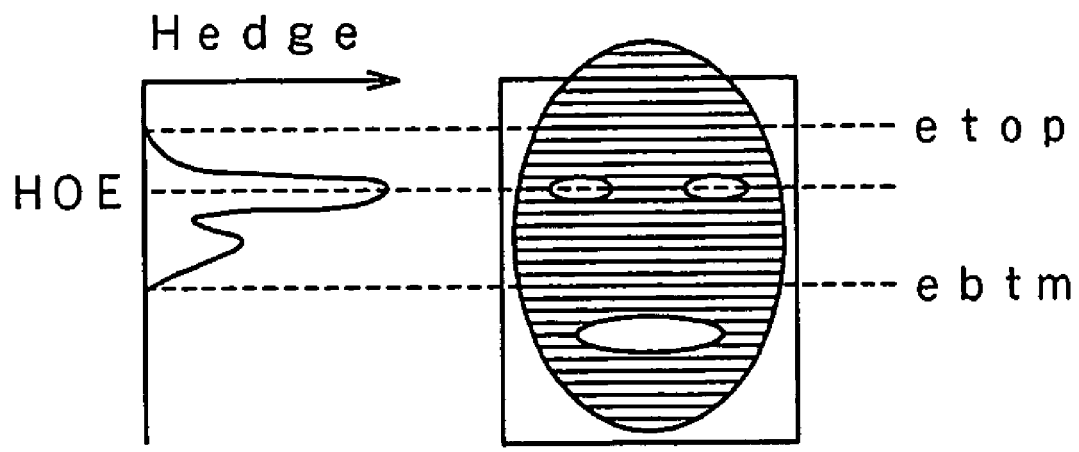
FIG. 20 is a front view showing a relation in position among the person's eyes, mouth and jaw.

The horizontal edge intensity edge(x, y) calculated for each coordinate of the input color image is cumulated in the horizontal direction (x-axial direction), and a histogram Hedge(y) indicating the horizontal edge in the vertical direction in the rectangular region is calculated using the following formula (14):

$$Hedge(y) = \sum_{\substack{V3(n).stx \leq x \leq V3(n).edx \\ etop \leq y \leq ebtm}} edge(x, y) \quad (14)$$

where $V3(n)$ indicates an apex coordinate of a rectangular region corresponding to the flesh-color region n extracted by the flesh-color region extraction unit 200. FIG. 20 is a schematic diagram of the histogram Hedge(y) generated as above. This histogram Hedge(y) is smoothed as necessary by a one-dimensional lowpass filter to remove noise or the like, and a vertical coordinate y corresponding to the maximum value of the histogram Hedge is detected as an eye height HOE.

Also, in case the lower limit ebtm calculated using the formula (13) is smaller than the apex coordinate $V3(n)$.sty of the rectangular region enclosing the flesh-color region, it is possible that the head-top height TOH or mouth height HOM have not been detected appropriately. In such a case, the apexes list V can be corrected by storing an invalid value, for example, "−1", as a position coordinate into the apexes list $V3(n)$ of a corresponding rectangular region.

The eye height HOE detected is sent to the jaw detection unit 316 and judgement unit 319. Also, the apexes list V corrected is sent to the jaw detection unit 316, center-line detection unit 317 and region correction unit 318.

(204) Jaw Detection Unit 316

Figure 21:
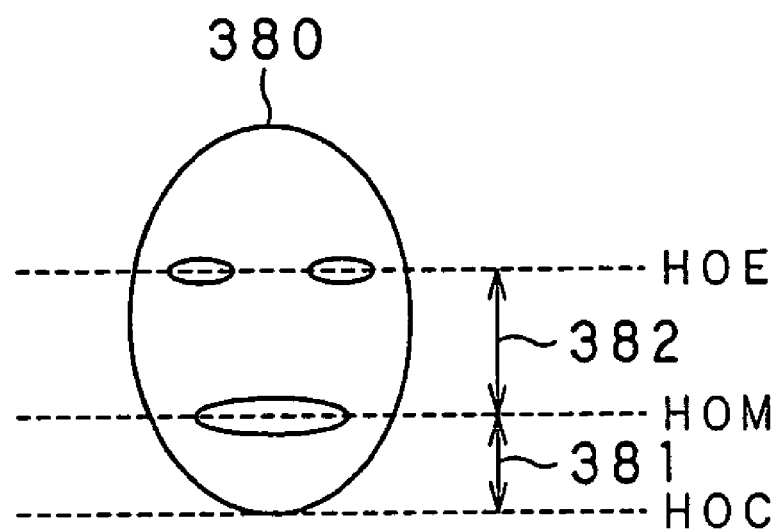
FIG. 21 shows a relation between a histogram Hedge (y) generated from horizontally accumulated pixels forming an edge and a rectangular region corresponding to a flesh-color region.

The jaw detection unit 316 detects the height of the eyes in each flesh-color region having an apex coordinate, not invalid, in the apexes list V3 corrected by the eye detection unit 315. The jaw height can be estimated using the following formula (15) on the assumption that the ratio between a distance 381 between the jaw and mouth and a distance 382 between the eye and mouth is generally constant in a person's face 380 as shown in FIG. 21 for example.

$$HOC = HOM + (HOM - HOE) \times c \quad (15)$$

where c is a preset coefficient, and HOC indicates a jaw height. The jaw height HOC calculated is sent to the region correction unit 318.

(2-5) Centerline Detection Unit 317

Next, the center-line detection unit 317 detects the position of a center line that horizontally divides the face in each flesh-color region having an apex coordinate, not invalid, in the apexes list V3 corrected by the eye detection unit 315.

Figure 22:
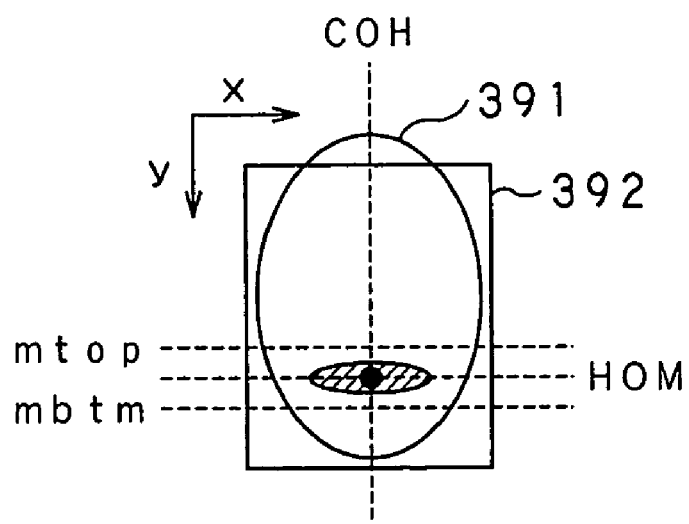
FIG. 22 shows a height HOM of a mouth and ranges of search mtop and mbtm in the rectangular region corresponding to the flesh-color region.

Here, a mouth searching range at a vertical coordinate is set around the mouth height HOM detected by the mouth detection unit 314. The searching range can be calculated using the following formula (16) from the vertical width of a corresponding rectangular region for example:

$$\begin{cases} mtop = (V3(n) \cdot edy - V3(n) \cdot sty) \times m - HOM \\ mbtm = (V3(n) \cdot edy - V3(n) \cdot sty) \times m + HOM \end{cases} \quad (16)$$

where m is a preset coefficient, $V3(n)$ is an apex coordinate of a rectangular region corresponding to the flesh-color region n. The values mtop and mbtm calculated using the formula (16) are upper and lower limits of the y-coordinate of the searching range. Also, the horizontal searching range can be taken as the horizontal width of the rectangular range. That is, the upper and lower limits of the x-coordinate may be the left end "$V3(n)$.stx" and right end "$V3(n)$.edx" of the rectangular region. FIG. 22 is a schematic diagram showing the mouth height HOM and searching range "mtop, mbtm" in a rectangular range 392 corresponding to a flesh-color range 391.

Next, the center-line detector 317 calculates, using the formula (11), the intensity of red of pixels extending within the set searching range but not included in the flesh-color region to detect a mean value of the horizontal coordinate of pixels whose intensity of red is larger than the threshold as a horizontal coordinate position COH of the center line, as shown in FIG. 22. For calculation of the intensity of red, pixels belonging to the flesh-color region can be excluded to eliminate the influence of such pixels and detect the center line of the face with an extremely high accuracy. The position COH of the face center line thus detected is sent to the region correction unit 318 and judgment unit 319.

Also, a position where there stands a mean value of the distribution of flesh-color pixels in the flesh-color region may be detected, and a straight line passing by the position be taken as the center line of the face.

(2-6) Region Correction Unit 318

Figure 23:
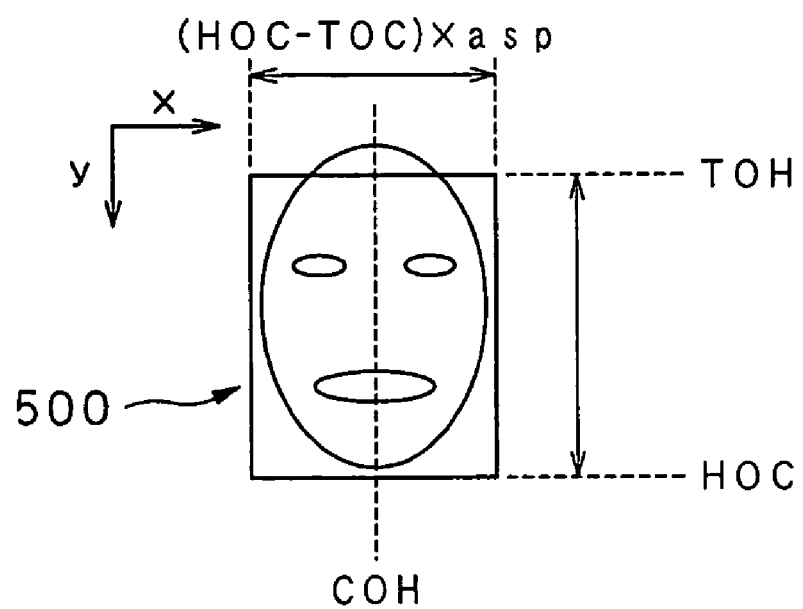
FIG. 23 shows a coordinate {(stx, sty), (edx, edy)} of an apex of the rectangular region after corrected.

The region correction unit 318 is to re-calculate the rectangular region for each flesh-color region having an apex coordinate, not invalid, in the apexes list V3 corrected by the eye detection unit 315, and correct the apexes list. For example, a rectangular region 500 can be set as shown in FIG. 23 on the basis of a head-top height TOH detected by the head-top detection unit 313, jaw height HOC detected by the jaw detection unit 316, and center-line position COH detected through the center-line detection. That is, two apex coordinates {(stx, sty), (edx, edy)} defining the corrected rectangular region 500 can be calculated using the following formula (17):

$$\begin{cases} stx = COH - \dfrac{(HOC - TOH) \times asp}{2} \\ edx = COH + \dfrac{(HOC - TOH) \times asp}{2} \\ sty = TOH \\ edy = HOC \end{cases} \quad (17)$$

where asp indicates a coefficient indicating a ratio of the height to the face width of a person and to which an appropriate value is preset.

The apex coordinate newly calculated for the flesh-color region n is overwritten to the apexes list V and sent to the judgment unit 319.

(2-7) Judgment Unit 319

The judgment unit 319 judges whether each flesh-color region having an apex coordinate, not invalid, in the apexes list V3 corrected by the region correction unit 318 is a face region. The judgment is effected based on the fact that the eye and mouth portions of a person's face region have many horizontal edges distributed therein and the lip color has a stronger red than the other regions, and by checking whether these conditions are met at the mouth height HOM detected by the mouth detection unit 314 and eye height HOE detected by the eye detection unit 315. The result of judgment is outputted as a binary flag faceflag indicating whether the flesh-color region is a face region.

Thus, the object-image detection unit 300 can detect the position of the eyes with an extremely high accuracy since it detects the positions of the head top and mouth in an extracted flesh-color region and detects the position of the eyes by setting an eye searching range on the basis of the detected positions of the head top and mouth. Also, even when the differences in brightness and color between the face and neck are so small that a high-accuracy detection is difficult, the jaw position can be detected accurately by detecting the jaw position from the positions of eyes and mouth. Further, since the face center line is detected on the basis of the intensity of red of the mouth, it can be detected with an extremely high accuracy. Furthermore, since the judgment unit 319 judges the probability of the eye and mouth patterns and it makes a general decision, on the basis of the result of judgment, of whether the face region in the picture is really a face region of a person, the face of a person in consideration can be judged with a high reliability even if the picture includes a plurality of face images.

In case a picture includes a plurality of flesh-color regions judged by the judgment unit 319 to face regions, a selection unit (not shown) may be provided to select one of such regions on the basis of the positions of the face regions, for example. Thus, one of the plurality of face regions in the picture can be selected for trimming by the trimming unit 400. It should be noted that the judgment unit 319 may be provided with a function of selecting a face region.

(3) Trimming Unit 400

For printing an extracted face region in an effective area of contact paper, the trimming unit 400 trims the extracted face region for the dimensional ratio among the overhead, face and chest regions to be as specified. By specifying the size of each of the overhead, face and chest regions of an object in the effective area of the contact paper, where the image is to be printed, namely, the dimensional ratio among the overhead, face and chest regions, it is possible to provide an easier-to-view, well-balanced certificate picture.

The quality of a certificate picture depends upon the positioning of the face region in the effective area of contact paper through the automatic trimming.

Therefore, the sizes of the overhead, face and chest regions A, B and C should be set for a ratio among B, C and A of 1:0.6:0.15 as shown in FIG. 2 with reference to the size of the face region B. A ratio among B, C and A of 1:0.4 to 0.8:0.1 to 0.2 will assure an easy-to-view, well-balanced photo.

FIGS. 24A and 24C schematically illustrate certificate pictures each having the ratio of the overhead and chest regions A and C with the face region B changed. FIG. 24B shows a certificate picture provided according to this aspect of the present invention. As will be seen, this certificate picture is easy to view since the dimensional ratio among the overhead, face and chest regions A, B and C is set appropriate. The ratio of the overhead region A with the face region B is 0.15 in this embodiment.

FIGS. 24A and 24C show comparative examples 1 and 2 of certificate picture in which the dimensional ratio is different from the above-mentioned one. In a comparative example 1 shown in FIG. 24A, the dimensional ratio of the overhead region A with the face region B is as large as 0.42. Taking a picture of a person with the face region brought to the center of the picture will result in a certificate picture as in the comparative example 1 in many cases. Since the dimensional ratio of the overhead region A with the face region B in this photo is larger than the one specified herein, this certificate picture provides less appeal and is not well-balanced as will be known from FIG. 24A.

FIG. 24C shows a comparative example 2 in which the dimensional ratio of the overhead region A with the face region B is as small as 0.04. As will be seen, such a small ratio of the overhead region A will result in a photo which will provide an impression that the imaged person is confined in a narrow place, and the object's face will have less appeal in this case as well.

FIGS. 25A and 25B schematically illustrate examples of certificate pictures in which the face region B is smaller and larger, respectively, than the effective area of contact paper. In the example shown in FIG. 25A, the overhead and chest regions A and C are considerably larger than the face region B. On the contrary, in the example in FIG. 25B, the overhead and chest regions A and C are smaller than the face region B. Both the examples are not suitable as certificate pictures.

Also, a picture in which the center of the face is deviated to any of the right and left from the center of the effective area of contact paper is not suitable as a certificate picture. Therefore, such a picture should preferably be trimmed so that the face region is brought to the center of the contact paper with reference to the face center line COH detected by the aforementioned center-line detection unit 317 and the dimensional ratio among the overhead, face and chest regions is as specified above.

In the trimming unit 400 for such trimming, first the position of a partial image to be trimmed is determined correspondingly to an effective rectangular region V3(*n*) included in the apexes list V3 sent from the object-image detection unit 300.

Figure 26:
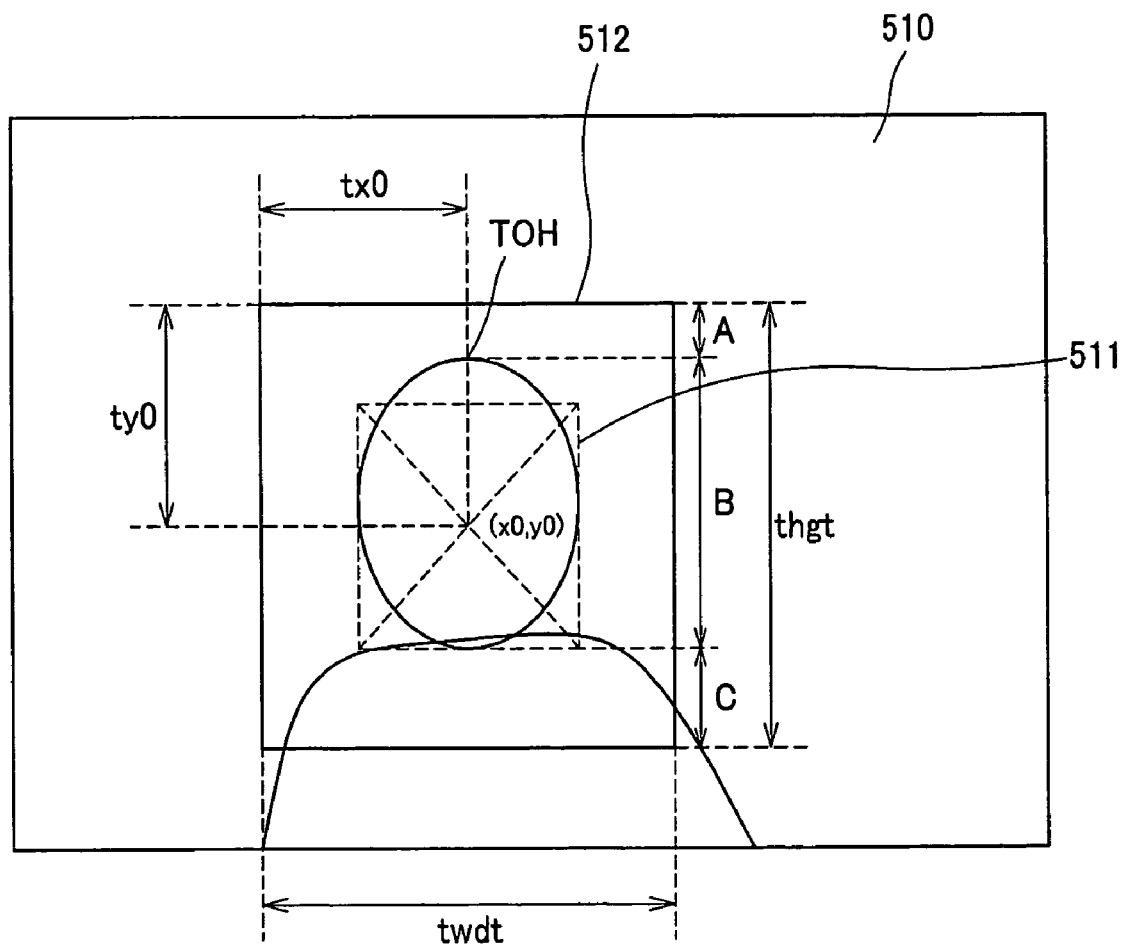
FIG. 26 shows a partial image removed from an input color image by a trimming unit in the image extracting apparatus according to the present invention.

FIG. 26 schematically illustrates a partial image removed from an input color image 510 by the trimming unit 400. As shown in FIG. 26, a rectangular region 512 represented by two apex coordinates as given by the following formula (18) is trimmed as the partial image so that the center (x0, y0) of a rectangular region 511 defined by the apexes list V3 will coincide with a predetermined position (tx0, ty0) of a predetermined effective region after the trimming, for example:

$$\begin{cases} (stx, sty) = (x0 - tx0, y0 - ty0) \\ (edx, edy) = (stx + twdt - 1, sty + thgt - 1) \end{cases} \quad (18)$$

where twdt and thgt indicate a width and height of a trimmed image set to have the aforementioned dimensional ratio among the overhead, face and chest regions A, B and C, namely, an effective region to be printed on contact paper.

The trimmed image is sent to the aforementioned printer or an image display unit such as monitor or the like, or to an image storage unit or the like.

Note that if the size of an image trimmed by the trimming unit 400 and set to have the aforementioned dimensional ratio among the overhead, face and chest regions A, B and C is excessively larger or smaller than the rectangular region 511 defined by the apexes list V3, the image should reduced or enlarged in size appropriately.

Also, the trimming unit 400 may be arranged to select, for trimming, all of a plurality of regions having been determined to be faces by the flesh-color region extraction unit 200 or object-image detection unit 300. In this case, the trimming unit 400 will trim a partial image including all of such a plurality of regions judged to be faces, and enlarge or reduce the size of the partial image as necessary to provide an image having a predetermined size.

Note that the partial image may be trimmed by the trimming unit 400 on the basis of the apexes list V3 as well as of an eye height HOE, center-line position COH, etc. calculated of each face region so that the eight and center line are brought to predetermined positions in the trimmed image.

The image extracting apparatus configured as above according to the present invention operates as will be described below with reference to FIG. 27 showing a flow of operations made in extracting an image according to the present invention. Also, FIGS. 28A and 28B schematically illustrate steps of extracting an image according to the present invention. First in step S21, a captured original image 700 as shown in FIG. 28A is down-sampled in the image input unit 101 to provide down-sampled image data 701 as shown in FIG. 27B. Next in step S22, a flesh-color region is extracted by the flesh-color region extraction unit 200 from the image data 701. Then in step S23, an object is detected from the extracted flesh-color region.

At this time, a plurality of flesh-color regions 702a to 702c are extracted from the down-sampled image data 701 as shown in FIG. 28C in some cases. The object is detected by selecting all the flesh-color regions 702a to 702c or *a* special flesh-color region. In a photo booth installed in a hospital or the like, a picture is taken of a child in the bosom of his or her mother or father in some cases. In such a case, a plurality of flesh-color regions will be extracted. Selection of a flesh-color region having the largest area to be extracted, for example, when selecting any special one of the plurality of flesh-color regions, will permit to extract a flesh-color region of the mother's or father's face. Also, since the flesh-color region of the user is normally above the center, extraction of a central flesh-color region will permit to extract a flesh-color region of the face of the child below the flesh-color region of the parent. Detection of an object image by the object image detection unit 300 on the basis of a flesh-color region 702a located nearest to the image center and having a large area, for example, as shown in FIG. 28D will be described herebelow. When the object-image detection unit 300 has detected an object image in the flesh-color region 702a, namely, when it has determined that the flesh-color region is a face region, the image data is supplied to the trimming unit 400 where it will be trimmed. More specifically, in step S24, an effective region (to be trimmed) 711 is calculated for the overhead and chest regions A and C to have the aforementioned ratios with the face region B of the flesh-color region 702a representing the object in the original image 700, and the effective region 711 having been trimmed to have the predetermined dimensional ratio as shown in FIG. 28F is supplied to the printer 18 or 19.

Figure 29:
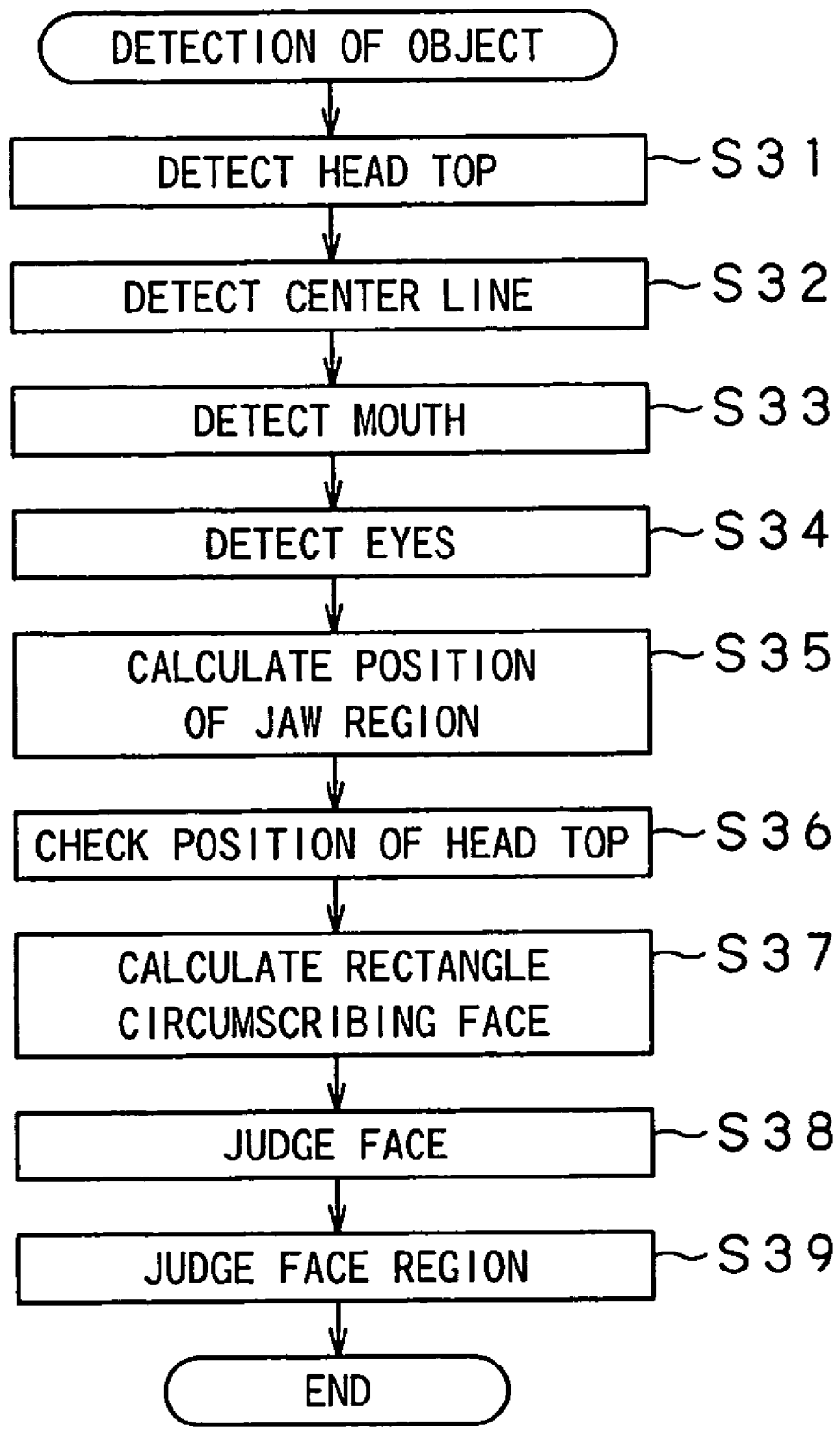
FIG. 29 shows a flow of operations made in detecting an object in the image extracting apparatus according to the present invention.

Next, detection of an object image as in step S23 will be described in detail. FIG. 29 shows a flow of operations made in detecting an object in the object-image extraction unit 300 according to the present invention. First, in step S31, the head-top detection unit 313 in the object-image detection unit 300 detects the head top TOH in step S31. For detection of the head top TOH, up to ten lines counted from above in the input image are taken as a background and a comparison is made between pixels in the background and those above the flesh-color region. A position where there is found a large difference between the pixels is detected as a head top TOH. Next in step S32, a line passing by the point of a mean value of the distribution of flesh-color pixels in the flesh-color region is detected as the face center line COH. It should be noted that the face center line COH may be detected by the center-line detection unit 317 on the basis of the results of the above mouth and eye position detection. Next in step S33, the mouth position MOH is detected by the mouth detection unit 314 with the use of the redness in the flesh-color region. In step S34, the eye position EOH is detected by the eye detection unit 315 on the basis of the fact that the edge density is high in the flesh-color region. Then in step S35, the jaw position HOC is calculated based on the results of the above mouth and eye position detection. In step S36, the judgment unit 319 judges the validity of the position of the head top TOH detected in step S31 on the basis of the results of the mouth and eye position detection. If the position of the head-top TOH detected is determined to be not valid, the position of the head top TOH is calculated from the results of the mouth and eye position detection. The users of the photo booth installed in a hospital or the like will possibly include a face- or head-bandaged person. In such a case, the above validity judgment of the position of the head top TOH permits to prevent an erroneous detection. Next in step S37, the region correction unit 318 calculates a rectangular region enclosing the flesh-color region. Then in step S38, the judgment unit 319 judges, based on the requirement that the edge density of the eyes and mouth should be larger than a predetermined threshold and the redness of the mouth be larger than a predetermined threshold, whether the rectangular region includes the object's face. Finally in step S39, the judgment unit 319 selects a face-extraction region in case a plurality of faces has been detected, and supplies the face region to the trimming unit 400.

The image extracting apparatus according to the present invention automatically trims a face region detected from an input image. Therefore, just sitting on the chain inside the photo booth, the user can have a well-balanced certificate picture as shown in FIG. 24B.

The photo booth to be installed in a hospital or the like has been described by way of example in the foregoing. The present invention is not limited to such a photo booth but can be applied to a certificate picture booth to be installed at a street corner for example or a photo booth to be installed in a game center or the like. The photo booths installed at the street corner or in a game center can also be used easily by any physically handicapped persons as having been described in the foregoing.

Also, in the foregoing, the present invention has been illustrated and explained concerning the hardware configuration. However, the present invention is not limited to the hardware configuration but an arbitrary operation can be done by having the CPU execute a computer program. In this case, the computer program can be recorded in a recording medium for distribution, and also distributed via a transmission medium such as the Internet or the like.

Next, the present invention will be described concerning another aspect thereof. It should be noted that same or similar elements as or to those in the aforementioned aspect of the present invention will be indicated with same or similar references as or to those in the drawings to which reference has been made in the explanation of the already-described aspect.

FIG. 30 shows a person's image positioned in a certificate picture. As shown in FIG. 30, in the certificate picture generally indicated with a reference 600, a vertical dimension A from the top end 600a of the photo 600 to the head top TOH of the person's image 601 indicates that of an overhead region. Also, a vertical dimension B from the head top TOH of the person's image 601 to the mouth HOM indicates that of a face region. Further, the dimension C from the mouth COH of the person's image 601 to the bottom end 600b of the photo 600 indicates that of a chest region. A dimension D (=A+B+C) indicates a vertical dimension of an area of contact paper in which the certificate picture 600 is printed (will be referred to as "effective area" hereunder). In case the contact paper includes a blank where no certificate picture is printed, this effective area indicates an area except for the blank. Also, a dimension E indicates the horizontal dimension of the effective area. "COH" indicates a line indicating the middle of the dimension E and which bisects the face horizontally, namely, it indicates a face center line. It should be noted here that the effective area (D×E) indicates a region except for a blank on the contact paper where no certificate picture is printed.

The image processing apparatus according to this aspect of the present invention trims the picture so that the ratio among the dimensions of the face, chest and overhead regions B, C and A, respectively, is 1:0.6 to 1.0:0.2 to 0.3 in case the object's face region is dimensioned as specified herein, namely, it takes the dimension of the face region B as a reference on the contact paper.

The trimming unit 400 trims, to dimensions as specified herein, the object's face region supplied from the object image detection unit 300 in the effective area of the contact paper where the picture is to be printed. In the photo booth configured as above, how a person's image is positioned on contact paper is important in automatically trimming of the image by detecting the person's face through image processing. More specifically, on the assumption that an image portion extending from the top end of contact paper (effective area) to the person's head top is an overhead region, an image portion extending from the person's head top to the jaw is a face region and an image portion extending from the jaw to the bottom end of the contact paper (effective area) is a chest region, the image is trimmed according to the present invention so that the ratio among the overhead, face and chest regions is 1:0.6 to 1.0:0.2 to 0.3, to thereby provide an easier-to-view and well-balanced certificate picture.

As already mentioned, FIGS. 24A and 24C schematically illustrate certificate pictures each having the ratio of the overhead and chest regions A and C with the face region B changed. FIG. 24B shows a certificate picture provided according to this aspect of the present invention. As will be seen, this certificate picture is easy to view since the dimensional ratio among the overhead, face and chest regions A, B and C is set appropriate. The ratio of the overhead region A with the face region B is 0.25 according to this embodiment.

FIGS. 24A and 24C show comparative examples 1 and 2 of certificate picture in which the dimensional ratio is different from the above-mentioned one. In a comparative example 1 shown in FIG. 24A, the dimensional ratio of the overhead region A with the face region B is as large as 0.42. Taking a picture of a person with the face region B brought to the center of the picture will result in a certificate picture as in the comparative example 1 in many cases. Since the dimensional ratio of the overhead region A with the face region B in this photo is larger than specified herein, this certificate picture provides less appeal and is not well-balanced as will be known from FIG. 24A.

FIG. 24C shows a comparative example 2 in which the dimensional ratio of the overhead region A with the face region B is as small as 0.04. As will be seen, such a small ratio of the overhead region A will result in a photo which will provide an impression that the imaged person is confined in a narrow place, and the object's face will have less appeal in this case as well.

FIGS. 25A and 25B schematically illustrate examples of certificate pictures in which the face region B is small and large, respectively, as having previously been described. In the example shown in FIG. 25A, the overhead and chest regions A and C are considerably larger than the face region B. On the contrary, in the example in FIG. 25B, the overhead and chest regions A and C are smaller than the face region B. Both the examples are not suitable as certificate pictures.

Also, a picture in which the center of the face is deviated to any of the right and left from the center of the effective area of contact paper is not suitable as a certificate picture. Therefore, such a picture should preferably be trimmed so that the face region is brought to the center of the contact paper with reference to the face center line COH detected by the aforementioned center-line detection unit 317 and the dimensional ratio among the overhead, face and chest regions is as specified above.

In the trimming unit 400 for such trimming, first a range of trimming is calculated by a program executed by the CPU 78 in the control circuit 70.

The image processing apparatus configured as above permits to form input image data into a easier-to-view an well-balanced image by trimming it so that the person's face is positioned in an appropriate balance.

Note that the image processing apparatus is provided in the photo booth 1 to be used in a hospital or the like as mentioned above and thus it is possibly used by a patient in a wheelchair, crutched person, a person holding a child in the bosom, etc. Therefore, their face is not always positioned in the center of captured image data. Even in such a case, the image processing apparatus automatically trims the image to provide an easy-to-view, well-balanced picture.

Each of the component units in the image processing apparatus operates as will be described below with reference to FIGS. 27 and 28.

First in step S21, the image input unit 101 down-samples a captured original image 700 as shown in FIG. 28A is to provide down-sampled image data 701 as shown in FIG. 28B.

Next in step S22, the flesh-color region extraction unit 200 extracts a flesh-color region from the image data 701.

Then in step S23, the object image detection unit 300 detects an object in the extracted flesh-color region. At this time, a plurality of flesh-color regions 702a to 702c are extracted from the down-sampled image data 701 as shown in FIG. 28C in some cases. The object is detected by selecting all the flesh-color regions 702a to 702c or a special flesh-color region. According to this aspect of the present invention, the object image detection unit 300 selects, for example, the flesh-color region 702a located nearest to the center shown in FIG. 28D, and detects an object's image in the flesh-color region 702a, as will be described below.

In step S24, when the object-image detection unit 300 has detected an object image in the flesh-color region 702a, namely, when it has determined that the flesh-color region 702a is a face region, the image data is supplied to the trimming unit 400 where it will be trimmed. More specifically, an effective region (to be trimmed) 711 is calculated for the overhead and chest regions A and C to have the aforementioned ratio with the face region B of the flesh-color region 702a representing the object in the original image 700, and the effective region 711 having been trimmed to have the predetermined dimensional ratio as shown in FIG. 28F is supplied to the printer 18 or 19.

In step S23, the object is detected as will further be described below with reference to FIG. 29 showing a flow of operations made in detecting an object in the object image detection unit 300.

First in step S31, the head-top detection unit 313 detects the head top by taking up to ten lines counted from above in the flesh-color region as a background, comparing pixels in the background with those in the upper portion of the flesh-color region and taking, as a head top TOH, a point where there is found a large difference between the pixels.

Next in step S32, the center-line detection unit 317 detects, as a face center line COH, a line passing by a point of a mean value of the distribution of flesh-color pixels in the flesh-color region. The face center line may be detected on the basis of the result of mouth or eye position detection as having previously been described.

Further in step S33, the mouth detection unit 314 detects a mouth position MOH on the basis of the redness in the flesh-color region.

Next in step S34, the eye detection unit 315 detects an eye position EOH on the basis of the fact that the edge density is high in the flesh-color region.

Further in step S35, the jaw detection unit 316 detects a jaw position on the basis of the results of mouth and eye position detection.

In step S36, the judgment unit 319 judges, on the basis of the results of mouth and eye position detection, whether the head-top position detected in step S31 is valid. In case the detected head-top position is determined not to be valid, the judgment unit 319 will calculate the position of the head top on the basis of the result of mouth and eye position detection. Thus, checking the head-top position permits to prevent any erroneous detection.

Next in step S37, the region correction unit 318 calculates a rectangular region enclosing the flesh-color region.

In step S38, the judgment unit 319 judges whether the rectangular region is the face region through judgment of whether the rectangular region meets the condition that the edge density at the eyes and mouth should be higher than a predetermined threshold and the redness of the mouth is higher than a predetermined threshold.

Finally in step S39, in case a plurality of faces is detected, a region from which the face is to be extracted is selected, and the face region is supplied to the trimming unit 400.

Note that the selection of a face region through the face judgment by the judgment unit 319 is intended to successfully extract the face region of a child in the bosom of the mother or other in captured image data by preventing a plurality of face regions from being detected, for example. For this purpose, the judgment unit 319 selects a face region that is near the center of the entire captured image data, for example.

Figure 31:
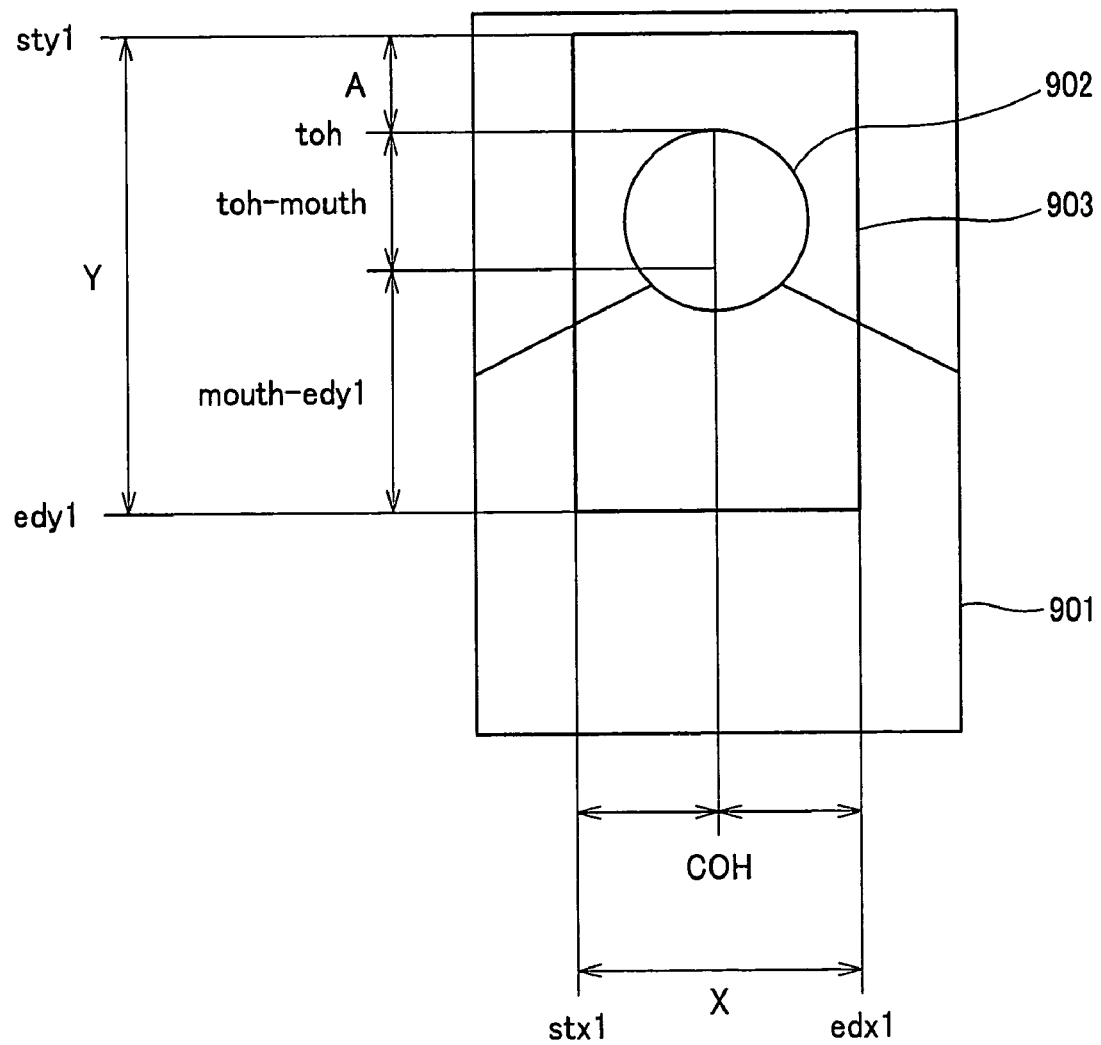
FIG. 31 shows a relation between a range of trimming by the trimming unit in the image processing apparatus according to the present invention, and image data.
Figure 32:
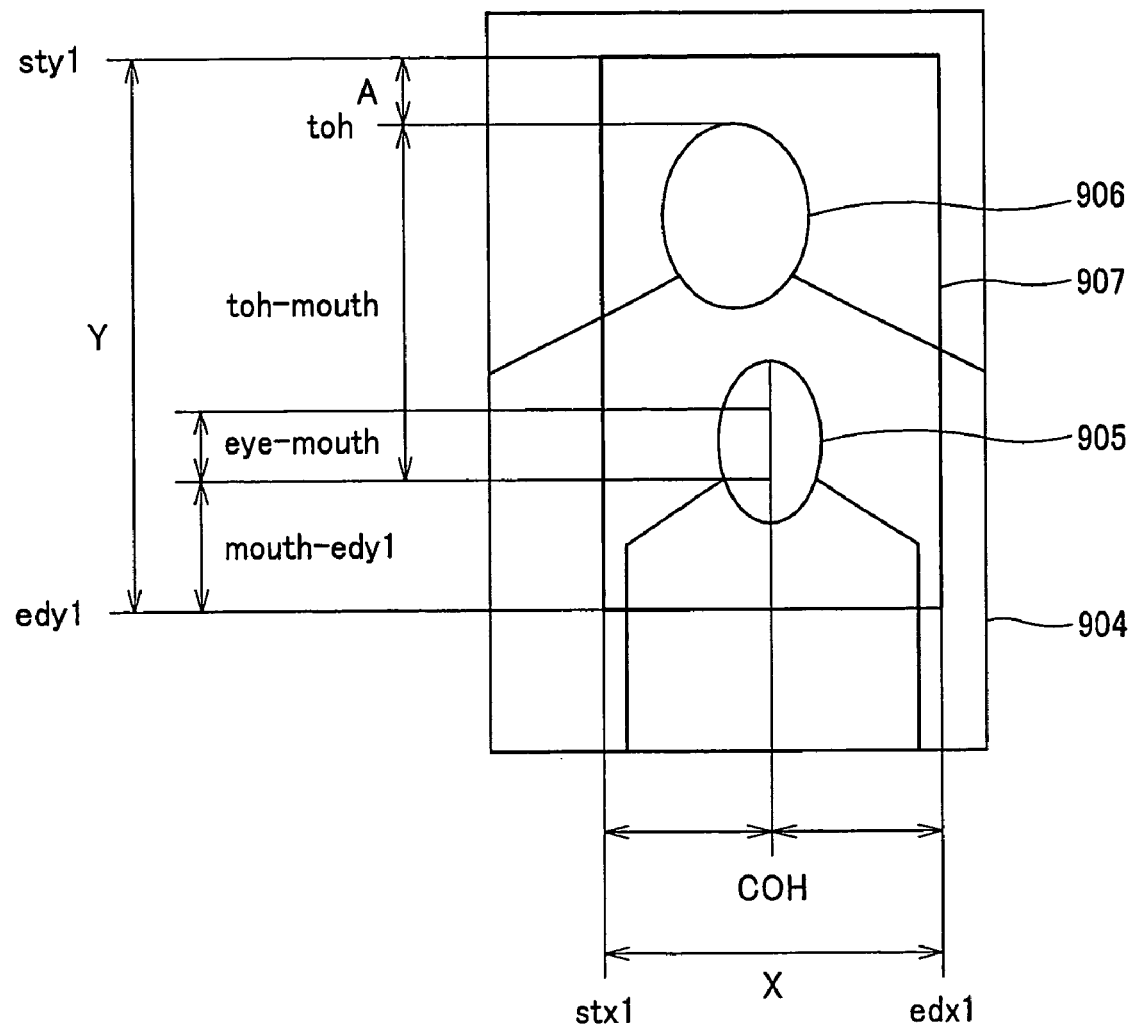
FIG. 32 explains a range of trimming a picture having two persons imaged therein.
Figure 33:
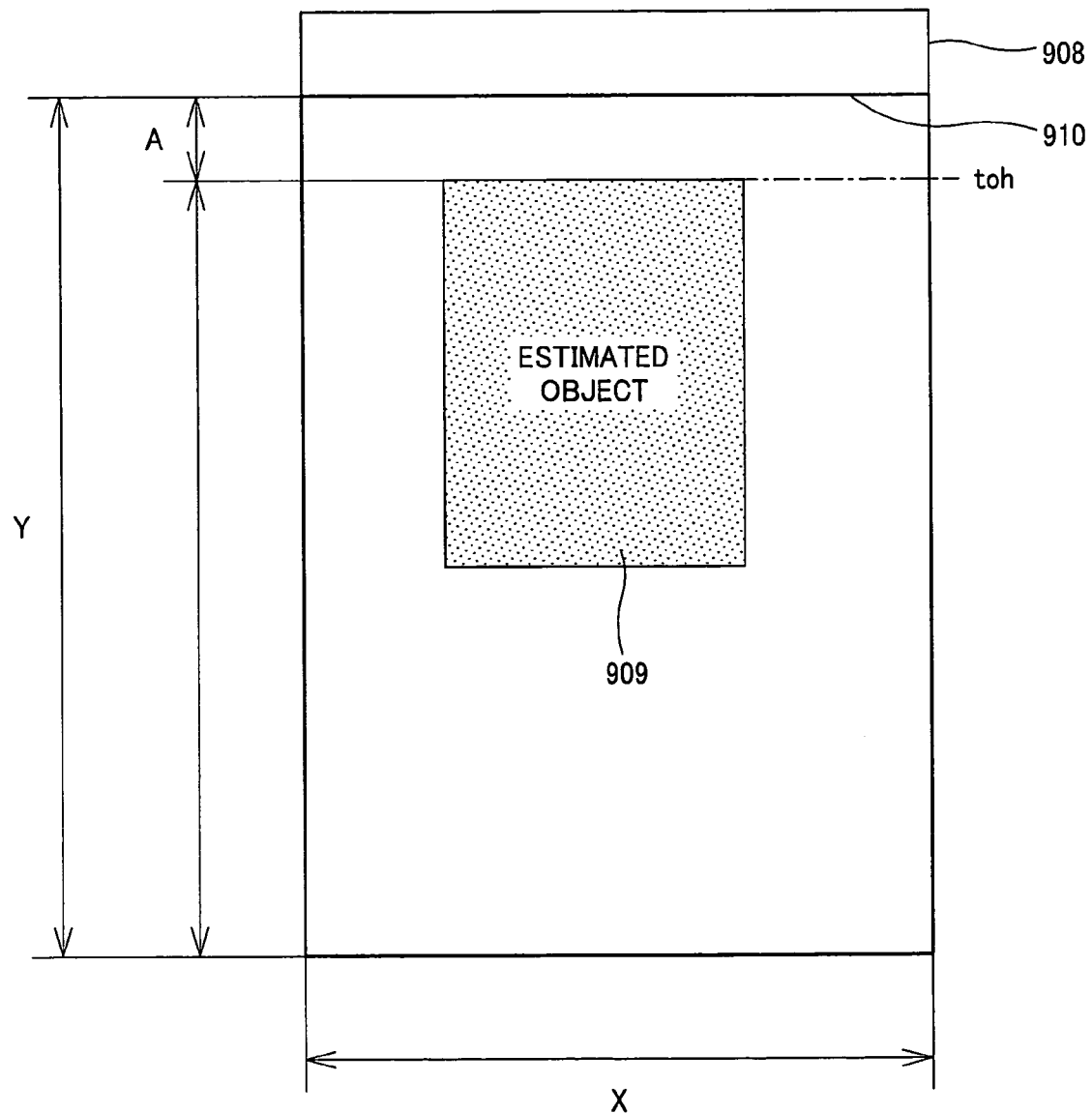
FIG. 33 explains a picture in which no head top has successfully be detected.

The trimming unit 400 calculates a to-be-trimmed region 903 by the CPU 78 on the basis of an input face region so that a person 902 in original image data 901 is positioned in a good balance as shown in FIG. 31, and trims the region 903 thus calculated. Also, in case two persons 905 and 906 are included in original image data 904 as shown in FIG. 32, the trimming unit 400 calculates, by the CPU 78, a to-be-trimmed region 907 around the person 905 near the center on the basis of an input face region, and trims the region 907 thus calculated. Further, in case positions of the eyes and mouth of a person in original image data 908 cannot be detected, the trimming unit 400 calculates, by the CPU 78, estimates, by calculation, an object region 909 around the position of the head top on the basis of an input face region, as shown in FIG. 33, and takes an effective region in the input image data 908 as a to-be-trimmed region 910.

Figure 34:
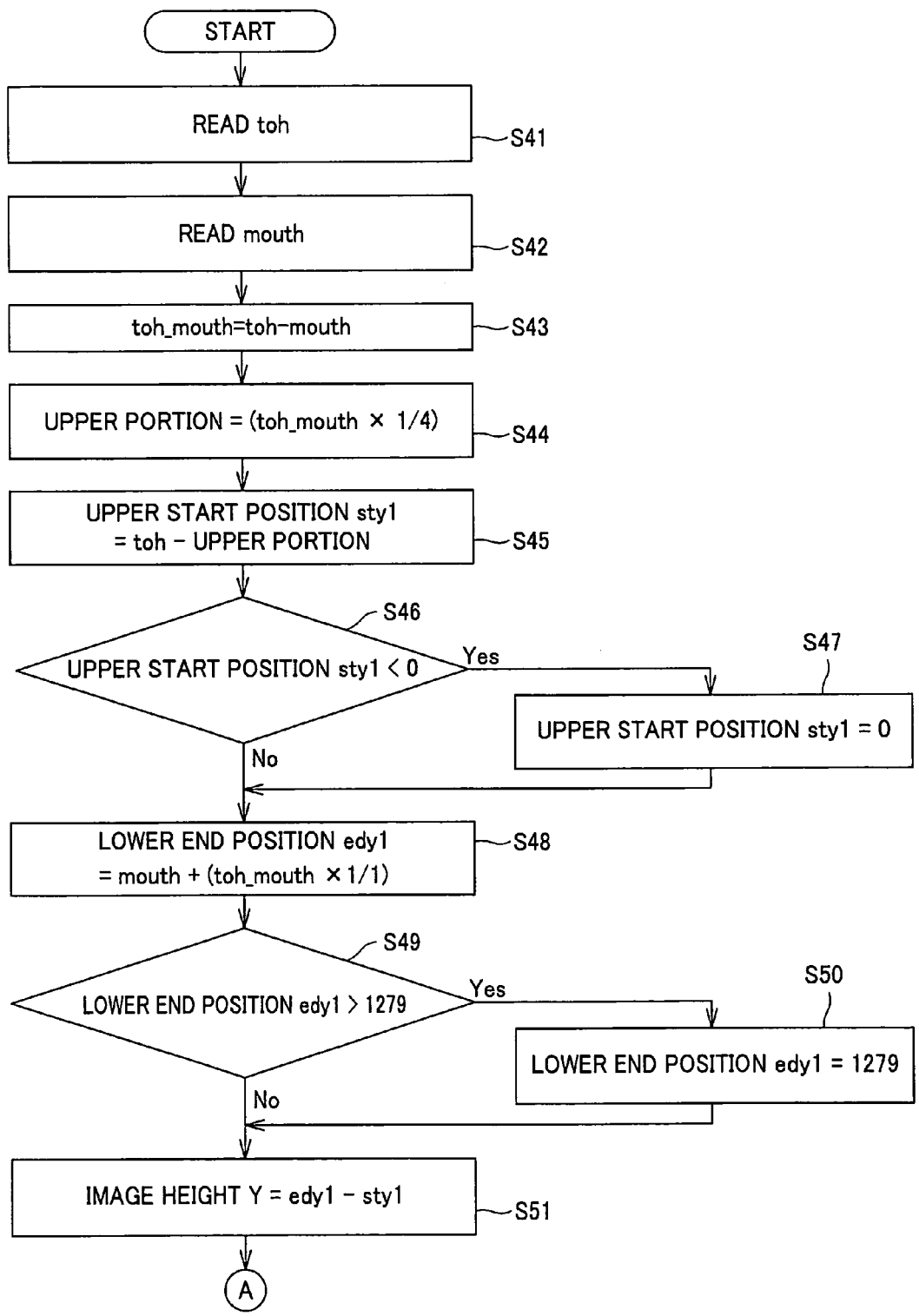
FIG. 34 shows a flow of operations made in the trimming unit in the image processing apparatus according to the present invention.
Figure 35:
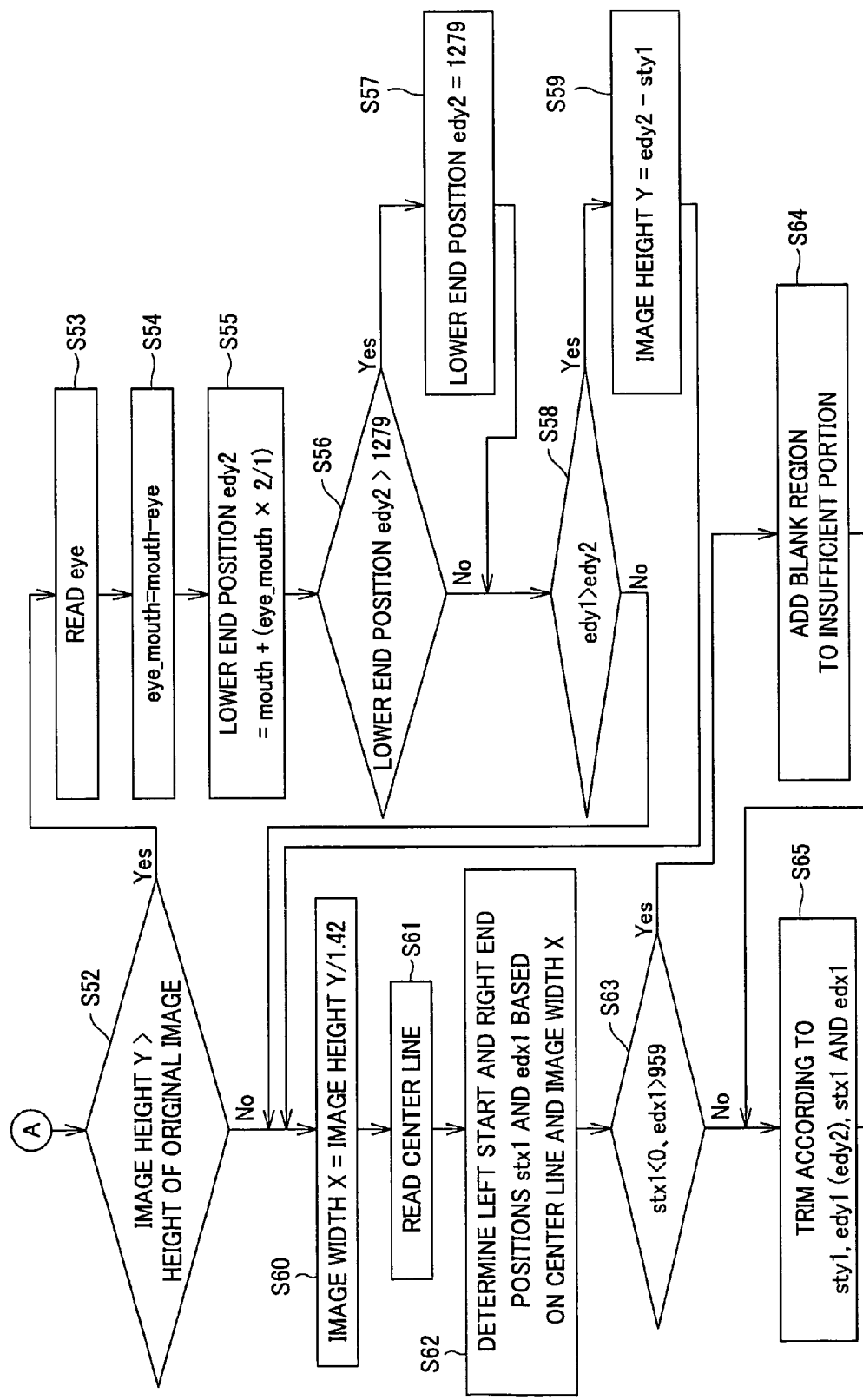
FIG. 35 shows a flow of operations made in the trimming unit in the image processing apparatus according to the present invention (this chart is continued from that in FIG. 34).

Supplied with a face region, the trimming unit 400 processes an image as will be described below with reference to FIGS. 34 and 35. In the following description, it is assumed that each of the original image data 901, 904 and 908 has a image size of 960 pixels in width and 1280 pixels in height. FIGS. 34 and 35 show flows of operations made for trimming in the trimming unit 400. Also, it is assumed in the following description that the positions of the head top, eyes and mouth and face center line detected by the corresponding units in the object-image detection unit 300 are stored in a RAM 73.

First in step S41 in FIG. 34, the CPU 78 reads, from the RAM 73, a head-top position toh detected by the head-top detection unit 313. In the following description, the head-top position read from the RAM 73 will be taken as toh.

Next in step S42, the CPU 78 reads, from the RAM 73, a mouth position detected by the mouth detection unit 314. In the following description, the mouth position read from the RAM 73 will be taken as mouth.

In step S43, the CPU 78 calculates the distance from the head top to the mouth to be toh_mouth. That is, the CPU 78 makes a calculation that toh_mouth=mouth−toh.

Next in step S44, the CPU 78 makes a calculation taking the overhead margin, that is, the length of overhead region A as a quarter of the distance from the head top toh to the mouth mouth. Namely, the CPU 78 makes a calculation of the overhead region A=(toh_mouth×1/4).

In step S45, the CPU 78 makes a calculation of the upper start position sty1=toh−(toh_mouth×1/4) taking that the upper start position of the to-be-trimmed region 903 is the length of the overhead region A above the position of the head portion toh.

In step S46, the CPU 78 judges whether the upper start position sty1 protrudes upward from the original image data 901. That is, the CPU 78 judges whether the upper start position sty1<0. In case sty1<0, the CPU 78 will go to step S47. If sty1≧0, the CPU 78 goes to step S48.

In step S47, the CPU 78 make a calculation taking the upper start position sty1 as the upper end of the original image data 901, namely, the upper start position as zero in case the upper start position sty1 protrudes upward from the original image data. In this case, the CPU 78 goes to step S48.

Next in step S48, the CPU 78 makes a calculation that the lower end position edy1=mouth+(toh_mouth×1/1) taking the distance from the mouth position mouth to the lower end position as being equal to the distance from the head top toh to the mouth.

In step S49, the CPU 78 judges whether the lower end position edy1 protrudes downward from the original image data 901, namely, whether the lower end position edy1>1279. If the lower end position edy1>1279, the CPU 78 goes to step S50. On the contrary, when the lower end position edy1≦1279, the CPU 78 will go to step S51.

In step S50, the CPU 78 makes a calculation that the lower end position edy1 is the lower end of the original image data 901, that is, the lower end position edy1=1279, in case the lower end position edy1 protrudes downward from the original image data 901, and goes to step S51.

In step S51, the CPU 78 makes a calculation that the image height Y=Lower end position edy1−Upper start position sty1 taking the vertical height of the to-be-trimmed region 903 as the image height Y.

Next in step S52 shown in FIG. 35, the CPU 78 compares the image height Y and height of original image data 901 with each other. If the image height Y is smaller than the height of original image data 901, the CPU 78 goes to step S60. On the contrary, if the image height Y is larger than the height of original image data 901, the CPU 78 will got to step S53.

In step S53, the CPU 78 reads an eye position from the RAM 73. In the following description, the eye position read from the RAM 73 will be taken as EYE.

Next in step S54, the CPU 78 makes a calculation that toh_mouth=mouth−toh taking the distance from the eye to the mouth is eye_mouth.

In step S55, the CPU 78 calculates the lower end position edy2 so that the ratio between the eye_mouth and distance from the mouth to the lower end position edy2 is 1:2. That is, the CPU 78 will make a calculation that edy2=mouth+(eye_mouth×2/1).

Next in step S56, the CPU 78 judges whether the lower end position edy2 protrudes downward from the original image data 901, namely, whether the lower end position edy2>1279. If the lower end position edy2>1279, the CPU 78 goes to step S57. On the contrary, when the lower end position edy2≦1279, the CPU 78 will go to step S58.

In step S57, the CPU 78 makes a calculation that the lower end position edy2 is the lower end of the original image data 901, that is, the lower end position edy2=1279, in case the lower end position edy2 protrudes downward from the original image data 901, and goes to step S58.

In step S58, the CPU 78 compares edy1 and edy2 in size with each other. If edy1>edy2, the CPU 78 goes to step S59. When edy1≦edy2, the CPU 78 will go to step S60.

In step S59, the CPU 78 makes a calculation that the image height Y=Lower end position edy2−Upper start position sty1 taking the vertical height of the to-be-trimmed region 903 as the image height Y, and then goes to step S60.

In step S60, the CPU 78 takes the horizontal width of the to-be-trimmed region 903 as the image width X, and makes a calculation that image width X=Image height Y/1.42 since the aspect ratio between the image width X and height Y is 1.42.

Next in step S61, the CPU 78 reads, from the RAM 73, a head-top position detected by the center-line detection unit 317. In the following description, the center-line position read from the RAM 73 will be taken as COH.

In step S62, the CPU 78 takes the leftmost end of the range of trimming as the left end position stx1 and rightmost end as the right end position edx1, and calculates stx1 and edx1 so that the image width X is centered on the center-line position COH.

Next in step S63, the CPU 78 judges whether the left start position stx1 protrudes to the left from the original image data 901, that is, whether the left start position stx1<0. If the left start position stx1<0, the CPU 78 goes to step S64. Also in step S63, the CPU 78 judges whether the right end position edx1 protrudes to the right from the original image data 901, namely, whether the right end position edx1>959. If the right end position edx1>959, the CPU 78 goes to step S64. Note that if it is determined in step S63 that the left start position stx1≧0 and right end position edx1≦959, the CPU 78 will go to step S65.

In step S64, the CPU 78 adds image data to the original image data 901 in order to add a blank region to a portion protruding from the original image data 901, and goes to step S65.

In step S65, the CPU 78 determines the range of trimming 903 on the basis of sty1, edy1 (edy2), stx1 and edx1, and trims the range of trimming from the original image data 901.

With the above operations, the trimming unit 400 configured as above trims the range of trimming 903 from the original image data 901.

With the above-mentioned operations, the trimming unit 400 can determines the range of trimming 903 so that the ratio among the face, chest and overhead regions is 1:1:0.25, and also the range of trimming 903 so that even the face position deviated to the right or left can be brought to the center, by adding a blank region to the original image data 901.

Also, since the aspect ratio of contact paper is fixed, the trimming unit 400 can easily calculate an image width after calculating an image height.

Figure 36:
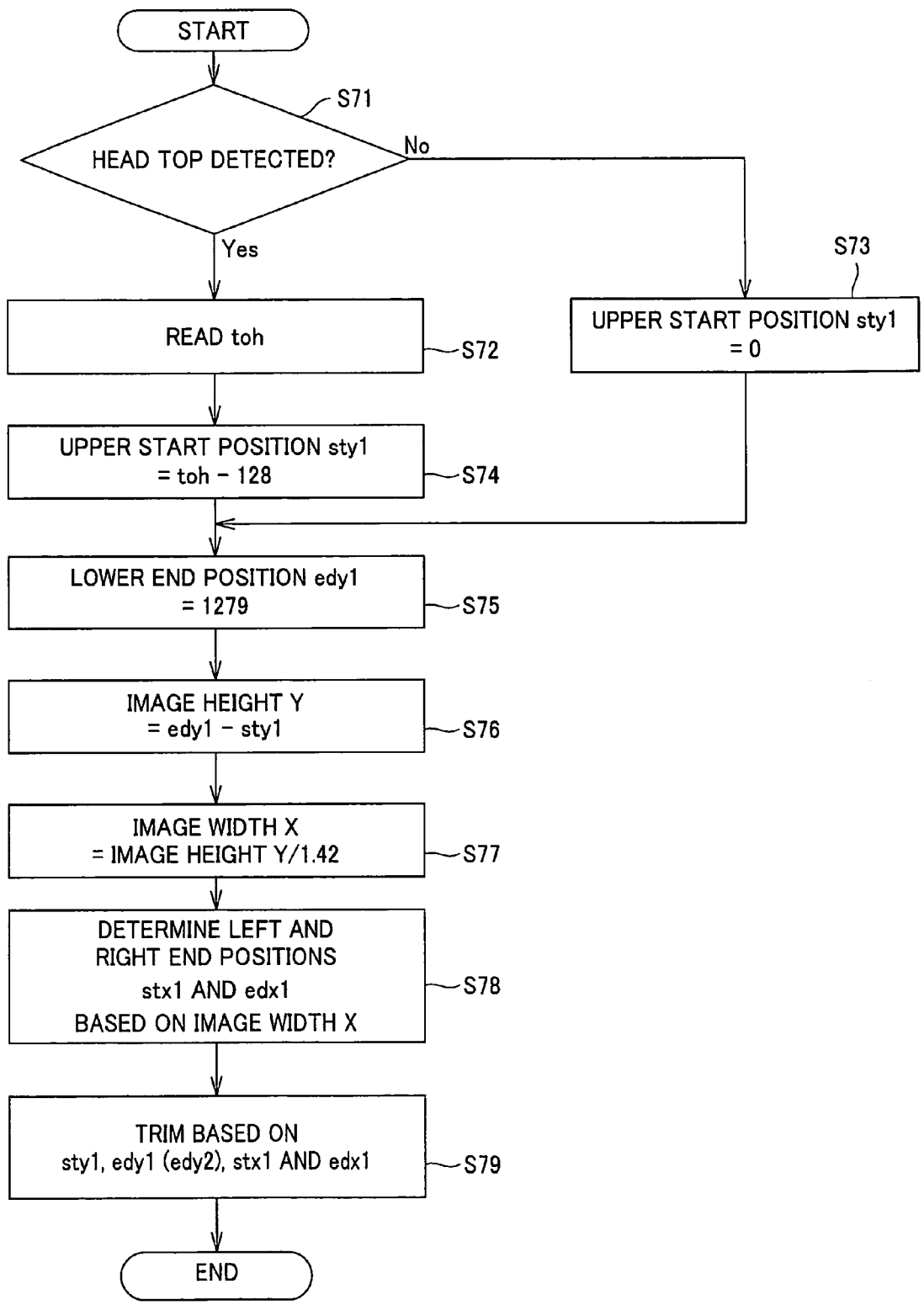
FIG. 36 shows a flow of operations made in the trimming unit in the image processing apparatus according to the present invention.

The trimming unit 400 processes an image when any of the detection units in the object-image detection unit 300 has failed in position detection as will be described below with reference to FIG. 36 showing a flow of operations made in trimming in the trimming unit 400.

First in step S71, the CPU 78 judges whether a head-top position has been detected by the head-top detection unit 313. If no head-top position has been detected, the CPI 78 goes to step S73. When any head-top position has been detected, the CPU 78 will go to step S72.

In step S72, the CPU 78 reads, from the RAM 73, the head-top position having been detected by the head-top detection unit 313. In the following, the head-top position read from the RAM 73 will be taken as TOH.

Next in step S74, the CPU 78 calculates the upper start position sty1 so that the latter will come to a position of 1/10 of the height of original image data 908 from the top end of a to-be-trimmed region 910. Namely, the CPU 78 will make a calculation that the upper start position sty1=toh−(1280/10), and goes to step S75.

If the CPU 78 has determined in step S71 that no head top has been detected, it will calculate, in step S73, the upper start position sty1 taking the upper end of the to-be-trimmed region 910 as that of the original image data 908. That is, the CPU 78 will make a calculation that the upper start position sty1=0, and go to step S75.

In step S75, the CPU 78 takes the bottom end of the to-be-trimmed region 910 as that of the original image data 908, and calculates the lower end position edy1. Namely, the CPU 78 will make a calculation that the lower end position edy1=1279.

Next in step S76, the CPU 78 makes a calculation that the image height Y=Lower end position edy1−Upper start position sty1 taking the vertical height of the to-be-trimmed region 910 as the image height Y.

In step S77, the CPU 78 takes the horizontal width of the to-be-trimmed region 910 as the image width X, and makes a calculation that image width X=Image height Y/1.42 since the aspect ratio between the image width X and height Y is 1.42.

Next in step S78, the CPU 78 takes the leftmost end of the range of trimming as the left start position stx1 and the rightmost end as the right start position edx1 so that the image width X is centered on the center-line position COH, and calculates stx1 and edx1. It should be noted that if no center-line position COH has been detected, the center of the entire width of the effective region of the original image data 908 may be taken as COH.

In step S79, the CPU 78 determines the range of trimming 910 on the basis of sty1, edy1, stx1 and edx1, and trims the range of trimming 910 from the original image data 908.

With the above operations, the trimming unit 400 configured as above trims the range of trimming 910 from the original image data 908.

Even if no head-top and mouth positions can be detected by the object image detection unit 300, the trimming unit 400 can appropriately determine the range of trimming 903. In case the photo booth 1 is installed in a hospital or the like, it will possibly be used a bandaged patient, spectacles-wearing patient or a masked patient and no head-top and mouth positions can possibly be detected in a captured image of the patient by the object-image detection unit 300. Even in such a case, the trimming unit 400 can appropriately trim the range of trimming.

Note that in case no head-top and mouth positions can be detected by the object-image detection unit 300, the trimming unit 400 may calculate an image height from the aspect ratio on the basis of the image width of the effective region 901 of an entire image data 900 in which a person 902 has been imaged as shown in FIG. 37. In FIG. 37, zones B1 and B2 outside the region where the person 902 is imaged are shadows developed because of the structure of the photo booth 1, where nothing is image. The zones B1 and B2 take place since the camera unit 17 takes a picture through vertical slits provided in the photo booth 1. Since the zones B1 and B2 are parallel to each other, the trimming unit 400 leaves a region between the zones B1 and B2 as an image width when trimming the effective region 901 from the entire image data 900.

Since the image processing apparatus according to the present invention detects a face region in an input image and makes an automatic trimming, the user can always get a well-balanced certificate picture as shown in FIG. 24 just by sitting on the chair inside the photo booth. The image processing apparatus used in the photo booth 1 makes it unnecessary for the user to adjust the chair height, which will be very convenient to the user.

The image processing apparatus according to the present invention it to be provided in the photo booth 1 installed in a hospital or the like and thus it is possibly used by a patient in a wheelchair, crutched person, a person holding a child in the bosom, etc. Therefore, their face is not always positioned in the center of captured image data. Even in such a case, the image processing apparatus automatically trims the image to provide an easy-to-view, well-balanced picture.

Further, the image processing apparatus according to the present invention is to be provided in the photo booth 1 installed in a hospital or the like. Thus, it will possibly be used a bandaged patient, spectacles-wearing patient or a masked patient and no head-top and mouth positions can possibly be detected. Even in such a case, however, the image can automatically be trimmed to provide a picture in which the face of the user is positioned in a good balance.

In the foregoing, the present invention has been described concerning the photo booth that is to be installed in a hospital or the like. However, the present invention is not limited to such a photo booth but can be applied to a certificate picture booth to be installed at a street corner for example or a photo booth to be installed in a game center or the like. The photo booths installed at the street corner or in a game center can also be used easily by any physically handicapped persons.

Also, in the foregoing, the present invention has been illustrated and explained concerning the hardware configuration. However, the present invention is not limited to the hardware configuration but an arbitrary operation can be done by having the CPU 78 execute a computer program as in the trimming unit 400. In this case, the computer program can be recorded in a recording medium for distribution, and also distributed via a transmission medium such as the Internet or the like.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, the image extracting apparatus and method, image processing apparatus and method and photographic apparatus according to the present invention permit to trim an image of a person in a certificate picture so that the image is positioned in place on contact paper.

The invention claimed is:

1. An image generating and extracting apparatus comprising:
   an imaging system for generating original image data of a person and processing the original image data;
   a face-region identifying means for identifying a face region from the original image data; and
   a trimming means for automatically trimming the image to remove a range of trimming determined based on the face region identified by the face-region identifying means, the trimming means operating on image data defining the image to eliminate at least a portion of the image data above the face region while maintaining a fixed resolution relative size for the image data defining the face-region, wherein the trimming means operates under the control of a microprocessor, and further wherein the face-region identifying means includes a means for converting input color image data into a coordinate value in a color space and a histogram generator for generating a frequency of appearance for colors in the color space; and further comprising first and second illumination sources, the first and second illumination sources located at opposite sides of a perpendicular line from an imaging device to the person and wherein the illumination sources are respectively positioned such that a line from the person to each illumination source forms an angle of between 30 and 70 degrees with the perpendicular line, and further comprising means for identifying a mouth region, eye region and head top for the image data; and further wherein the apparatus automatically provides an output comprised of image information located at a desired position within an identification card.

2. The image extracting apparatus according to claim 1, wherein the trimming means makes such a trimming of the input person's image that the face region will be positioned in a desired location upon printing of the image.

3. The image extracting apparatus according to claim 2, wherein a region extending from a top end of an effective pixel region to a head-top end of the face region, is an overhead region, a region extending from the head-top end of the face region to a jaw edge is a face region and a region extending from the jaw, edge to a bottom end of the image is a chest region, the face region is positioned in such a dimensional relation among these regions that the face region is larger than the chest region and the latter is larger than the overhead region.

4. The image extracting apparatus according to claim 3, wherein the dimensional ratio among the face, chest and overhead regions that is 1:0.4 to 0.8:0.1 to 0.26.

5. The image extracting apparatus according to claim 1, wherein the face-region identifying means includes:
 a flesh-color region identifying means for identifying a flesh-color region;
 a feature detecting means for locating, based on the identified flesh-color region, more than one feature selected from a group of a person's head top, mouth, eyes and jaw; and
 a judging means for judging, based on the identified flesh-color region and detected positions of the features, whether the flesh-color region is the face region.

6. An image generating and extracting apparatus comprising:
 an imaging system for generating original image data of a person and processing the original image data;
 a face-region identifying means for identifying a face region from the original image data; and
 a trimming means for automatically trimming the image to remove a range of trimming determined based on the face region identified by the face-region identifying means, the trimming means operating on image data defining the image to eliminate at least a portion of the image data above the face region, wherein the trimming means operates under the control of a microprocessor and wherein the face-region identifying means includes:
 a flesh-color region identifying means for identifying a flesh-color region;
 a feature detecting means for locating, based on the identified flesh-color region, more than one feature selected from a group of a person's head top, mouth, eyes and jaw; and
 wherein the flesh-color region identifying means includes:
 a color converting means for converting each pixel value of an input color image into a coordinate value in a color space;
 a histogram generating means for generating a histogram representing a frequency of appearance of colors in the color space;
 an initial-cluster identifying means for identifying each maximum point of the frequency of appearance in the histogram;
 and further comprising first and second illumination sources, the first and second illumination sources located at opposite sides of a perpendicular line from an imaging device to the person and wherein the illumination sources are respectively positioned such that a line from the person to each illumination source forms an angle of between 30 and 70 degrees with the perpendicular line, and further comprising means for identifying a mouth region, eye region and head top for the image data; and further wherein the apparatus automatically provides an output comprised of image information located at a desired position within an identification card.

7. An image extracting method comprising the steps of:
 generating original image data of a person and processing the original image data;
 identifying a face region from the original image data; and
 trimming the person's image to remove a range of trimming determined based on the identified face region
 wherein trimming includes eliminating at least a portion of the image data above the face region,
 and identifying the face region includes identifying a flesh-color region and detecting more than one feature selected from a person's head top, mouth, eyes and jaw; and
 judging, based on the identified flesh-color region and detected positions of the features, whether the flesh-color region is the face region; and further wherein identifying the flesh-color region includes converting each pixel value of an input color Image into a coordinate value in a color space;
 generating a histogram representing a frequency of appearance of colors in the color space;
 identifying each maximum point of the frequency of appearance in the histogram; and
 identifying a region including pixels belonging to the initial cluster corresponding to a flesh color from the input color image; and further comprising:
 automatically providing an output comprised of image information located at a desired position within an identification card.

8. The image extracting method according to claim 7, wherein the input person's image is trimmed so that the face region extracted from the image will be positioned in a desired position upon printing.

9. The image extracting method according to claim 8, wherein a region, extending from a top end of the effective pixel region to a head-top end, is an overhead region, a region extending from the head-top end to the jaw is a face region and a region extending from the jaw to a bottom is a chest region, and the face region is positioned such that the face, region is larger than the chest region and the latter is larger than the overhead region.

10. The image extracting apparatus according to claim 9, wherein the dimensional ratio among the face, chest and overhead regions that is 1:0.4 to 0.8:0.1 to 0.26.

11. A photographic apparatus comprising:
 a photographic means for taking a picture of a person; and
 an image identifying means including:
 a face-region identifying means for identifying the person's face region from the picture; and
 a trimming means for trimming the picture to remove a range of trimming determined based on the face region identified by the face-region identifying means the trimming means operating on image data defining the image to eliminate at least a portion of the image data above the face region, wherein the trimming means operates under the control of a microprocessor and wherein the face-region identifying means includes:
 a flesh-color region identifying means for identifying a flesh-color region;

a feature detecting means for locating, based on the identified flesh-color region, more than one feature selected from a group of a person's head top, mouth, eyes and jaw; and wherein the flesh-color region identifying means includes:

a color converting means for converting each pixel value of an input color image into a coordinate value in a color space;

a histogram generating means for generating a histogram representing a frequency of appearance of colors in the color space;

an initial-cluster identifying means for identifying each maximum point of the frequency of appearance in the histogram; and a region identifying means for identifying a region including pixels belonging to the initial cluster corresponding to a flesh color from the input color image; and a means for automatically providing an output comprised of image information located at a desired position within an identification card.

12. The photographic apparatus according to claim 11, wherein a region extending from a top end of the effective pixel region to a head-top end of the face region, is an overhead region, a region extending from the head-top end of the face region to an edge of the jaw is a face region and a region extending from the edge of the jaw to the bottom end of the image data is a chest region, the face region is positioned in such that the face region is larger than the chest region and the latter is larger than the overhead region.

13. The photographic apparatus according to claim 12, wherein the dimensional ratio among the face, chest and overhead regions that is 1:0.4 to 0.8:0.1 to 0.26.

14. The photographic apparatus according to claim 11, further comprising a printing means for printing.

* * * * *